United States Patent
Gerstberger et al.

(10) Patent No.: US 11,349,707 B1
(45) Date of Patent: May 31, 2022

(54) IMPLEMENTING SECURITY SYSTEM DEVICES AS NETWORK NODES

(71) Applicant: Amazon Technologies, Inc., Seattle, WA (US)

(72) Inventors: Peter Gerstberger, Laguna Niguel, CA (US); Michael Robert Harris, Phoenixville, PA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 16/284,934

(22) Filed: Feb. 25, 2019

Related U.S. Application Data

(60) Provisional application No. 62/641,624, filed on Mar. 12, 2018.

(51) Int. Cl.
*H04L 12/24* (2006.01)
*H04L 41/0806* (2022.01)
*H04N 7/18* (2006.01)
*G08B 13/196* (2006.01)

(52) U.S. Cl.
CPC ...... *H04L 41/0806* (2013.01); *G08B 13/1966* (2013.01); *G08B 13/19695* (2013.01); *H04N 7/186* (2013.01)

(58) Field of Classification Search
CPC .................. H04L 41/0806; H04N 7/186; G08B 13/1966; G08B 13/19695
USPC .......................................................... 709/222
See application file for complete search history.

(56) References Cited

U.S. PATENT DOCUMENTS

| | | | |
|---|---|---|---|
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,780,201 B1 | 7/2014 | Scalisi et al. | |
| 8,823,795 B1 | 9/2014 | Scalisi et al. | |
| 8,842,180 B1* | 9/2014 | Kasmir | H04M 11/025 348/143 |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |

(Continued)

*Primary Examiner* — Sargon N Nano
*Assistant Examiner* — Kidest Mendaye
(74) *Attorney, Agent, or Firm* — Lee & Hayes, P.C.

(57) ABSTRACT

This application is directed to an electronic device that operates as both a sound component for a doorbell and a component of a security system. For instance, the electronic device may receive a signal from the doorbell. The electronic device may then output a sound associated with the doorbell. Additionally, the electronic device may receive data from one or more sensors associated with the security system. Based on the data, the electronic device may perform one or more functions. For instance, if the electronic device sets a specific mode of the security system, the electronic device may output a sound representing an alarm of the security system. Additionally, the electronic device may send data to another electronic device, such as a server or a client device, that indicates that the one or more sensors detected an event.

22 Claims, 23 Drawing Sheets

(56) References Cited

U.S. PATENT DOCUMENTS

| | | |
|---|---|---|
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 * | 10/2015 | Kasmir ............... H04N 7/186 |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 * | 10/2015 | Kasmir ............. H04L 12/2827 |
| 9,179,107 B1 | 11/2015 | Scalisi et al. |
| 9,179,108 B1 * | 11/2015 | Scalisi ................ G08B 3/10 |
| 9,179,109 B1 * | 11/2015 | Kasmir ............... H04N 7/188 |
| 9,196,133 B2 * | 11/2015 | Scalisi ............. G08B 13/19695 |
| 9,197,867 B1 | 11/2015 | Scalisi et al. |
| 9,230,424 B1 * | 1/2016 | Scalisi ............. H04L 12/2818 |
| 9,237,318 B2 | 1/2016 | Kasmir et al. |
| 9,247,219 B2 * | 1/2016 | Kasmir ............. H04M 11/025 |
| 9,253,455 B1 * | 2/2016 | Harrison ........... H04M 11/025 |
| 9,342,936 B2 | 5/2016 | Scalisi |
| 9,501,915 B1 * | 11/2016 | Laska ................ H04N 5/9201 |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2014/0070922 A1 * | 3/2014 | Davis ............... H04M 11/025 340/6.1 |
| 2015/0022620 A1 * | 1/2015 | Siminoff ............ H04N 7/186 348/14.02 |
| 2015/0049191 A1 * | 2/2015 | Scalisi ............... H04N 7/186 348/143 |
| 2015/0138353 A1 * | 5/2015 | Yang ................ H04N 7/188 348/143 |
| 2016/0105644 A1 * | 4/2016 | Smith ............... G08B 13/1966 348/159 |
| 2016/0171847 A1 * | 6/2016 | Parker ............... G08B 3/10 340/326 |
| 2016/0330413 A1 * | 11/2016 | Scalisi ............... H04N 7/186 |
| 2017/0085843 A1 * | 3/2017 | Scalisi ............... G06Q 90/20 |
| 2017/0195640 A1 * | 7/2017 | Pasternak ........... H04W 4/12 |
| 2017/0263086 A1 * | 9/2017 | Matsuura ............ G08B 3/10 |
| 2017/0272269 A1 * | 9/2017 | Siminoff ........... H04M 11/025 |
| 2018/0019889 A1 * | 1/2018 | Burns ............... H04L 12/4625 |
| 2018/0283049 A1 * | 10/2018 | Shiner .............. G08B 3/10 |
| 2019/0191363 A1 * | 6/2019 | Ahmet .............. H04L 67/12 |

* cited by examiner

IMPLEMENTING SECURITY SYSTEM DEVICES AS NETWORK NODES

RELATED APPLICATION

This application claims priority to U.S. Provisional Patent Application No. 62/641,624, filed on Mar. 12, 2018, titled "IMPLEMENTING SECURITY SYSTEM DEVICES AS NETWORK NODES," the entire contents of which are incorporated herein by reference.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include or communicate with sensors, automation devices, and/or A/V recording and communication devices, such as doorbells, provide this functionality, and may also aid in crime detection and prevention. For example, sensor information, audio, and/or video captured by a security system, such as by an A/V recording and communication doorbell of a security system, may be uploaded to the cloud and recorded on a remote server. Subsequent review of the sensor information and/or the A/V footage may aid law enforcement in capturing perpetrators of home burglaries and other crimes. The presence of a security system including one or more an A/V recording and communication devices on the exterior of a home, such as a doorbell unit at the entrance of a home, acts as a powerful deterrent against would-be burglars.

BRIEF DESCRIPTION OF THE DRAWINGS

The various example embodiments for implementing security system devices as network nodes now will be discussed in detail with an emphasis on highlighting the advantageous features. These embodiments depict novel and non-obvious techniques for implementing security system devices as network nodes shown in the accompanying drawings, which are for illustrative purposes only. These drawings include the following figures, in which like numerals indicate like parts.

DETAILED DESCRIPTION

Figure 1:
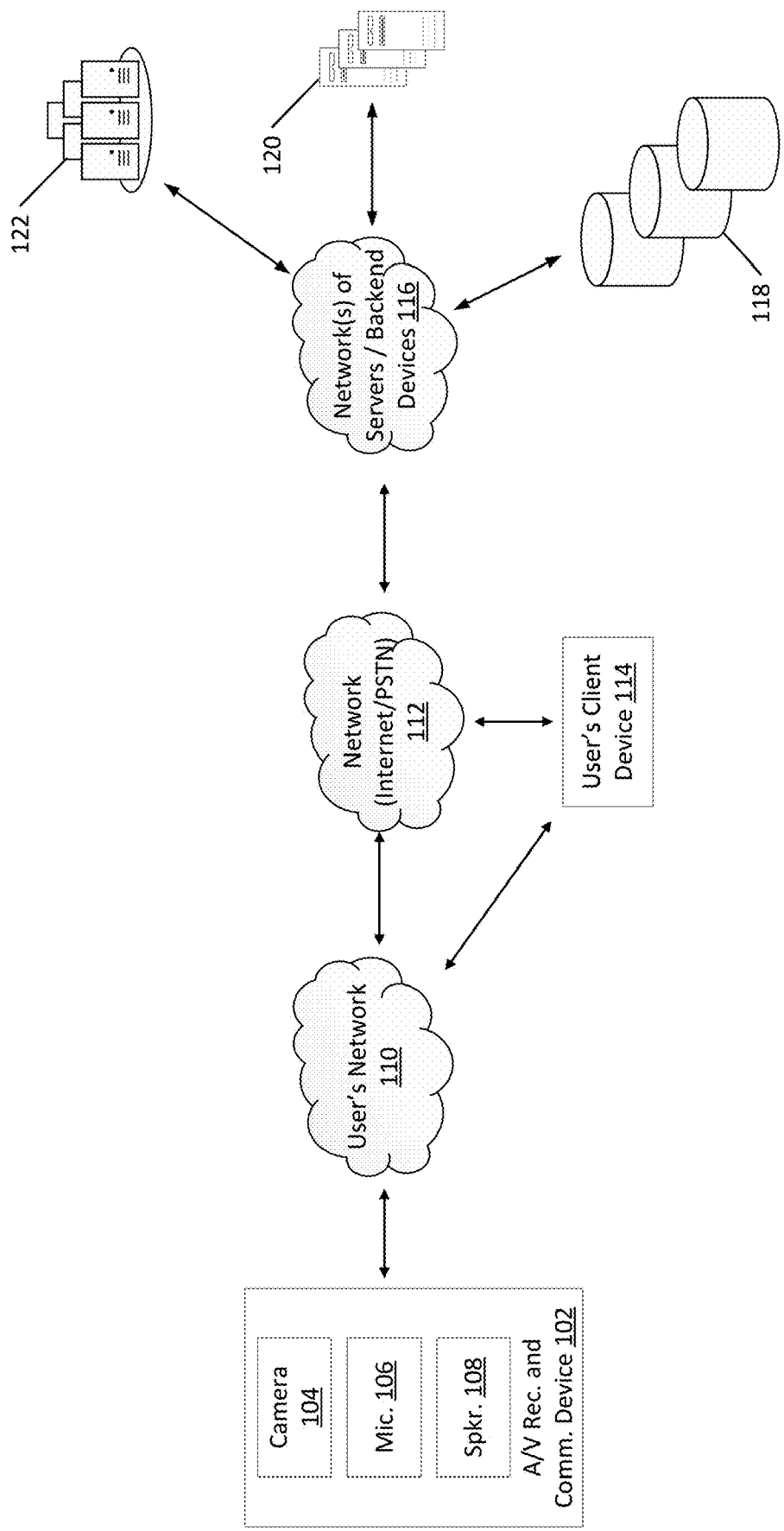
FIG. 1 is a functional block diagram illustrating an example system for streaming and storing A/V content captured by an audio/video recording and communication device (A/V device) according to various aspects of the present disclosure.

One aspect of the present embodiments includes the realization that security systems and audio/video recording and communication devices (A/V devices), such as doorbells, floodlight controllers, and security cameras, can make neighborhoods safer. For example, audio and/or video captured by a wireless A/V devices can be uploaded to the cloud and recorded on a remote server. As another example, sensor data generated by sensors and/or automation devices of a security system can capture break-ins, perimeter breaches, and the like. Subsequent review of the audio, video, and/or sensor data may aid law enforcement in capturing perpetrators of home burglaries and other crimes. Further, the presence of one or more wireless A/V devices on the exterior of a home, such as a doorbell unit at the entrance to the home, acts as a powerful deterrent against would-be burglars. However, while security systems and A/V devices may increase safety at a single property, the presence and coordination of multiple devices in a geographic area (e.g., a block, a street, a neighborhood, a town, a city, etc.) may increase safety for that geographic area, as well as surrounding areas. For example, by associating A/V devices from different homes, a neighborhood may be safer, and law enforcement may better investigate crimes with footage from multiple A/V devices and/or with sensor data generated by multiple security systems located throughout the geographic area.

The present embodiments solve this problem by, for example, transferring components of a security system (e.g., a hub device, sensors, automation devices, etc.) and/or A/V devices to other parties for installation at structures such as homes. The parties to which the devices are distributed may be people and/or businesses in the construction trade, such as homebuilders, contractors, and/or subcontractors. These parties may then install the devices at structures they are building, renovating, remodeling, etc. When the devices are distributed and/or installed, they may be in a pre-activation mode in which the devices have limited functionality. For example, if the devices are video doorbells, they may be capable of functioning like traditional doorbells whereby they may sound a signaling device when the front button on the doorbell is pressed (or when movement in a field of view of a sensor of the doorbell is sensed.) However, components of the doorbell may be deactivated or disabled in the pre-activation mode. For example, a camera of the doorbell may be disabled in the pre-activation mode, or image data captured by the camera may be viewable only as a live stream, e.g., the image data is not stored, or the A/V device may not be configured to communicate with additional A/V devices or other devices via one or more networks. For a security system, the sensors and/or automation devices may not be activated, such that sensor data is either not generated and/or ignored by the hub device of the security system. In any example, the one or more components of the security systems (e.g., signaling devices including hub device functionality) and/or the A/V devices may act as base stations and/or nodes for a wide area network (e.g., a low power wide area network (LPWAN)) when in the pre-activation and/or activated mode. As such, the security system and/or the A/V devices may create a wide area network for the geographic area that may enable additional functionality, such as tracking of persons, objects, and/or animals within the geographic area, transmitting and/or receiving data between the security systems and/or the A/V devices across the wide area network, etc. As a result, even when in the pre-activation mode, the security systems and/or A/V devices may increase the safety of the geographic area by helping to enable communications across the wide area network. At any time, the homeowner (or renter or other occupant) may subsequently desire to activate the A/V device(s) and/or security systems, to enable additional functionalities (such as recording image data and audio data, activating one or more sensors and/or automation devices of a security system, etc.). Accordingly, in aspects of this disclosure, the prevalence of A/V devices and/or security systems in geographic areas is increased, a network is created for communication within the geographic areas, and residents of properties within the geographic areas are able to activate pre-installed security systems and/or A/V devices, thereby resulting in enhancing the safety and security of the residents property, family, and pets, as well as the safety and security of the geographic area.

Another aspect of the present embodiments includes the realization that pre-installation of security systems requires a hard-wired connection in order to include the security system as part of a homeowner's insurance policy. However, homeowners may not desire to have a security system installed (e.g., because they are unattractive, they live in a safe neighborhood, they can't afford the monitoring, etc.). As a result, many security systems are sold aftermarket. However, aftermarket security systems often require an installation process that may be costly, require running wires around the home, and/or require some level of destruction (e.g., putting holes in walls in order to property install the security system components).

The present embodiments solve this problem by, for example, transferring signaling devices that include functionality for a hub device of a security system for installation within homes during construction, remodel, etc. Each home that includes a doorbell traditionally includes a standard signaling device, and signaling devices may be digital or mechanical, and are often hard-wired and located in a central location of the property. The signaling device that includes the hub device functionality may, when in a pre-activation mode, perform as a standard signaling device (e.g., output a sound in response to an input to a doorbell). In an activated mode, the signaling device may communicate with one or more sensors (e.g., door/window sensors, motion sensors, flood sensors, etc.), automation devices (e.g., lighting systems, sprinkler systems, home entertainment systems, etc.), A/V devices (e.g., security cameras, floodlight controllers, etc.), client devices, and/or backend devices. As a result, residents of a property may have, pre-installed, not appearing out of place (e.g., because standard signaling devices are already traditionally installed in homes), and centrally located within the home, hub device functionality for controlling a security system (and/or home automation systems). In addition, because the signaling device with hub device functionality is hard-wired, if the resident chooses to activate the security system, the security system may be included in the homeowner's insurance. As another benefit, similar to the benefits described above, the signaling device may include base station functionality for broadcasting and communicating over a wide area network (e.g., an LPWAN) when in a pre-activated and/or activated mode, thereby enabling additional security for the resident as well as the surrounding geographic area.

The following detailed description describes the present embodiments with reference to the drawings. In the drawings, reference numbers label elements of the present embodiments. These reference numbers are reproduced below in connection with the discussion of the corresponding drawing features.

In some embodiments, this disclosure may include the language, for example, "at least one of [element A] and [element B]". This language may refer to one or more of the elements. For example, "at least one of A and B" may refer to "A", "B", or "A and B". In other words, "at least one of A and B" may refer to "at least one of A and at least one of B," or "at least of either A or B." Additionally, this disclosure may include the language, for example, "[first element], [second element], and/or [third element]." This language may refer to one or more of the elements. For example, "A, B, and/or C" may refer to "A", "B", "C", "A and B" "A and C", "B and C", or "A, B, and C".

As described herein, receiving may include obtaining, receiving, and/or retrieving. For example, by describing that a first device receives data (e.g., image data, audio data, other data, signals, information, etc.), the first device may obtain the data, receive the data, and/or retrieve the data (e.g., from a local storage, from a second device, from a backend device, etc.). In some examples, the first device may receive, obtain, and/or retrieve the data based on sending a request for the data to the second device. Additionally, or alternatively, in some examples, the device may receive, obtain, and/or retrieve the data without sending a request for the data to the second device. For example, the second device may transmit the data to the first device in response to receiving, obtaining, retrieving, generating, creating, and/or storing the data by the second device.

With reference to FIG. 1, the present embodiments include an audio/video recording and communication device (A/V device) 102. While the present disclosure provides numerous examples of methods and systems including A/V recording and communication doorbells (A/V doorbells), the present embodiments are equally applicable for A/V devices other than doorbells. For example, the present embodiments may include one or more A/V recording and communication security cameras instead of, or in addition to, one or more A/V doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V doorbells.

The A/V device 102 may be located near the entrance to a structure (not shown), such as a dwelling, a business, a storage facility, etc. The A/V device 102 includes a camera 104, a microphone 106, and a speaker 108. The camera 104 may comprise, for example, a high definition (HD) video camera, such as one capable of capturing video images at an image display resolution of 722p, or 1080p, 4K, or any other image display resolution. While not shown, the A/V device 102 may also include other hardware and/or components, such as a housing, a communication module (which may facilitate wired and/or wireless communication with other devices), one or more motion sensors (and/or other types of sensors), a button, etc. The A/V device 102 may, in some examples, further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V device 102 communicates with a user's network 110, which may be for example a wired and/or wireless network. If the user's network 110 is wireless, or includes a wireless component, the network 110 may be, for example, a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V device 102 may communicate with the user's client device 114 via the user's network 110 and/or the network 112 (Internet/PSTN). The user's client device 114 may comprise, for example, a mobile telephone (may also be referred to as a cellular telephone), such as a smartphone, a personal digital assistant (PDA), or another communication device. The user's client device 114 may comprise a display (not shown) and related components capable of displaying streaming and/or recorded video images. The user's client device 114 may also comprise a speaker and related components capable of broadcasting streaming and/or recorded audio, and may also comprise a microphone.

The A/V device 102 may also communicate, via the user's network 110 and the network 112 (Internet/PSTN), with a network(s) 116 of servers and/or backend devices, such as (but not limited to) one or more remote storage devices 118 (may be referred to interchangeably as "cloud storage device(s)"), one or more servers 120, and one or more backend APIs 122. While FIG. 1 illustrates the storage device 118, the server 120, and the backend API 122 as components separate from the network 116, it is to be understood that the storage device 118, the server 120, and/or the backend API 122 may be considered to be components of the network 116.

The network 116 may be any wireless network or any wired network, or a combination thereof, configured to operatively couple the above-mentioned modules, devices, and systems as shown in FIG. 1. For example, the network 116 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth network, Zigbee network, or an IEEE 802.11-based radio frequency network. The network may further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi© networking.

According to one or more aspects of the present embodiments, when a person (may be referred to interchangeably as "visitor") arrives at the A/V device 102, the A/V device 102 detects the visitor's presence and begins capturing video images within a field of view of the camera 104. The A/V communication device 102 may also capture audio through the microphone 106. The A/V device 102 may detect the visitor's presence by, for example, detecting motion using the camera 104 and/or a motion sensor, and/or by detecting that the visitor has pressed a front button of the A/V device 102 (if the A/V device 102 is a doorbell).

In response to the detection of the visitor, the A/V device 102 transmits an alert to the user's client device 114 (FIG.

1) via the user's network 110 and the network 112. The A/V device 102 also transmits streaming video, and may also transmit streaming audio, to the user's client device 114. If the user answers the alert, two-way audio communication may then occur between the visitor and the user through the A/V device 102 and the user's client device 114. The user may view the visitor throughout the duration of the call, but the visitor may not see the user (unless the A/V device 102 includes a display, which it may in some embodiments).

The video images captured by the camera 104 of the A/V device 102 (and the audio captured by the microphone 106) may be uploaded to the cloud and recorded on the remote storage device 118 (FIG. 1). In some examples, the video images and/or audio may additionally or alternatively be stored locally by the A/V recording and communications device 102, a client device of the user, or other device in communication with the A/V recording and communications device 102. In some embodiments, the video and/or audio may be recorded on the remote storage device 118 even if the user chooses to ignore the alert sent to his or her client device 114.

With further reference to FIG. 1, the system may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 122 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming GUI components. For example, an API may facilitate integration of new features into existing applications (a so-called "plug-in API"). An API may also assist otherwise distinct applications with sharing data, which may help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both be run on the same machine. Clients and servers may have a user interface, and sometimes other hardware associated with them.

Figure 2:
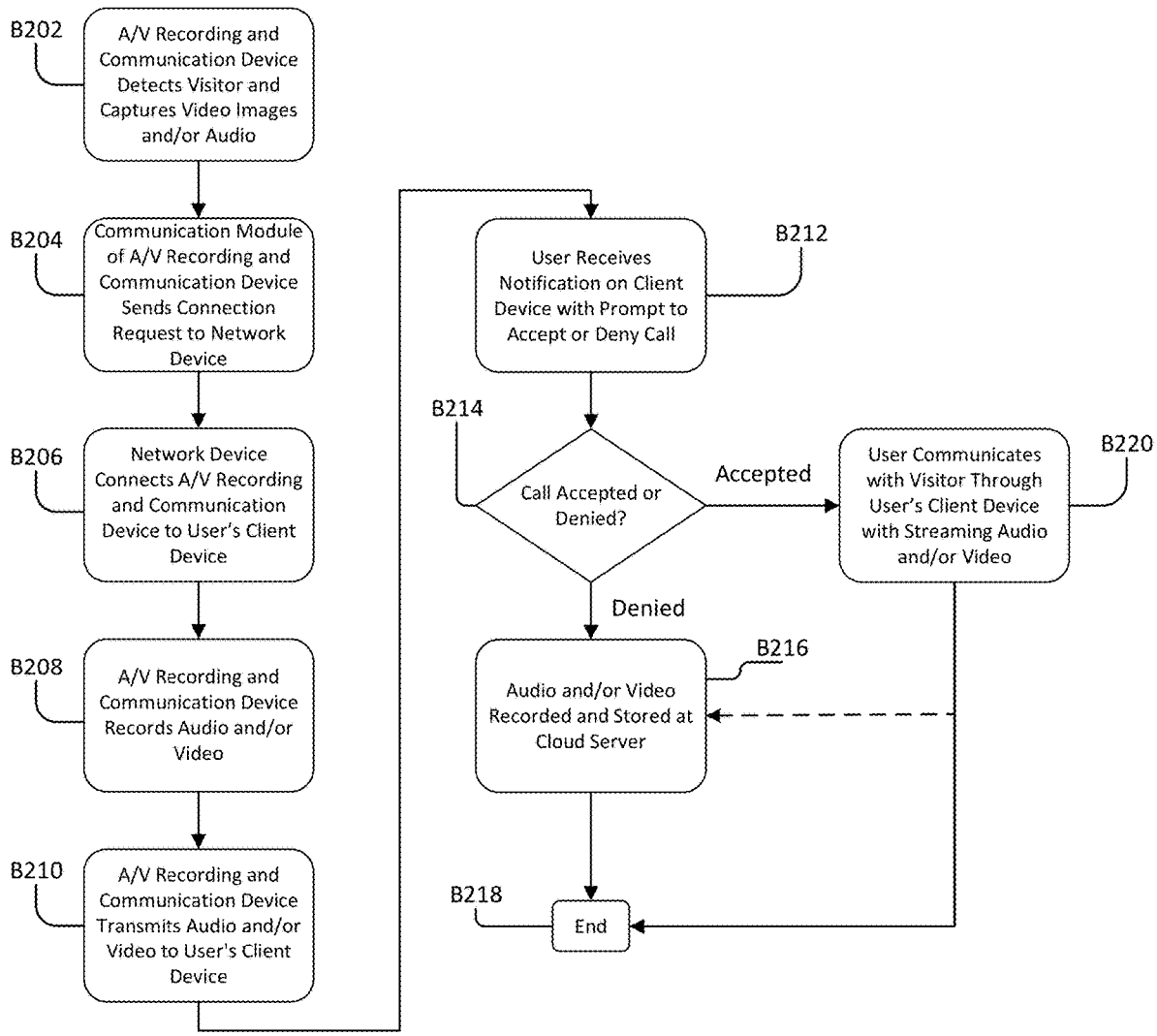
FIG. 2 is a flowchart illustrating an example process for streaming and storing A/V content from an A/V device according to various aspects of the present disclosure.

FIG. 2 is a flowchart illustrating a process for streaming and storing A/V content from the A/V device 102 according to various aspects of the present disclosure. At block B202, the A/V device 102 detects the visitor's presence and captures video images within a field of view of the camera 104. The A/V device 102 may also capture audio through the microphone 106. As described above, the A/V device 102 may detect the visitor's presence by detecting motion using the camera 104 and/or a motion sensor, and/or by detecting that the visitor has pressed a front button of the A/V device 102 (if the A/V device 102 is a doorbell). Also, as described above, the video recording/capture may begin when the visitor is detected, or may begin earlier, as described below.

At block B204, a communication module of the A/V device 102 transmits a connection request, via the user's network 110 and the network 112, to a device in the network 112. For example, the network device to which the request is sent may be a server such as the server 120. The server 120 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 122, which is described above.

In response to the request, at block B206 the network device may connect the A/V device 102 to the user's client device 114 through the user's network 110 and the network 112. At block B208, the A/V device 102 may record available audio and/or video data using the camera 104, the microphone 106, and/or any other device/sensor available. At block B208, the audio and/or video data is transmitted (streamed) from the A/V device 102 to the user's client device 114 via the user's network 110 and the network 112. At block B212, the user may receive a notification on his or her client device 114 with a prompt to either accept or deny the call.

At block B214, the process determines whether the user has accepted or denied the call. If the user denies the notification, then the process advances to block B216, where the audio and/or video data is recorded and stored at a cloud server. The session then ends at block B218 and the connection between the A/V device 102 and the user's client device 114 is terminated. If, however, the user accepts the notification, then at block B220 the user communicates with the visitor through the user's client device 114 while audio and/or video data captured by the camera 104, the microphone 106, and/or other devices/sensors is streamed to the user's client device 114. At the end of the call, the user may terminate the connection between the user's client device 114 and the A/V device 102 and the session ends at block B220. In some embodiments, the audio and/or video data may be recorded and stored at a cloud server (block B216)

even if the user accepts the notification and communicates with the visitor through the user's client device 114.

Figure 3:
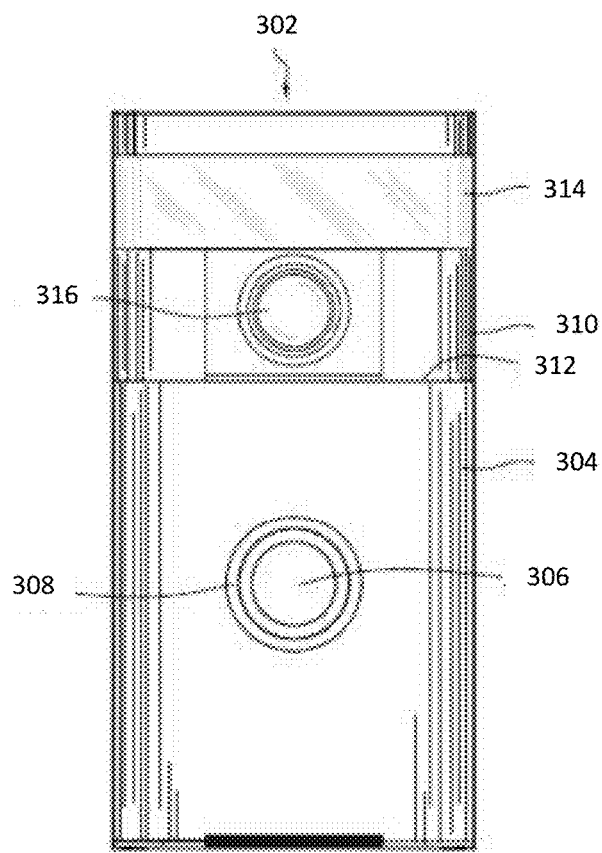
FIG. 3 is a front view of an example A/V recording and communication doorbell (A/V doorbell) according to various aspects of the present disclosure.
Figure 4:
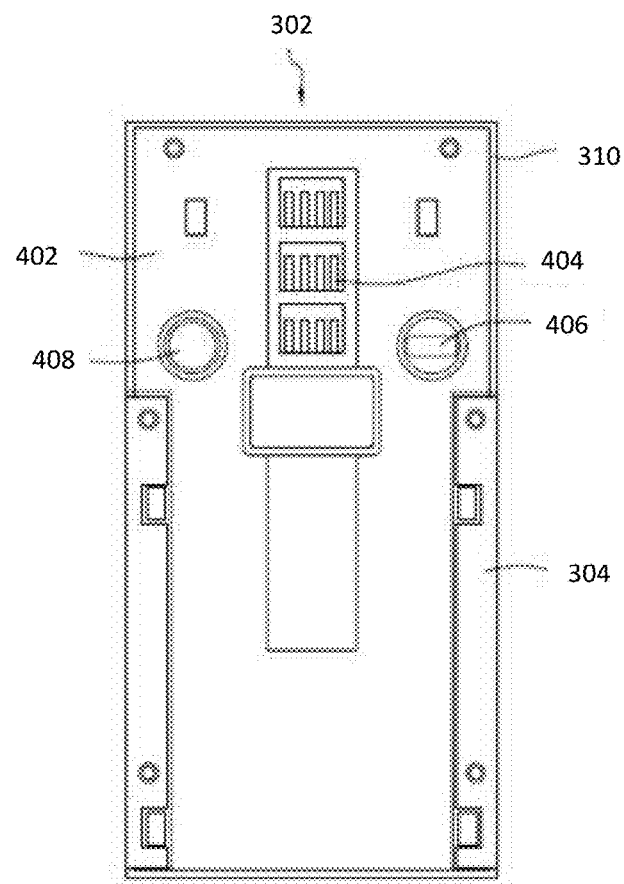
FIG. 4 is a rear view of the example A/V doorbell of FIG. 3.
Figure 5:
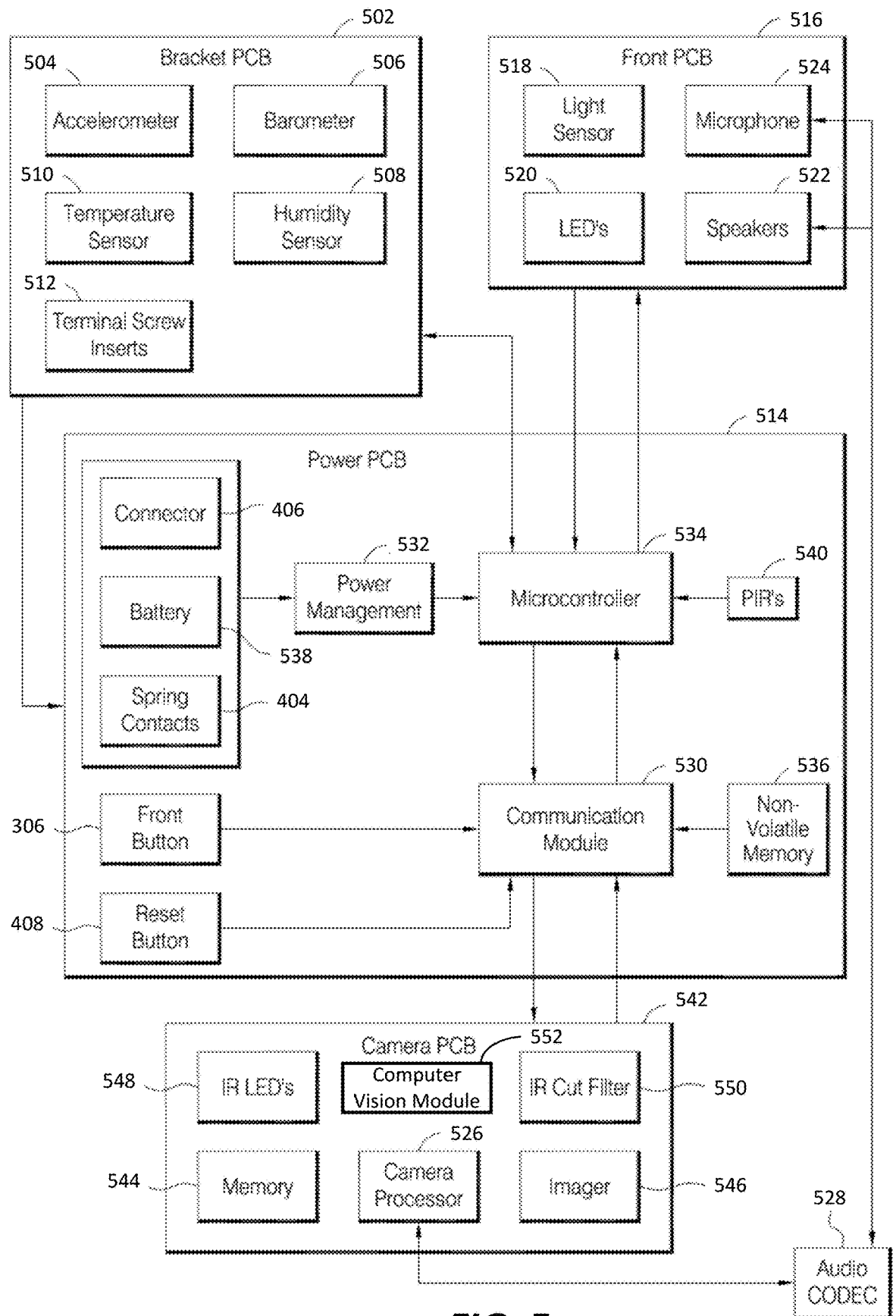
FIG. 5 is a functional block diagram of example components of the A/V doorbell of FIGS. 3 and 4.

FIGS. 3-5 illustrate an audio/video (A/V) communication doorbell 302 (also referred to a "doorbell 302" or "A/V doorbell 302") according to an aspect of present embodiments. FIG. 3 is a front view, FIG. 4 is a rear view, and FIG. 5 is a functional block diagram of the components within or in communication with the doorbell 302. With reference to FIG. 3, the doorbell 302 includes a faceplate 304 mounted to a back plate 402 (FIG. 4). The faceplate 304 may comprise any suitable material, including, without limitation, metals, such as brushed aluminum or stainless steel, metal alloys, or plastics. The faceplate 304 protects the internal contents of the doorbell 302 and serves as an exterior front surface of the doorbell 302.

With reference to FIG. 3, the faceplate 304 includes a button 306 and a light pipe 308. The button 306 and the light pipe 308 may have various profiles that may or may not match the profile of the faceplate 304. The light pipe 308 may comprise any suitable material, including, without limitation, transparent plastic, that is capable of allowing light produced within the doorbell 302 to pass through. The light may be produced by one or more light-emitting components, such as light-emitting diodes (LED's), contained within the doorbell 302, as further described below. The button 306 may make contact with a button actuator (not shown) located within the doorbell 302 when the button 306 is pressed by a visitor. When pressed, the button 306 may trigger one or more functions of the doorbell 302, as further described below.

With further reference to FIG. 3, the doorbell 302 further includes an enclosure 310 that engages the faceplate 304. In the illustrated embodiment, the enclosure 310 abuts an upper edge 312 of the faceplate 304, but in alternative embodiments one or more gaps between the enclosure 310 and the faceplate 304 may facilitate the passage of sound and/or light through the doorbell 302. The enclosure 310 may comprise any suitable material, but in some embodiments the material of the enclosure 310 preferably permits infrared light to pass through from inside the doorbell 302 to the environment and vice versa. The doorbell 302 further includes a lens 314. In some embodiments, the lens 314 may comprise a Fresnel lens, which may be patterned to deflect incoming light into one or more infrared sensors located within the doorbell 302. The doorbell 302 further includes a camera 316, which captures video data when activated, as described below.

FIG. 4 is a rear view of the doorbell 302, according to an aspect of the present embodiments. As illustrated, the enclosure 310 may extend from the front of the doorbell 302 around to the back thereof and may fit snugly around a lip of the back plate 402. The back plate 402 may comprise any suitable material, including, without limitation, metals, such as brushed aluminum or stainless steel, metal alloys, or plastics. The back plate 402 protects the internal contents of the doorbell 302 and serves as an exterior rear surface of the doorbell 302. The faceplate 304 may extend from the front of the doorbell 302 and at least partially wrap around the back plate 402, thereby allowing a coupled connection between the faceplate 304 and the back plate 402. The back plate 402 may have indentations in its structure to facilitate the coupling.

With further reference to FIG. 4, spring contacts 404 may provide power to the doorbell 302 when mated with other conductive contacts connected to a power source. The spring contacts 404 may comprise any suitable conductive material, including, without limitation, copper, and may be capable of deflecting when contacted by an inward force, for example the insertion of a mating element. The doorbell 302 further comprises a connector 406, such as a micro-USB or other connector, whereby power and/or data may be supplied to and from the components within the doorbell 302. A reset button 408 may be located on the back plate 402, and may make contact with a button actuator (not shown) located within the doorbell 302 when the reset button 408 is pressed. When the reset button 408 is pressed, it may trigger one or more functions, as described below.

FIG. 5 is a functional block diagram of the components within or in communication with the doorbell 302, according to an aspect of the present embodiments. A bracket PCB 502 may comprise an accelerometer 504, a barometer 506, a humidity sensor 508, and a temperature sensor 510. The accelerometer 504 may be one or more sensors capable of sensing motion and/or acceleration. The barometer 506 may be one or more sensors capable of determining the atmospheric pressure of the surrounding environment in which the bracket PCB 502 may be located. The humidity sensor 508 may be one or more sensors capable of determining the amount of moisture present in the atmospheric environment in which the bracket PCB 502 may be located. The temperature sensor 510 may be one or more sensors capable of determining the temperature of the ambient environment in which the bracket PCB 502 may be located. The bracket PCB 502 may be located outside the housing of the doorbell 302 so as to reduce interference from heat, pressure, moisture, and/or other stimuli generated by the internal components of the doorbell 302.

With further reference to FIG. 5, the bracket PCB 502 may further comprise terminal screw inserts 512, which may be configured to receive terminal screws (not shown) for transmitting power to electrical contacts on a mounting bracket (not shown). The bracket PCB 502 may be electrically and/or mechanically coupled to the power PCB 514 through the terminal screws, the terminal screw inserts 512, the spring contacts 404, and the electrical contacts. The terminal screws may receive electrical wires located at the surface to which the doorbell 302 is mounted, such as the wall of a building, so that the doorbell may receive electrical power from the building's electrical system. Upon the terminal screws being secured within the terminal screw inserts 512, power may be transferred to the bracket PCB 502, and to all of the components associated therewith, including the electrical contacts. The electrical contacts may transfer electrical power to the power PCB 514 by mating with the spring contacts 404.

With further reference to FIG. 5, the front PCB 516 may comprise a light sensor 518, one or more light-emitting components, such as LED's 520, one or more speakers 522, and a microphone 524. The light sensor 518 may be one or more sensors capable of detecting the level of ambient light of the surrounding environment in which the doorbell 302 may be located. LED's 520 may be one or more light-emitting diodes capable of producing visible light when supplied with power. The speakers 522 may be any electro-mechanical device capable of producing sound in response to an electrical signal input. The microphone 524 may be an acoustic-to-electric transducer or sensor capable of converting sound waves into an electrical signal. When activated, the LED's 520 may illuminate the light pipe 308 (FIG. 3). The front PCB 516 and all components thereof may be electrically coupled to the power PCB 514, thereby allowing data and/or power to be transferred to and from the power PCB 514 and the front PCB 516.

The speakers 522 and the microphone 524 may be coupled to the camera processor 526 through an audio CODEC 528. For example, the transfer of digital audio from the user's client device 114 and the speakers 522 and the microphone 524 may be compressed and decompressed using the audio CODEC 528, coupled to the camera processor 526. Once compressed by audio CODEC 528, digital audio data may be sent through the communication module 530 to the network 112, routed by the one or more servers 120, and delivered to the user's client device 114. When the user speaks, after being transferred through the network 112, digital audio data is decompressed by audio CODEC 528 and emitted to the visitor via the speakers 522.

With further reference to FIG. 5, the power PCB 514 may comprise a power management module 532, a microcontroller 534 (may also be referred to as "processor," "CPU," or "controller"), the communication module 530, and power PCB non-volatile memory 536. In certain embodiments, the power management module 532 may comprise an integrated circuit capable of arbitrating between multiple voltage rails, thereby selecting the source of power for the doorbell 302. The battery 538, the spring contacts 404, and/or the connector 406 may each provide power to the power management module 532. The power management module 532 may have separate power rails dedicated to the battery 538, the spring contacts 404, and the connector 406. In one aspect of the present disclosure, the power management module 532 may continuously draw power from the battery 538 to power the doorbell 302, while at the same time routing power from the spring contacts 404 and/or the connector 406 to the battery 538, thereby allowing the battery 538 to maintain a substantially constant level of charge. Alternatively, the power management module 532 may continuously draw power from the spring contacts 404 and/or the connector 406 to power the doorbell 302, while only drawing from the battery 538 when the power from the spring contacts 404 and/or the connector 406 is low or insufficient. Still further, the battery 538 may comprise the sole source of power for the doorbell 302. In such embodiments, the spring contacts 404 may not be connected to a source of power. When the battery 538 is depleted of its charge, it may be recharged, such as by connecting a power source to the connector 406. The power management module 532 may also serve as a conduit for data between the connector 406 and the microcontroller 534.

With further reference to FIG. 5, in certain embodiments the microcontroller 534 may comprise an integrated circuit including a processor core, memory, and programmable input/output peripherals. The microcontroller 534 may receive input signals, such as data and/or power, from the PIR sensors 540, the bracket PCB 502, the power management module 532, the light sensor 518, the microphone 524, and/or the communication module 530, and may perform various functions as further described below. When the microcontroller 534 is triggered by the PIR sensors 540, the microcontroller 534 may be triggered to perform one or more functions. When the light sensor 518 detects a low level of ambient light, the light sensor 518 may trigger the microcontroller 534 to enable "night vision," as further described below. The microcontroller 534 may also act as a conduit for data communicated between various components and the communication module 530.

With further reference to FIG. 5, the communication module 530 may comprise an integrated circuit including a processor core, memory, and programmable input/output peripherals. The communication module 530 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 530 may receive inputs, such as power and/or data, from the camera PCB 542, the microcontroller 534, the button 306, the reset button 408, and/or the power PCB non-volatile memory 536. When the button 306 is pressed, the communication module 530 may be triggered to perform one or more functions. For instance, the communication module 530 may transmit a signal to a separate device such that the separate device can issue an alert. In one embodiment, when the button 306 is pressed, a sound may be played at a signaling device, e.g., located inside the house. When the reset button 408 is pressed, the communication module 530 may be triggered to erase any data stored at the power PCB non-volatile memory 536 and/or at the camera PCB memory 544. The communication module 530 may also act as a conduit for data communicated between various components and the microcontroller 534. The power PCB non-volatile memory 536 may comprise flash memory configured to store and/or transmit data. For example, in certain embodiments the power PCB non-volatile memory 536 may comprise serial peripheral interface (SPI) flash memory.

With further reference to FIG. 5, the camera PCB 542 may comprise components that facilitate the operation of the camera 316. For example, an imager 546 may comprise a video recording sensor and/or a camera chip. In one aspect of the present disclosure, the imager 546 may comprise a complementary metal-oxide semiconductor (CMOS) array, and may be capable of recording high definition (e.g., 722p, 1080p, 4K, etc.) video files. A camera processor 526 may comprise an encoding and compression chip. In some embodiments, the camera processor 526 may comprise a bridge processor. The camera processor 526 may process video recorded by the imager 546 and audio recorded by the microphone 524, and may transform this data into a form suitable for wireless transfer by the communication module 530 to a network. The camera PCB memory 544 may comprise volatile memory that may be used when data is being buffered or encoded by the camera processor 526. For example, in certain embodiments the camera PCB memory 544 may comprise synchronous dynamic random access memory (SD RAM). IR LED's 548 may comprise light-emitting diodes capable of radiating infrared light. IR cut filter 550 may comprise a system that, when triggered, configures the imager 546 to see primarily infrared light as opposed to visible light. When the light sensor 518 detects a low level of ambient light (which may comprise a level that impedes the performance of the imager 546 in the visible spectrum), the IR LED's 548 may shine infrared light through the doorbell 302 enclosure out to the environment, and the IR cut filter 550 may enable the imager 546 to see this infrared light as it is reflected or refracted off of objects within the field of view of the doorbell. This process may provide the doorbell 302 with the "night vision" function mentioned above. As also shown in FIG. 5, the camera PCB 542 includes a computer vision module 552, which is described in greater detail below.

As discussed above, the present disclosure provides numerous examples of methods and systems including A/V doorbells, but the present embodiments are equally applicable for A/V devices other than doorbells. For example, the present embodiments may include one or more A/V recording and communication security cameras instead of, or in addition to, one or more A/V doorbells. An example A/V recording and communication security camera may include substantially all of the structure and functionality of the doorbell 302, but without the front button 306 and its associated components. An example A/V recording and communication security camera may further omit other components, such as, for example, the bracket PCB 502 and its associated components.

Figure 6:
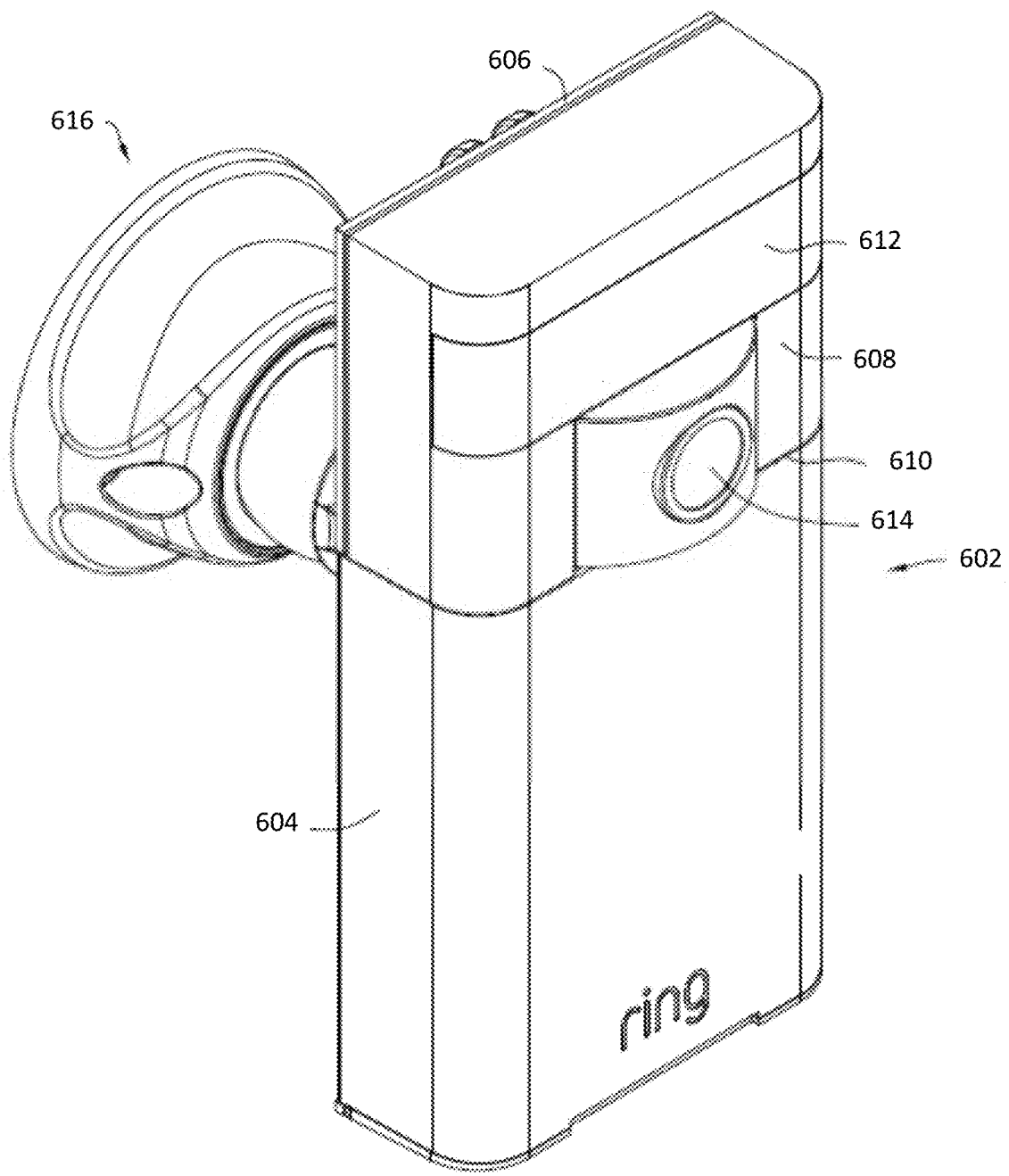
FIG. 6 is an upper front perspective view of an example A/V recording and communication security camera according to various aspects of the present disclosure.
Figure 7:
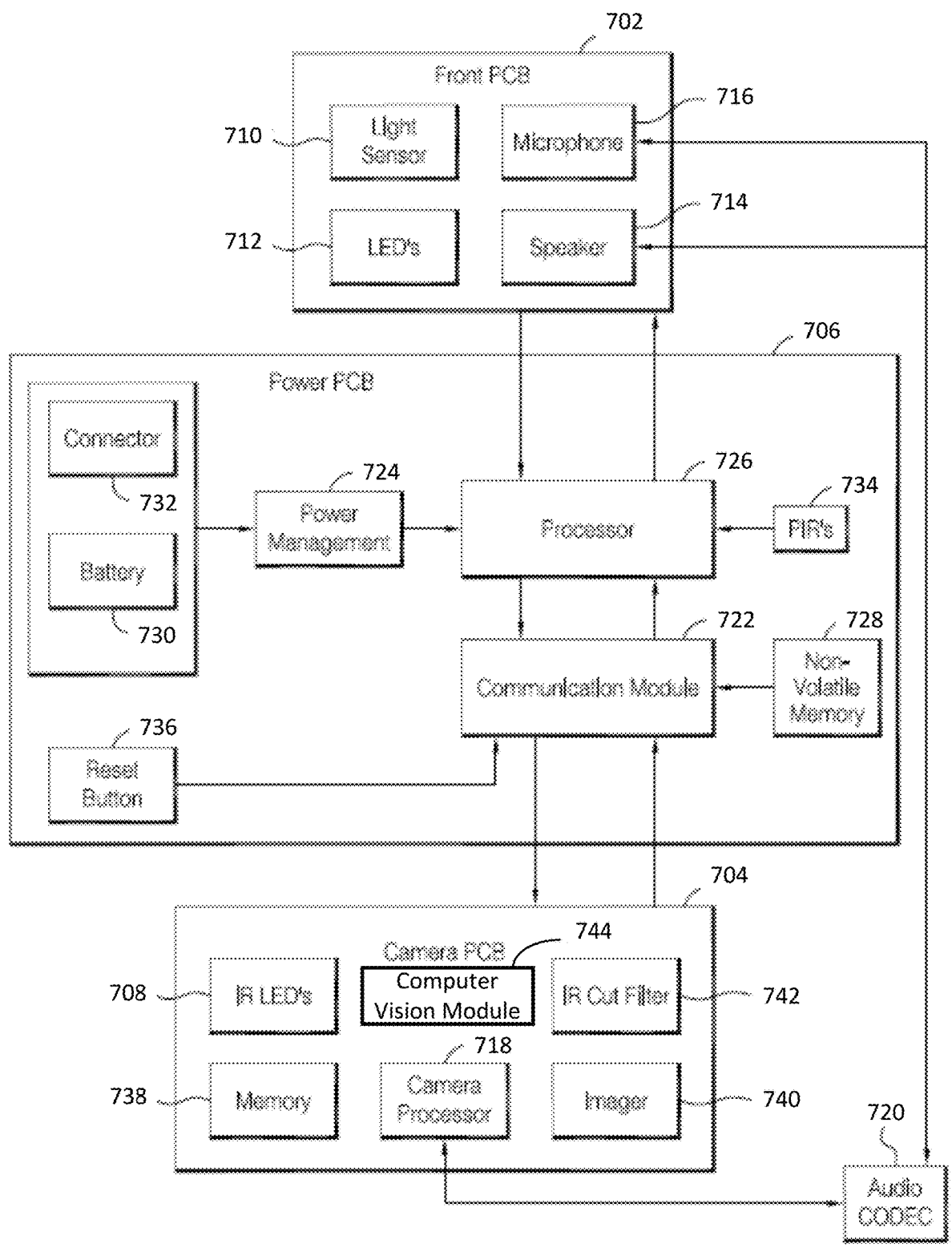
FIG. 7 is a functional block diagram of example components of the A/V recording and communication security camera of FIG. 6.

FIGS. 6 and 7 illustrate an example A/V recording and communication security camera according to various aspects of the present embodiments. With reference to FIG. 6, the security camera 602, similar to the A/V doorbell 302, includes a faceplate 604 that is mounted to a back plate 606 and an enclosure 608 that engages the faceplate 604. Collectively, the faceplate 304, the back plate 402, and the enclosure 310 form a housing that contains and protects the inner components of the security camera 602. However, unlike the A/V doorbell 302, the security camera 602 does not include any front button 306 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 6, the enclosure 608 engages the faceplate 604 and abuts an upper edge 610 of the faceplate 604. As discussed above with reference to FIG. 3, in alternative embodiments, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the A/V doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 6, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 may clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through the communication module 722 to the network 112, routed by one or more servers 120, and delivered to the user's client device 114. When the user speaks, after being transferred through the network 112, digital audio data is decompressed by audio CODEC 720 and emitted to the visitor via the speakers 714.

With continued reference to FIG. 7, the power PCB 706 comprises various components that enable the functionality of the power and device-control components, including a power management module 724, a processor 726 a communication module 722, and power PCB non-volatile memory 728. In certain embodiments, the power management module 724 may comprise an integrated circuit capable of arbitrating between multiple voltage rails, thereby selecting the source of power for the security camera 602. The battery 730 and/or the connector 406 may each provide power to the power management module 532. The power management module 724 (which may be similar to connector 406) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 7, in certain embodiments the processor 726 may comprise an integrated circuit including a processor core, memory, and programmable input/output peripherals. The processor 726 may receive input signals, such as data and/or power, from the PIR sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

With further reference to FIG. 7, the security camera 602 further comprises a communication module 722 coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 118, and/or the remote server 120, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, the reset button 736 (which may be similar to the reset button 408), and/or the power PCB non-volatile memory 728. When the reset button 736 is pressed, the communication module 722 may be triggered to erase any data stored at the power PCB non-volatile memory 728 and/or at the camera PCB memory 738. The communication module 722 may also act as a conduit for data communicated between various components and the processor 726. The power PCB non-volatile memory 728 may comprise flash memory configured to store and/or transmit data. For example, in certain embodiments the power PCB non-volatile memory 728 may comprise serial peripheral interface (SPI) flash memory.

With continued reference to FIG. 7, the power PCB 514 further comprises the connector 406 described above and a battery 538. The connector 406 may protrude outward from the power PCB 514 and extend through a hole in the back plate 402. The battery 538, which may be a rechargeable battery, may provide power to the components of the security camera 602.

With continued reference to FIG. 7, the power PCB 706 further comprises passive infrared (PIR) sensors 734, which may be secured on or within a PIR sensor holder (not shown) that resides behind the lens 612 (FIG. 6). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 7, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722p or better) video files. A camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile memory that may be used when data is being buffered or encoded by the camera processor 718. For example, in certain embodiments the camera PCB memory 738 may comprise synchronous dynamic random access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 8:
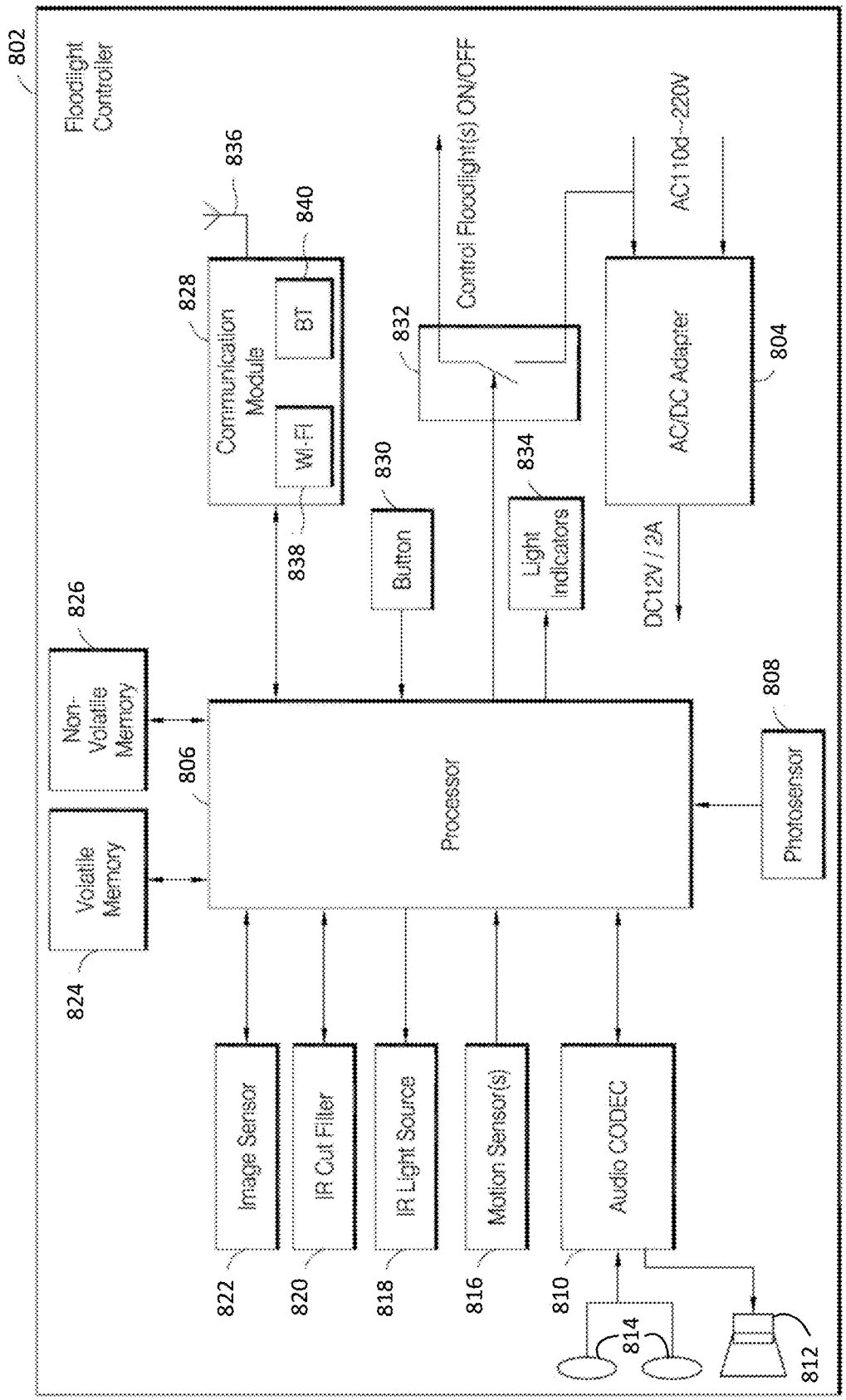
FIG. 8 is a functional block diagram of example components of a floodlight controller with A/V recording and communication features according to various aspects of the present disclosure.
Figure 9:
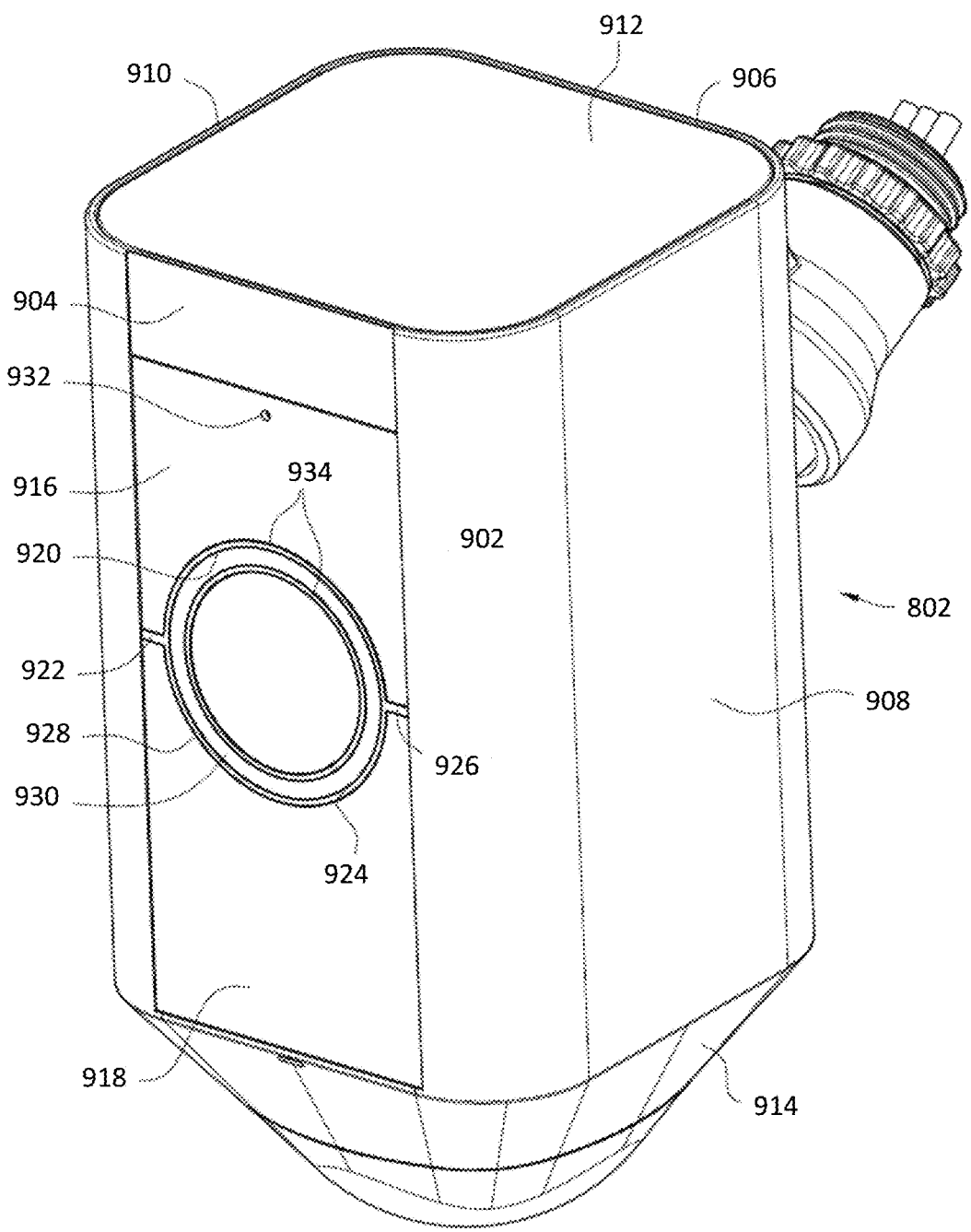
FIG. 9 is an upper front perspective view of an example floodlight controller with A/V recording and communication features according to various aspects of the present disclosure.
Figure 10:
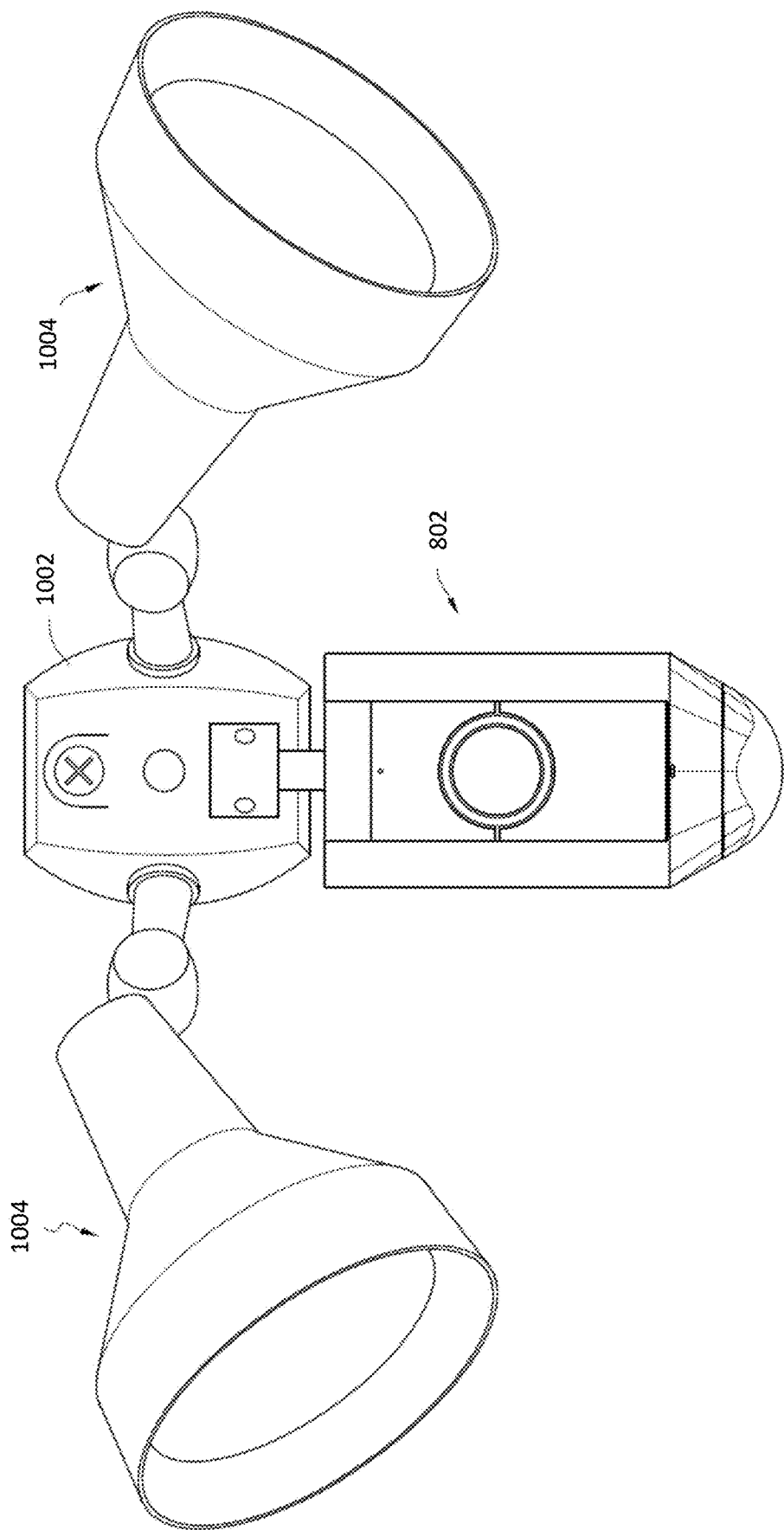
FIG. 10 is a front elevation view of the example floodlight controller with A/V recording and communication features of FIG. 9 in combination with a floodlight device according to various aspects of the present disclosure.

As discussed above, the present disclosure provides numerous examples of methods and systems including A/V doorbells, but the present embodiments are equally applicable for A/V devices other than doorbells. For example, the present embodiments may include one or more A/V recording and communication floodlight controllers instead of, or in addition to, one or more A/V doorbells. FIGS. 8-10 illustrate an example A/V recording and communication floodlight controller according to various aspects of the present embodiments. FIG. 8 is a functional block diagram illustrating various components of the floodlight controller 802 and their relationships to one another. For example, the floodlight controller 802 comprises an AC/DC adapter 804. The floodlight controller 802 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 804, which may convert the incoming AC power to DC (direct-current) and may step down the voltage from 110-220 VAC to a lower output voltage of about 12 VDC and an output current of about 2 A, for example. In various embodiments, the output of the AC/DC adapter 804 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 106), at least one motion sensor 816, an infrared (IR) light source 818, an IR cut filter 820, an image sensor 822 (may be a component of the camera 104, and may be referred to interchangeably as the camera 104), volatile memory 824, non-volatile memory 826, a communication module 828, a button 830, a switch 832 for controlling one or more floodlights, and a plurality of light indicators 834. Each of these components is described in detail below.

With further reference to FIG. 8, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 8, the volatile memory 824 and the non-volatile memory 826 are illustrated outside the box representing the processor 806. The embodiment illustrated in FIG. 8 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 8, the image sensor 822 (camera 104), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 8, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view. When the processor 806 is triggered by the motion sensor(s) 816, the processor 806 may perform one or more functions, as described below.

With further reference to FIG. 8, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 8 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 802 speaks, audio from the visitor (or intruder) is received by the microphones 814 and compressed by the audio CODEC 810. Digital audio data is then sent through the communication module 828 to the network 112 (FIG. 1) via the user's network 110, routed by the server 120 and/or the API 122, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 8, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold amount of time, it may trigger the erasing of any data stored at the volatile memory 824 and/or at the non-volatile memory 826, and/or may trigger a reboot of the processor 806.

With reference to FIG. 9, the floodlight controller 802 comprises a housing 902 for containing and protecting the interior components of the floodlight controller 802. The housing 902 includes a front wall 904, a rear wall 906, opposing side walls 908, 910, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover extends across and closes an outer open end of the light pipe 930. The upper shield 916, the lower grill 918, the light pipe 930, and the cover are all described in further detail below. The camera (not shown) is located in the circular opening 928 formed by the upper shield 916 and the lower grill 918, behind the cover, and is surrounded by the light pipe 930.

With reference to FIG. 8, the floodlight controller 802 further comprises the microphones 814. In the illustrated embodiment, a first one of the microphones 814 is located along the front of the floodlight controller 802 behind the upper shield 916 (FIG. 9) and a second one of the microphones 814 is located along the left side of the floodlight controller 802 behind the left-side wall 910 (FIG. 9) of the housing 902. Including two microphones that are spaced from one another and located on different sides of the floodlight controller 802 provides the illustrated embodiment of the floodlight controller 802 with advantageous noise cancelling and/or echo cancelling for clearer audio. The illustrated embodiment is, however, just one example and is not limiting. Alternative embodiments may only include one microphone 814, or include two microphones 814 in different locations than as illustrated in FIG. 8.

With reference to FIG. 9, the upper shield 916 may include a first microphone opening 932 located in front of the first microphone 814 to facilitate the passage of sound through the upper shield 916 so that sounds from the area about the floodlight controller 802 may reach the first microphone 814. The left-side wall 910 of the housing 902 may include a second microphone opening (not shown) located in front of the second microphone 814 that facilitates the passage of sound through the left-side wall 910 of the housing 902 so that sounds from the area about the floodlight controller 802 may reach the second microphone 814.

With further reference to FIG. 9, the floodlight controller 802 may further comprise a light barrier 934 surrounding inner and outer surfaces of the light pipe 930. The light barrier 934 may comprise a substantially opaque material that prevents the light generated by the light indicators 834 from bleeding into the interior spaces of the floodlight controller 802 around the light pipe 930. The light barrier 934 may comprise a resilient material, such as a plastic, which may also advantageously provide moisture sealing at the junctures between the light pipe 930 and the upper shield 916 and the lower grill 918. Portions of the light barrier 934 may also extend between the junctures between the upper shield 916 and the lower grill 918.

With further reference to FIG. 9, the floodlight controller 802 further comprises connecting hardware configured for connecting the floodlight controller 802 to a floodlight device 1002 (FIG. 10) and a power source (not shown). The floodlight controller 802 further comprises a plurality of wires for connecting the floodlight controller 802 to the power supply and to the floodlight(s) 1004 (FIG. 10) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that may be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V doorbell 302 may include a computer vision module 552. In addition, with reference to FIGS. 6-7, embodiments of the present security camera 602 may include a computer vision module 744. The computer vision module 552 may include any of the components (e.g., hardware) and/or functionality described herein with respect to computer vision, including, without limitation, one or more cameras, sensors, and/or processors. In some of the present embodiments, with reference to FIGS. 3-5, the microphone 524, the camera 316, and/or the imager 546 may be components of the computer vision module 552.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 552). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms may be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It may also identify a face from a range of viewing angles, including a profile view. Three-dimensional data points from a face vastly improve the precision of face recognition. 3D research is enhanced by the development of sophisticated sensors that do a better job of capturing 3D face imagery.

The sensors work by projecting structured light onto the face. Up to a dozen or more of these image sensors may be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is authorized to take certain actions with respect to a property or expensive item of collateral. For example, with reference to FIGS. 6-7, the computer vision module 744, and/or the camera 614 and/or the processor 726 may receive information about the person using any one, or any combination of more than one, of the foregoing biometrics.

As discussed above, the present embodiments provide security devices that are configurable to increase safety and to provide additional functionalities. One aspect of the present embodiments includes the realization that security systems and audio/video recording and communication devices (A/V devices), such as doorbells, floodlight controllers, and security cameras, can make neighborhoods safer. For example, audio and/or video captured by a wireless A/V devices can be uploaded to the cloud and recorded on a remote server. As another example, sensor data generated by sensors and/or automation devices of a security system can capture break-ins, perimeter breaches, and the like. Subsequent review of the audio, video, and/or sensor data may aid law enforcement in capturing perpetrators of home burglaries and other crimes. Further, the presence of one or more wireless A/V devices on the exterior of a home, such as a doorbell unit at the entrance to the home, acts as a powerful deterrent against would-be burglars. However, while security systems and A/V devices may increase safety at a single property, the presence and coordination of multiple devices in a geographic area (e.g., a block, a street, a neighborhood, a town, a city, etc.) may increase safety for that geographic area, as well as surrounding areas. For example, by associating A/V devices from different homes, a neighborhood may be safer, and law enforcement may better investigate crimes with footage from multiple A/V devices and/or with sensor data generated by multiple security systems located throughout the geographic area.

The present embodiments solve this problem by, for example, transferring components of a security system (e.g., a hub device, sensors, automation devices, etc.) and/or A/V devices to other parties for installation at structures such as homes. The parties to which the devices are distributed may be people and/or businesses in the construction trade, such as homebuilders, contractors, and/or subcontractors. These parties may then install the devices at structures they are building, renovating, remodeling, etc. When the devices are distributed and/or installed, they may be in a pre-activation mode in which the devices have limited functionality. For example, if the devices are video doorbells, they may be capable of functioning like traditional doorbells whereby they may sound a signaling device (such as a doorbell) when the front button on the doorbell is pressed (or when movement in a field of view of a sensor of the doorbell is sensed.) However, components of the doorbell may be deactivated or disabled in the pre-activation mode. For example, a camera of the doorbell may be disabled in the pre-activation mode, or image data captured by the camera may be viewable only as a live stream, e.g., the image data is not stored, or the A/V device may not be configured to communicate with additional A/V devices or other devices via one or more networks. For a security system, the sensors and/or automation devices may not be activated, such that sensor data is either not generated and/or ignored by the hub device of the security system. In any example, the one or more components of the security systems (e.g., signaling devices including hub device functionality) and/or the A/V devices may act as base stations and/or nodes for a wide area network (e.g., a low power wide are network (LPWAN)) when in the pre-activation and/or activated mode. As such, the security system and/or the A/V devices may create a wide area network for the geographic area that may enable additional functionality, such as tracking of persons, objects, and/or animals within the geographic area, transmitting and/or receiving data between the security systems and/or the A/V devices across the wide area network, etc. As a result, even when in the pre-activation mode, the security systems and/or A/V devices may increase the safety of the geographic area by helping to enable communications across the wide area network. At any time, the homeowner (or renter or other occupant) may subsequently desire to activate the A/V device(s) and/or security systems, to enable additional functionalities (such as recording image data and audio data, activating one or more sensors and/or automation devices of a security system, etc.). Accordingly, in aspects of this disclosure, the prevalence of A/V devices and/or security systems in geographic areas is increased, a network is created for communication within the geographic areas, and residents of properties within the geographic areas are able to activate pre-installed security systems and/or A/V devices, thereby resulting in enhancing the safety and security of the residents property, family, and pets, as well as the safety and security of the geographic area.

Another aspect of the present embodiments includes the realization that pre-installation of security systems requires a hard-wired connection in order to include the security system as part of a homeowner's insurance policy. However, homeowners may not desire to have a security system installed (e.g., because they are unattractive, they live in a safe neighborhood, they can't afford the monitoring, etc.). As a result, many security systems are sold aftermarket. However, aftermarket security systems often require an installation process that may be costly, require running wires around the home, and/or require some level of destruction (e.g., putting holes in walls in order to property install the security system components).

The present embodiments solve this problem by, for example, transferring signaling devices that include functionality for a hub device of a security system for installation within homes during construction, remodel, etc. Each home that includes a doorbell traditionally includes a standard signaling device, and signaling devices may be digital or mechanical, and are often hard-wired and located in a central location of the property. The signaling device that includes the hub device functionality may, when in a pre-activation mode, perform as a standard signaling device (e.g., output a sound in response to an input to a doorbell). In an activated mode, the signaling device may communicate with one or more sensors (e.g., door/window sensors, motion sensors, flood sensors, etc.), automation devices (e.g., lighting systems, sprinkler systems, home entertainment systems, etc.), A/V devices (e.g., security cameras, floodlight controllers, etc.), client devices, and/or backend devices. As a result, residents of a property may have, pre-installed, not appearing out of place (e.g., because standard signaling devices are already traditionally installed in homes), and centrally located within the home, hub device functionality for controlling a security system (and/or home automation systems). In addition, because the signaling device with hub device functionality is hard-wired, if the resident chooses to activate the security system, the security system may be included in the homeowner's insurance. As another benefit, similar to the benefits described above, the signaling device may include base station functionality for broadcasting and communicating over a wide area network (e.g., an LPWAN) when in a pre-activated and/or activated mode, thereby enabling additional security for the resident as well as the surrounding geographic area.

Figure 11:
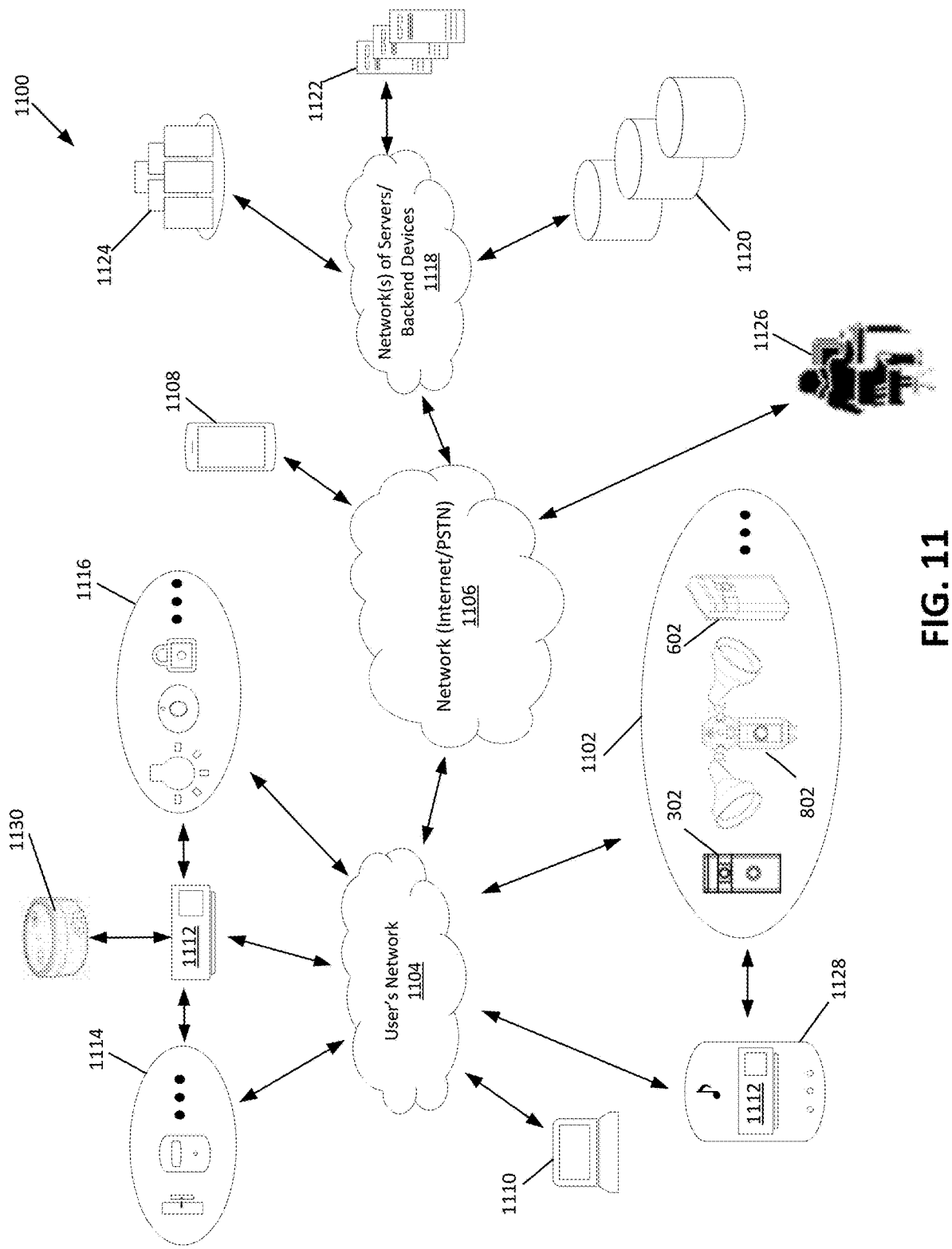
FIG. 11 is a functional block diagram illustrating an example system for communicating in a network according to various aspects of the present disclosure.

FIG. 11 is a functional block diagram illustrating a system 1100 for communicating in a network according to various aspects of the present disclosure. The system 1100 may include one or more A/V devices 1102 configured to access a user's network 1104 (which may correspond to the user's network 110) to connect to a network (Internet/PSTN) 1106 (in some embodiments, the devices 1102 may be configured to connect directly to the network (Internet/PSTN) 1106, such as over a cellular connection). The one or more A/V devices 1102 may include any or all of the components and/or functionality of the A/V device 102 (FIGS. 1-2), the A/V doorbell 302 (FIGS. 3-5), the security camera 602 (FIGS. 6-7), and/or the floodlight controller 802 (FIGS. 8-10).

The user's network 1104 may include any or all of the components and/or functionality of the user's network 110 described herein. The system 1100 may also include one or more client devices 1108, 1110 (alternatively referred to herein as a "client device 1108, 1110"), which in various embodiments may be configured to be in network communication and/or associated with the A/V device 1102. The client devices 1108, 1110 may comprise, for example, a mobile phone such as a smartphone, or a computing device such as a tablet computer, a laptop computer, a desktop computer, etc. The client devices 1108, 1110 may include any or all of the components and/or functionality of the client device 114 (FIG. 1) and/or the client device 2202 (FIG. 22) described herein. In some embodiments, one or more of the client devices 1108, 1110 may not be associated with the A/V device 1102. Additional details of example client devices 1108, 1110 are shown in the schematic block diagram of FIG. 15.

The system 1100 may further include a smart-home hub device 1112 (which may alternatively be referred to herein as the hub device 1112) connected to the user's network 1104. The smart-home hub device 1112 (also known as a home automation hub, gateway device, etc.), may comprise any device that facilitates communication with and control of the sensors 1114, automation devices 1116, and/or the one or more A/V devices 1102. For example, the smart-home hub device 1112 may be a component of a home automation system installed at a property. In some embodiments, the A/V devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V devices 1102, the sensors 1114, and/or the automation devices 1116 may, in addition to or in lieu of communicating with the smart-home hub device 1112, communicate with the client devices 1108, 1110 and/or one or more of the components of the network of servers/backend devices 1118 directly and/or indirectly via the user's network 1104 and/or the network (Internet/PSTN) 1106. In some embodiments, as described herein, the functionality of the hub device 1112 may be included within an electronic device, such as a signaling device 1128 or a virtual assistant (VA) device 1130.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, a virtual assistant (VA) device 1140, the A/V devices 1102, etc.), when remotely monitored and controlled via the network (Internet/PSTN) 1106, may be considered to be components of the Internet of Things. Smart home systems may include switches and/or sensors (e.g., the sensors 1114) connected to a central hub such as the smart-home hub device 1112 and/or the VA device 1130 (the hub device 1112 and/or the VA device 1130 may alternatively be referred to as a gateway, a controller, a home-automation hub, or an intelligent personal assistance device) from which the system may be controlled through various user interfaces, such as voice commands and/or a touchscreen. The user interface may include any or all of a wall-mounted terminal (e.g., a keypad, a touchscreen, etc.), software installed on the client devices 1108, 1110 (e.g., a mobile application), a tablet computer or a web interface, often but not always via Internet cloud services. Furthermore, these user interfaces are often but not always supported by Internet cloud services. In one example, the Internet cloud services are responsible for obtaining user input via the user interfaces (e.g., a user interface of the hub device 1112 and/or the VA device 1130) and causing the smart home devices (e.g., the sensors 1114, the automation devices 1116, etc.) to perform an operation in response to the user input.

The hub device 1112, the VA device 1130, the sensors 1114, the automation devices 1116, the A/V recording and communication may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

As illustrated in FIG. 11, the system 1100 includes the VA device 1130. The VA device 1130 may be connected to the user's network 1104 and/or the network (Internet/PSTN) 1106. The VA device 1130 may include an intelligent personal assistant, such as, without limitation, Amazon Alexa® and/or Apple Siri®. For example, the VA device 1130 may be configured to receive voice commands, process the voice commands to determine one or more actions and/or responses (e.g., transmit the voice commands to the one or more components of the network of servers/backend devices 1118 for processing), and perform the one or more actions and/or responses, such as to activate and/or change the status of one or more of the sensors 1114, automation devices 1116, and/or A/V devices 1102. In some embodiments, the VA device 1130 is configured to process user inputs (e.g., voice commands) without transmitting information to the network of servers/backend devices 1118 for processing. The VA device 1130 may include at least one speaker (e.g., for playing music, for outputting the audio data generated by the A/V devices 1102, for outputting the voice of a digital assistant, etc.), at least one microphone (e.g., for receiving commands, for recording audio data, etc.), and a display (e.g., for displaying a user interface, for displaying the image data generated by the A/V devices 1102, etc.). In various embodiments, the VA device 1130 may include an array of speakers that are able to produce beams of sound. Although illustrated as a separate component in FIG. 11, in some embodiments the VA device 1130 may not be a separate component from the hub device 1112 and/or from the signaling device 1128. In such embodiments, the hub device 1112 and/or the signaling device 1128 may include the functionality of the VA device 1130 or the VA device 1130 may include the functionality of the hub device 1112 and/or the signaling device 1128.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), a signaling device 1128, an irrigation control system, a wireless signal range extender (e.g., a Wi-Fi range extender, a Z-Wave range extender, etc.), a traditional doorbell signaling device, a barrier control device (e.g., an automated door hinge), a smart doormat, and/or other automation devices.

As described herein, in some of the present embodiments, some or all of the user's network 1104, the client devices 1108, 1110, the A/V device 1102, the smart-home hub device 1112, the sensors 1114, the signaling devices 1128, and the automation devices 1116 may be referred to as a security system, which may be installed at a property, premises, or site.

With further reference to FIG. 11, the system 1100 may also include various backend devices such as (but not limited to) storage devices 1120, server 1122, and backend APIs 1124 that may be in network communication (e.g., over the user's network 1104 and/or the network (Internet/PSTN) 1106) with the A/V devices 1102, the hub device 1112, the client devices 1108, 1110, the sensors 1114, the barrier control devices 1128, and/or the automation devices 1116. In some embodiments, the storage devices 1120 may be a separate device from the server 1122 (as illustrated) or may be an integral component of the server 1122. The storage devices 1120 may be similar in structure and/or function to the storage device 118 (FIG. 1). In addition, in some embodiments, the server 1122 and backend APIs 1124 may be similar in structure and/or function to the server 120 and the backend API 122 (FIG. 1), respectively.

With further reference to FIG. 11, the system 1100 may also include a security monitoring service 1126. The security monitoring service 1126 may be operated by the same company that manufactures, sells, and/or distributes the A/V devices 1102, the hub device 1112, the sensors 1114, the signaling devices 1128, and/or the automation devices 1116. In other embodiments, the security monitoring service 1126 may be operated by a third-party company (e.g., a different company than the one that manufactured, sold, and/or distributed the A/V devices 1102, the hub device 1112, the sensors 1114, the automation devices 1116, and/or barrier control devices 1128). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114, the automation devices 1116, the hub device 1112, the A/V devices 1102, and/or the signaling devices 1128. For example, the security monitoring service 1126 may operate and control their own client devices and/or network of servers/backend devices for monitoring and/or controlling security systems. In such an example, the A/V devices 1102, the hub device 1112, the sensors 1114, the signaling devices 1128, and/or the automation devices 1116 may communicate with the client devices 1108, 1110 and/or one or more components of the network of servers/backend devices of the security monitoring service 1126 over the network (Internet/PSTN) 1106 (in some embodiments, via one or more of the components of the network of servers/backend devices 1118).

The system 1100 may also include one or more client devices 1108, 1110, which in various embodiments may be configured to be in network communication and/or associated with the A/V device 1102, the hub device 1112, the automation devices 1116, the signaling devices 1128, and/or the sensors 1114. The client devices 1108, 1110 may comprise, for example, a mobile phone such as a smartphone, or a computing device such as a tablet computer, a laptop computer, a desktop computer, etc. In some embodiments, the client device 1108, 1110 may include a connected device, such as a smart watch, Bluetooth headphones, another wearable device, or the like. In such embodiments, the client device 1108, 1110 may include a combination of the smartphone or other device and a connected device (e.g., a wearable device), such that alerts, data, and/or information received by the smartphone or other device are forwarded to the connected device, and one or more controls of the smartphone or other device may be input using the connected device (e.g., by touch, voice, etc.). The client devices 1108, 1110 may include any or all of the components and/or functionality of the client device 114 (FIG. 1) and/or the client device 2802 (FIG. 28) described herein. In some embodiments, one or more of the client devices 1108, 1110 may not be associated with the A/V device 1102.

The system 1100 may further include a signaling device 1128 in communication with one or more of the A/V devices 1102. For example, the signaling device 1128 may be configured for installation inside a house or other structure (e.g., a hard-wired installation), and may be in wired or wireless communication with one or more of the A/V devices 1102 installed outside the house/structure. Alternatively, or additionally, the signaling device 1128 may be in communication with the one or more A/V devices 1102 via the user's network 1104. Alternatively, or additionally, the signaling device 1128 may be in communication (e.g. wired or wirelessly) with a traditional doorbell (e.g., a doorbell button with no A/V capability). In some implementations, the signaling device 1128 may be configured to emit an audible sound in response to receiving a signal from one or more of the A/V devices 1102 and/or traditional doorbells. For example, the signaling device 1128 may emit an audible sound in response to the button 306 of the A/V doorbell 302 and/or a button of the traditional doorbell being pressed. In other implementations, the signaling device 1128 may be in direct or indirect communication with one or more of the hub device 1112, the A/V device(s) 1102, the sensors 1114, and/or the automation devices 1116.

In still further implementations, and as illustrated in FIG. 11, the hub device 1112 may be integrated into the signaling device 1128. For example, when the signaling device 1128 includes the hub device 1112, installing the signaling device 1128 may obviate the need to install a separate hub device 1112 at a later date. In addition, by including the hub device 1112 functionality within the signaling device 1128, and hard-wiring the signaling device 1128, the resident/occupant may be able to claim the security system on his or her renter's and/or homeowner's insurance. Also, because traditional doorbell signaling devices are often centrally located within the home (e.g., so that the sound output by the signaling device is audible throughout the home), and because homeowners, home buyers, and/or renters are accustomed to signaling devices located within homes, the signaling device 1128 that includes the hub device 1112 functionality may be more capable of effectively communicating with sensors 1114, automation devices 1116, A/V devices 1102, and/or routers (e.g., because the signaling device 1128 is centrally located), and, should the resident choose not to utilize the hub device 1112 functionality (e.g., the resident does not activate the signaling device 1128, so the signaling device 1128 may only operate as at traditional doorbell signaling device) the resident may not be turned off to the appearance and/or location of the signaling device 1128 (e.g., because they may be accustomed to the presence of a signaling device within the home).

As described herein, one or more of the A/V devices 1102, the hub device 1112, and/or the signaling device 1128 may be configurable to operate in multiple modes, including a pre-activation mode and an activated mode. For example, in the pre-activation mode, the A/V devices 1102, the hub device 1112, and/or the signaling device 1128, may have limited functionality relative to the activated mode. By way of non-limiting example, an A/V doorbell 302 in the pre-activation mode may transmit signals indicative of the button 308 being pressed to the signaling device 1128 (and/or a traditional signaling device and/or a Wi-Fi signaling device) such that the signaling device 1128 will emit an audible sound. The same A/V doorbell 302, in the activated mode, may additionally capture and send image data 1224 to the hub device 1112 (which may be an integral part of the signaling device 1128), to the server 1122, and/or to the client devices 1108, 1110. In some examples, the A/V device 1102, when in the pre-activation mode, may generate and transmit the image data 1224, the audio data 1226, the text data 1232, the user alerts 1234 to the client devices 1108, 1110 (in some embodiments, via the hub device 1112, the signaling device 1128, and/or the server 1122), such that the image data 1224, the audio data 1226, the text data 1232, the user alerts 1234 may only be viewed as live or near-live (e.g., due to latency) streaming data. However, when in the activated mode, the image data 1224, the audio data 1226, the text data 1232, the user alerts 1234 may be transmitted to the client devices 1108, 1110 (in some embodiments, via the hub device 1112, the signaling device 1128, and/or the server 1122) as live or near-live streaming data, and/or may be stored on the A/V device 1102, the hub device 1112, the signaling device 1128, and/or the server 1122 for future access by the client devices 1108, 1110 (e.g., as part of a cloud storage plan).

Similarly, the hub device 1112 and/or the signaling device 1128 that includes the hub device 1112 functionality, in the pre-activation mode, may receive signals from the button of a traditional doorbell and/or an A/V doorbell 302, and/or receive and/or forward image data 1224, motion data 1230, audio data 1226, or the like, to the client device 1108, 1110 (in some embodiments, via the server 1122) to be viewed (e.g., streamed) as live or near-live data. In the activated mode, the hub device 1112 and/or the signaling device 1128 may cause the data to be stored, e.g., locally and/or by one or more of the devices of the network of servers/backend devices 1118. In addition, once in the activated mode, the hub device 1112 and/or the signaling device 1128 may activate one or more additional communication modules (antennas, transceivers, etc.) and connect to and communicate with one or more additional devices, such as the sensors 1114, the automation devices 1116, and/or the A/V devices 1102. For example, and without limitation, upon being activated, the hub device 1112, and/or the signaling device 1128 may connect to (e.g., via a wired and/or wireless connection) one or more of the sensors 1114, the automation devices 1116, and/or the A/V devices 1102 that make up a security system. In addition, the hub device 1112 and/or the signaling device 1128, in the activated mode, may communicate with the server 1122 and/or the client devices 1108, 1110, such that users of the client devices 1108, 1110 (e.g., using the device application 1518) may be able to locally and/or remotely control the security system (e.g., for set-up, access, arming/disarming, etc.). In some embodiments, once in the activated mode, the hub device 1112 and/or the signaling device 1128 may be configured to be controlled by one or more input devices, such as keypads, voice input from a microphone, etc. In addition, in the activated mode, the hub device 1112 and/or the signaling device 1128 may be configured to be accessed, controlled, and/or in communication with the security monitoring service 1126.

In some examples, the hub device 1112, the signaling device 1128, and/or the A/V devices 1102 may broadcast (e.g., operate as a base station for) and/or communicate across (e.g., when operating as a base station, a node, etc.) a network when in the pre-activation and/or the activated mode. The network may be a wide area network (WAN), and more specifically may be a low power wide area network (LPWAN). In such examples, the hub devices 1112, the signaling devices 1128, and/or the A/V devices 1102 may be transferred for installation and installed (e.g., by homebuilders, construction workers, developers, etc.), purchased and installed (e.g., by property owners, renters, etc.), and/or otherwise installed within a geographic area (and within a proximity to one another) such that the network covers the geographic area (e.g., allows communication across and access to the network within the geographic area).

Figure 12:
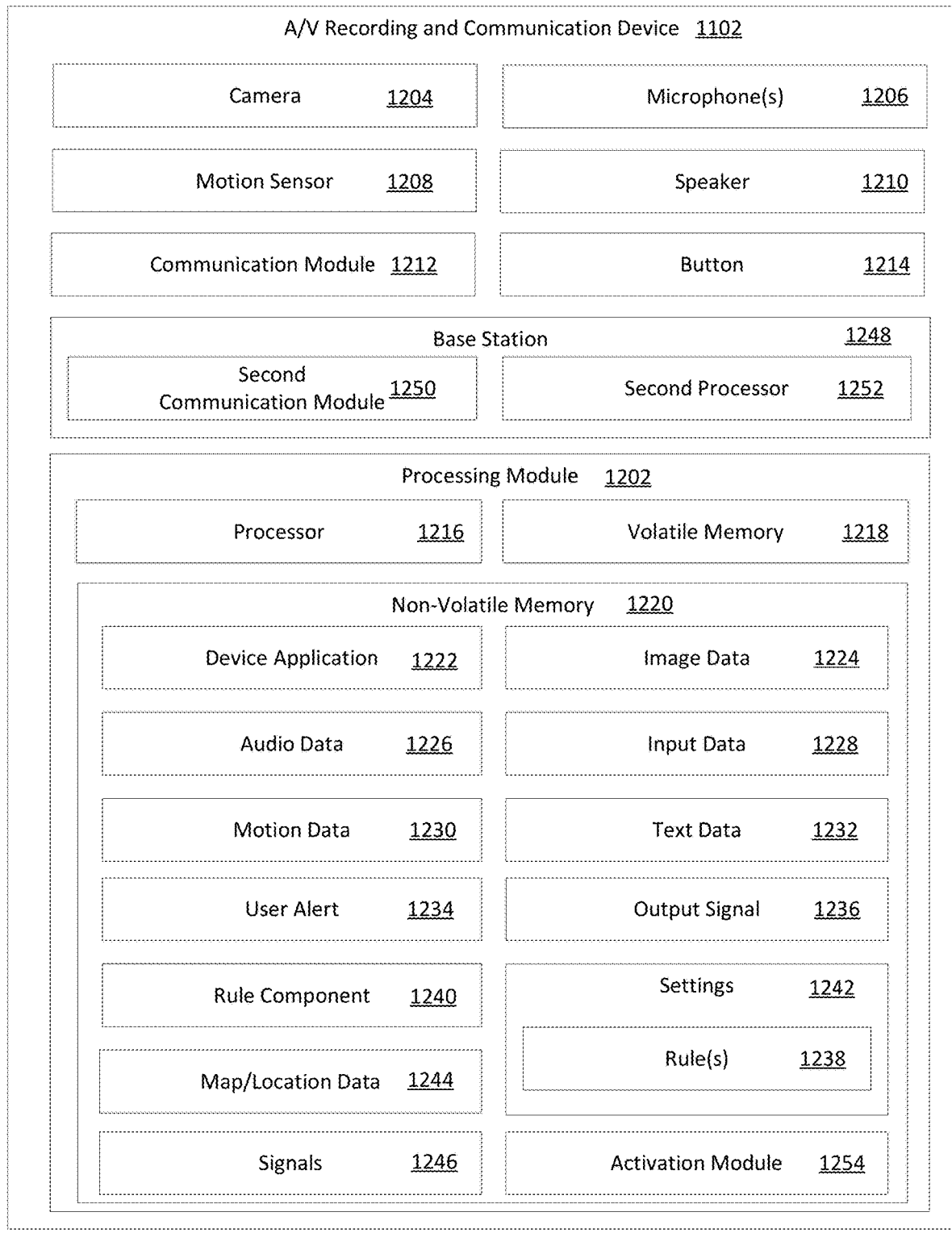
FIG. 12 is a functional block diagram illustrating one example embodiment of an A/V device according to various aspects of the present disclosure.

FIG. 12 is a functional block diagram illustrating an embodiment of an A/V device 1102 according to various aspects of the present disclosure. In some embodiments, the A/V device 1102 may represent, and further include one or more of the components from, the A/V doorbell 302, the A/V recording and communication security camera 602, and/or the floodlight controller 802. Additionally, in some embodiments, the A/V device 1102 may omit one or more of the components shown in FIG. 12 and/or may include one or more additional components not shown in FIG. 12.

The A/V device 1102 may comprise a processing module 1202 that is operatively connected to a camera 1204, microphone(s) 1206, a motion sensor 1208, a speaker 1210, a communication module 1212, and a button 1214 (in embodiments where the A/V device 1102 is a doorbell, such as the A/V doorbell 302). The processing module 1202 may comprise a processor 1216, volatile memory 1218, and non-volatile memory 1220, which may include a device application 1222. In various embodiments, the device application 1222 may configure the processor 1216 to capture image data 1224 using the camera 1204, audio data 1226 using the microphone(s) 1206, input data 1228 using the button 1214 (in embodiments where the A/V device 1102 is a doorbell), input data 1228 using the camera 1204 and/or the motion sensor 1208, and/or motion data 1230 using the camera 1204 and/or the motion sensor 1208. In some embodiments, the device application 1222 may also configure the processor 1216 to generate text data 1232 describing the image data 1224, the audio data 1226, and/or the input data 1228, such as in the form of metadata, for example.

In addition, the device application 1222 may configure the processor 1216 to transmit the image data 1224, the audio data 1226, the motion data 1230, the input data 1228, the text data 1232, and/or a user alert 1234 to the client devices 1108, 1110, the hub device 1112, the server 1122 and/or the signaling device 1128 using the communication module 1212. In various embodiments, the device application 1222 may also configure the processor 1216 to generate and transmit an output signal 1236 that may include the image data 1224, the audio data 1226, the text data 1232, the input data 1228, and/or the motion data 1230. In some of the present embodiments, the output signal 1236 may be transmitted to the server 1122 and/or the hub device 1112 using the communication module 1212, and the server 1122 and/or the hub device 1112 may transmit (or forward) the output signal 1236 to the client devices 1108, 1110 and/or the server 1122 may transmit the output signal 1236 to the hub device 1112. In other embodiments, the output signal 1236 may be transmitted directly to the client devices 1108, 1110 and/or the hub device 1112. Additionally, in some of the present embodiments, the device application 1222 may also configure the processor 1216 to receive (or transmit, in some instances) one or more rules 1238 (hereinafter "the rule 1238") regarding operation of various components of the A/V device 1102, user alerts 1234, and/or output signals 1236 (as described in greater detail below) from the hub device 1112, the signaling device 1128, the server 1122, and/or the client devices 1108, 1110 using the communication module 1212.

In further reference to FIG. 12, the image data 1224 may comprise image sensor data such as (but not limited to) exposure values and data regarding pixel values for a particular sized grid. The image data 1224 may include still images, live video, and/or pre-recorded images and/or video. The image data 1224 may be recorded by the camera 1204 in a field of view of the camera 1204.

In further reference to FIG. 12, the motion data 1230 may comprise motion sensor data generated in response to motion events. For example, the motion data 1230 may include an amount or level of a data type generated by the motion sensor 1208 (e.g., the voltage level output by the motion sensor 1208 when the motion sensor 1208 is a PIR type motion sensor). In some of the present embodiments, such as those where the A/V device 1102 does not include the motion sensor 1208, the motion data 1230 may be generated by the camera 1204. In such embodiments, based on a frame by frame comparison of changes in the pixels from the image data 1124, it may be determined that motion is present.

The input data 1228 may include data generated in response to an input to the button 1214. The button 1214 (which may include similar design and functionality to that of the front button 306 (FIG. 3)) may receive an input (e.g., a press, a touch, a series of touches and/or presses, etc.) and may generate the input data 1228 in response that is indicative of the type of input. In embodiments where the A/V device 1102 is not a doorbell, the A/V device 1102 may not include the button 1214, and the A/V device 1102 may not generate the input data 1228 (or may generate the input data 1228 by a different method, such as by using the camera 1204 and computer vision processing, for example).

With further reference to FIG. 12, a user alert 1234 may be generated by the processor 1216 and transmitted, using the communication module 1212, to the client devices 1108, 1110, the server 1122, the hub device 1112, and/or the signaling device 1128 (which may include the hub device 1112 functionality). For example, in response to detecting motion using the camera 1204 and/or the motion sensor 1208, the A/V device 1102 may generate and transmit the user alert 1234. In some of the present embodiments, the user alert 1234 may include at least the image data 1224, the audio data 1126, the text data 1232, the motion data 1230, and/or map/location data 1244. The map/location data 1244 may include a map of the site (e.g., floor plan, building plan, site map, etc.) and/or a location of the A/V device 1102 within the site. The map/location data 1244 may additionally or alternatively include locations of one or more objects (e.g., entities, barriers, etc.) that are within a field of view of, or are otherwise known to, the A/V device 1102.

As described herein, at least some of the processes of the hub device 1112, the server 1122, the signaling device 1128, and/or the client device 1108, 1110 may be performed by the A/V device 1102. In some embodiments, without limitation, the A/V device 1102 may receive, using the communication module 1212, the rule 1238 from the hub device 1112, the signaling device 1128, the server 1122, and/or the client device 1108, 1110. In other embodiments, the rule 1238 may be generated by the A/V device 1102, such as by a rule component 1240. In any example, the rule component 1240 may update settings 1242 based on the rule 1238. For example, the A/V device 1102 may implement the settings 1242, and the settings 1242 may be based on the activation state of the A/V device 1102. For example, in a pre-activation mode, the A/V device 1102 may implement the settings 1242 to disable one or more functionalities and/or components of the A/V device 1102. For example, the rule 1238 may indicate to generate the user alert 1234 and/or output signal 1236, e.g. when a person presses the button 1214 or an object is detected in a field of view. Upon generation, the user alert 1234 and/or the output signal 1236 may be transmitted to the signaling device 1128 (and/or a traditional signaling device), which outputs a sound indicating the user input/object detection. In embodiments of this disclosure, in the pre-activation mode, no further action may be taken. In contrast, in the activated mode, the rule 1238 may indicate to capture the image data 1224 and/or the audio data 1226 and/or to transmit the image data 1224, the audio data 1226, the user alert 1234, and/or the output signal 1238 to one or more additional devices, as to the client device 1108, 1110, the hub device 1112, the server 1122, and/or the signaling device 1128 using the communication module 1212. Moreover, in the pre-activation mode, the A/V device 1102 may implement the settings 1242 to refrain from using one or more components, such as to refrain from using the camera 1204, the microphone(s) 1206, motion sensor 1208, and/or the speaker 1210. Moreover, the A/V device 1102 may implement the settings 1242 to limit the use of the communication module 1212. By way of non-limiting example, the output signal 1238 may be transmitted from the A/V device 1102 to the signaling device 1128 over a wired connection forming a part of the communication module 1212, but communication over one or more wireless networks using the communication module 1212 may be disabled in the pre-activation mode.

As illustrated in FIG. 12, the settings 1242 may include the rule 1238, which indicates the operation of various components of the A/V device 1102. The rule 1238 may generally indicate and/or include a state (e.g., condition) (e.g., pre-activation mode or activated mode, camera is off, etc.), what to do when the state and/or other conditions are found (e.g., generate the user alert 1234 and/or output signal 1236, transmit the user alert 1234 and/or output signal 1236 via a communication channel when the object is in a state, captured image data 1224 when in a certain state, transmit the image data 1224 via a communication channel), content to include in the user alert 1234 (e.g., a customized message, such as text, images, audio, map (e.g., map/location data 1244), controls, etc.), and the like.

In some embodiments, the rule 1238 is implemented as a plurality of rules, with each rule including a different set of information and/or conditions. For example, the settings 1242 may include a first rule that relates to handling of first data in the pre-activation state, a second rule that relates to handling of the first data in the activated state, a third rule that relates to handling of second data in the pre-activation state, a fourth rule that relates to handling of the second data in the activated state, a fifth rule that relates to a first component of the A/V device 1102 in the pre-activation state, and so on.

In some embodiments, the rule 1238 may be a device-specific rule. A device-specific rule may be a rule that is specifically tailored to the A/V device 1102. For example, a device-specific rule for the A/V device 1102 may be based on the capabilities of the A/V device 1102. For example, in the pre-activation mode, a motion sensor 1208 of a video doorbell-type device may be disabled, whereas in a floodlight type device, the motion sensor 1208 may be enabled in the pre-activation mode (e.g., to control activation of the one or more lights of the floodlight type device). In other embodiments, the rule 1238 may be a global or other type of rule that is not specific to the A/V device 1102. For example, the rule 1238 may relate to communication configurations (e.g., the rule 1238 may indicate that no data should be stored in the pre-activation mode, regardless of the source of that data).

In some embodiments, the rule 1238 may be transmitted to a user for approval before implementation. For example, the processor 1216 of the A/V device 1102 may transmit, using the communication module 1212, the rule 1238 to the client device 1108, 1110 with a description about the rule 1238 and/or a suggestion to implement the rule 1238. A user associated with the client device 1108, 1110 may accept or reject the rule 1238. The processor 1216 of the A/V device 1102 may then receive, using the communication module 1212, an indication of acceptance or rejection to from the client device 1108, 1110 (e.g., directly or through the server 1122, the signaling device 1128, and/or the hub device 1112). For example, the user may be presented, via the client device 1108, 1110, to implement different rules, e.g., by activating one or more of the A/V devices 1102 and/or the hub device 1112. In other embodiments, the rule 1238 may be implemented automatically without user approval.

As further illustrated in FIG. 12, the A/V device 1102 may further include an activation module 1254. In implementations of this disclosure, the activation module 1254 may be executed by the processor 1216 to configure the A/V device 1102 in a pre-activation mode or an activated mode. For example, and as described in detail with regard to FIG. 15, the activation module 1254 may be executed to cause one or more graphical user interfaces (GUIs) to be displayed on the client device 1108, 1110. Using the GUIs, the user may activate the A/V device 1102. For example, the GUIs may prompt a user to register the A/V device 1102, to set up a user account associated with the manufacturer of the A/V device 1102, and/or to provide payment information. In other examples, the activation module 1254 may comprise a physical switch or interface on the A/V device 1102 via which a user may configure the A/V device 1102 in the pre-activation mode or in the activated mode. Moreover, interfacing with the switch or the interface to change the mode may prompt one or more GUIs, such as those described herein.

As also illustrated in FIG. 12, the A/V device 1102 may also include a base station 1248 including a second communication module 1250 and a second processor 1252. In embodiments of this disclosure, the base station 1248 may be configured to use the second processor 1252 and the second communication module 1250 to configure the A/V device 1102 as a node and/or base station in a larger network, such as a wireless mesh network. For instance, the second communication module 1250 may include a transmitter and an antenna to broadcast the network and/or may include a receiver and the antenna to receive communications on the network. For example, the base station 1248 may act as a node in a short-range wireless network, e.g., Zig-Bee, Bluetooth, Z-Wave, a wireless local area network (WLAN), e.g., Wi-Fi. In some examples, the base station 1248 may be configured to form a part of a Low-Power, wide-area network (LPWAN) (e.g., a Lora WAN network, ultra-narrow band (UNB), narrow-band IoT (NB-IOT, etc.). As noted above, the A/V device 1102 may form a component in the Internet of Things, and the base station 1248 may provide the functionality by which the A/V device 1102 interacts with the Internet of Things. Although the base station 1248 is illustrated as a separate component of the A/V device 1102, some or all of the functionality of the second communication module 1250 and/or of the second processor 1252 may be carried out by the communication module 1212 and/or the processor 1216, respectively.

In embodiments of this disclosure, the base station 1248, along with additional base stations 1248 of additional A/V devices, hub devices, and/or signaling devices (as described herein) may form a network over a larger geographical area. For example, multiple A/V devices 1102, hub devices 1112, and/or signaling devices 1128 with integrated base stations may be installed at a single property and/or at different properties. In example embodiments, the base station is configured to operate regardless of the state (e.g., pre-activation, activated, etc.) of the A/V device 1102, the hub device 1112, and/or the signaling devices 1128. More specifically, in some embodiments, the base station may broadcast the network with the A/V device 1102, the hub device 1112, and/or the signaling device 1128 in both the pre-activation mode or in the activated mode.

Figure 13:
FIG. 13 is a functional block diagram illustrating one example embodiment of a smart-home hub device according to various aspects of the present disclosure.

FIG. 13 is a functional block diagram illustrating an embodiment of the smart-home hub device 1112 (alternatively referred to herein as the "hub device 1112") according to various aspects of the present disclosure. The hub device 1112 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 1106 for enabling remote control of the hub device 1112), and/or another similar device. The hub device 1112 may comprise a processing module 1302 that is operatively connected to a communication module 1304. In some embodiments, the hub device 1112 may comprise one or more of a camera (not shown), a microphone (not shown), and a speaker (not shown). The processing module 1302 may comprise a processor 1306, volatile memory 1308, and non-volatile memory 1310, which includes a smart-home hub application 1312. In some embodiments, the signaling device 1128 may include the functionality and components described with respect to the hub device 1112. As such, reference to the components, processes, and functions of the hub device 1112 herein may be attributed to the signaling device 1128.

In various embodiments, the smart-home hub application 1312 may configure the processor 1306 to receive sensor data from the sensors 1114 and/or the automation devices 1116. For example, the sensor data may include a current state of the sensors 1114 and/or the automation devices 1116.

With further reference to FIG. 13, the smart-home hub application 1312 may configure the processor 1308 to receive the audio data 1226, the text data 1232, the image data 1224, the motion data 1230, the input data 1228, the user alert 1234, the output signal 1236, and/or the map/location data 1244 from the A/V device 1102 (in some embodiments, via the server 1122) using the communication module 1304. For example, the hub device 1112 may receive (e.g., after receiving a signal from the A/V device 1102 that the device 1102 has been activated) the image data 1224, the input data 1228, and/or the motion data 1230 from the A/V device 1102 and/or the server 1122 in response to motion being detected by the A/V device 1102. Additionally, or alternatively, in some embodiments, the smart-home hub application 1312 may configure the processor 1308 to transmit, using the communication module 1304, the rule 1238 to the A/V device 1102 and/or the client devices 1108, 1110.

As described herein, at least some of the processes of the A/V device 1102, the server 1122, the signaling device 1128, and/or the client device 1108, 1110 may be performed by the hub device 1112. For example, without limitation, the hub device 1112 may include the rule component 1240 that is executable by the processor 1308. As noted above, the rule component 1240 may perform various operations to generate the rule 1238, implement the rule 1238, and the like. Although the settings 1242 are not illustrated in FIG. 13, in some embodiments the settings 1242 may be included in the hub device 1112. Moreover, the smart-home hub device 1112 may also or alternatively include the activation module 1254 (e.g., for determining whether the hub device 1112 is to operate in a pre-activation or activated mode) and/or the base station 1248 functionality.

As further illustrated in FIG. 13, the hub device 1112 may store data representing security modes 1314 of the security system. As described herein, the security modes 1314 may include, but are not limited to, an armed stay mode, an armed away mode, an armed vacation mode, a disarmed mode, and/or other modes, such as a custom mode of the user. In the armed stay mode, the sensors 1114 inside the property (e.g., motion sensors) may be disarmed while the sensors 1114 and/or the A/V device 1102 outside and/or along the perimeter of the structure (e.g., door sensors, window sensors, video doorbells, security cameras etc.) may be armed. In addition, during the armed stay mode, at least one of the automation devices 1116 (e.g., an outdoor lighting automation system) may be activated between certain hours, such as between 6:00 p.m. and 4:00 a.m. In an armed away mode, the sensors 1114 inside the property (e.g., the motion sensors) may be armed in addition to the sensors 1114 outside and/or along the perimeter of the structure (e.g., door sensors, window sensors, etc.), and/or the A/V device 1102.

In addition, during an armed away mode, one or more of the automation devices 1116 (e.g., interior and/or exterior lighting automation systems) may be activated according to an activation schedule (e.g., interior lights on from 5:00 p.m. to 9:00 p.m., exterior lights on from 6:00 p.m. to 8:00 p.m., blinds/shades opened from 12:00 p.m. to 5:00 p.m. and closed from 5:00 p.m. to 4:00 a.m., etc.) in order to provide an indication that somebody is home, even when they are not. In an armed vacation mode, the sensors 1114, the automation devices 1116, and/or the A/V device 1102 may be armed and disarmed similar to the armed away mode, however, any alerts and security events may also be sent to neighbors and/or law enforcement.

In a disarmed mode, all of the sensors 1114 and/or the automation devices 1116 may be deactivated (other than the automation devices in use by the users separate from an arming mode of the security system). However, in a disarmed mode, the one or more A/V devices 1102 may be in an active state for detecting motion and/or recording activity in the field of view of the one or more A/V devices 1102 and/or other devices.

In a custom mode, the user/owner of the security system may configure each of the sensors 1114, the automation devices 1116, and/or the A/V devices 1102. For example, in a custom mode, "Summer," the user/owner may arm each of the door sensors but disable the window sensors (e.g., where windows may be left open for air flow). In addition, the user/owner may activate each of the A/V devices 1102 in the back yard to record between 8:00 am and 5:00 p.m. (e.g., because the kids may regularly play in the back yard during the summer months).

As described herein, the hub device 1112 may receive, from an electronic device (e.g., the client device 1108, 1110), input data 1228 representing a request to change the security mode 1314 of the security system. Based on the input data 1228, the hub device 112 may change the security mode 1314. For a first example, the hub device 1112 may receive input data 1228 representing a request to change the security system from the disarmed mode to the armed away mode. Based on the input data 1228, the hub device 1112 may set the mode for the security system to the armed away mode. For a second example, the hub device 1112 may receive input data 1228 representing a request to change the security system from the disarmed mode to the armed away mode. Based on the input data, the hub device 1112 may send, to another electronic device, data representing the request to change the security system from the disarmed mode to the armed away mode, where the other device then sets the mode for the security system to the armed away mode.

As further illustrated in FIG. 13, the hub device 1112 may include one or more loudspeaker(s) 1316. In some instances, the hub device 1112 may use the loudspeaker(s) 1316 in order to output sound, such as an alarm or siren, when a sensor 1114 detects an event. For example, while the security system is operating in the armed away mode, the hub device 1112 may receive, from a sensor 1114, sensor data 1318 indicating an event. The event may include motion being detected by a motion sensor, an opening of a door being detected by a door sensor, and/or any other type of event that may be detected by the sensor 1114. Based on the sensor data, and while operating in the armed away mode, the hub device 1112 may activate the alarm or siren by outputting the sound using the loudspeaker(s) 1316.

Figure 14:
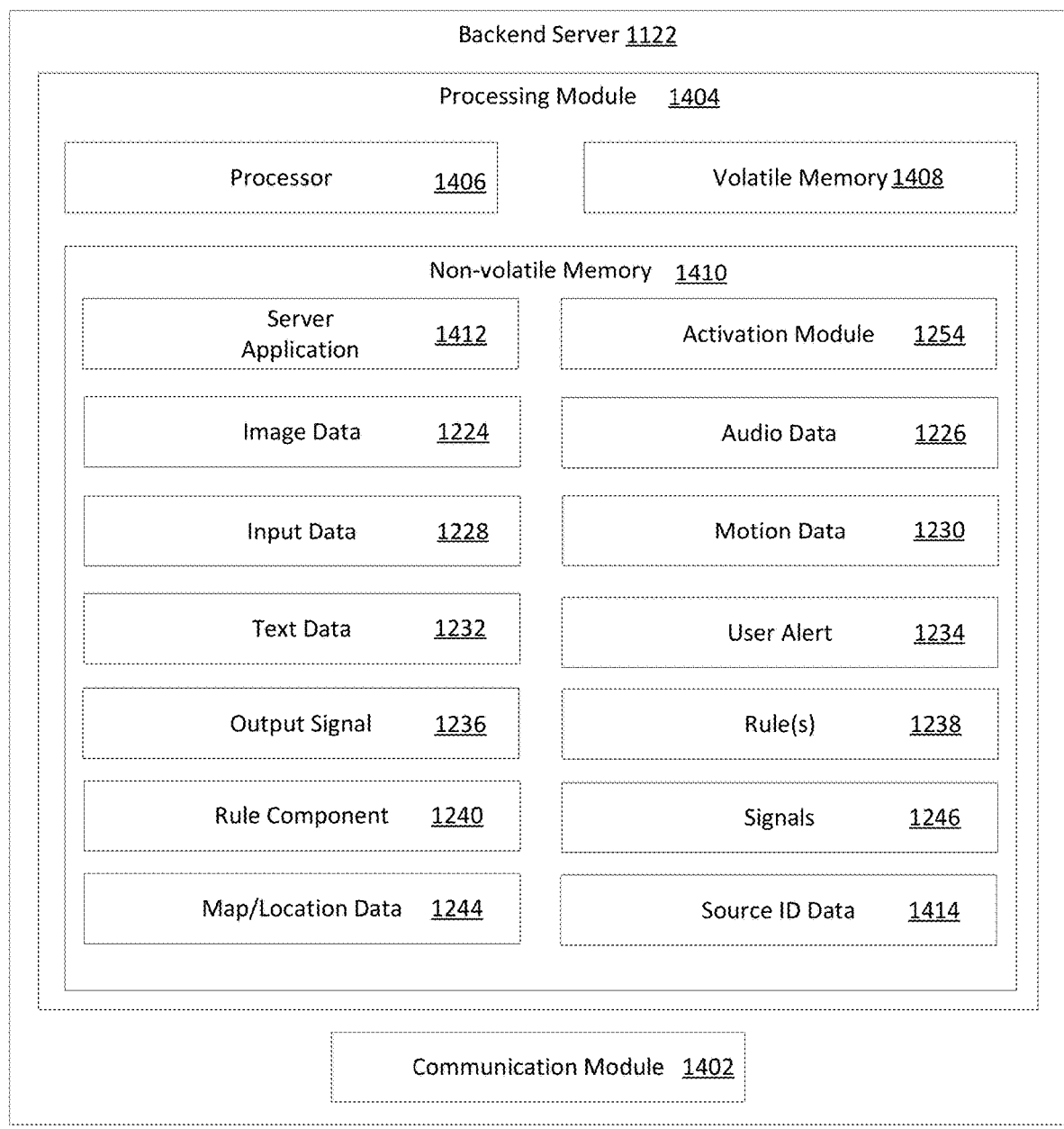
FIG. 14 is a functional block diagram illustrating one example embodiment of a backend device according to various aspects of the present disclosure.

FIG. 14 is a functional block diagram illustrating one embodiment of the server 1122 according to various aspects of the present disclosure. The server 1122 may comprise a communication module 1402 and a processing module 1404, which includes a processor 1406, volatile memory 1408, and non-volatile memory 1410. The communication module 1402 may allow the server 1122 to access and communicate with devices connected to the network (Internet/PSTN) 1106 (e.g., the A/V device 1102, the hub device 1112, the client devices 1108, 1110, the signaling devices 1128, and/or any other device). The non-volatile memory 1410 may include a server application 1412 that configures the processor 1406 to receive the audio data 1226, the text data 1232, the input data 1228, the user alerts 1234, the output signals 1236, the map/location data 1244, the image data 1224, the sensor data, and/or the motion data 1230 from the A/V device 1102, the hub device 1112, the sensors 1114, the automation devices 1116, and/or the signaling device 1128. The server application 1412 may also configure the processor 1406 to transmit (and/or forward) the audio data 1226, the text data 1232, the input data 1228, the user alerts 1234, the output signals 1236, the map/location data 1244, the image data 1224, and/or the motion data 1230 to the client device 1108, 1110, and/or the hub device 1112 using the communication module 1402. Additionally, or alternatively, in some embodiments, the server application 1412 may configure the processor 1406 to transmit, using the communication module 1402, the rule 1238 to the A/V device 1102 and/or the client device 1108, 1110.

As described herein, at least some of the processes of the A/V device 1102, the hub device 1112, the signaling device 1128, and/or the client device 1108, 1110 may be performed by the server 1122. For example, without limitation, the server 1122 may execute the activation module 1254, e.g., to instruct one or more of the A/V devices 1102, the hub device 1112, and/or the signaling device 1128 to operate in the activated mode and/or the pre-activation mode. For instance, the server 1122 may associate a user or a user account with a newly installed A/V device 1102, hub device 1112, and/or signaling device 1128, and instruct the A/V device 1102, the hub device 1112, and/or the signaling device 1128 to operate in the activated mode and/or the pre-activation mode based on the association. By way of non-limiting example, the server may instruct the A/V device 1102, the hub device 1112, and/or the signaling device 1128 to implement rules associated with the activated mode and/or the pre-activation mode.

Although the settings 1242 are not illustrated in FIG. 14, in some embodiments the settings 1242 may be included at the server 1122. For instance, the server 1122 may instruct an A/V doorbell 302 to turn on camera functionalities and/or the server 1122 may instruct the hub device 1112 and/or the signaling device 1128 to store data in addition to transmitting data to a client device 1108, 1110 to implement the activated mode.

In further reference to FIG. 14, the non-volatile memory 1410 may also include source identifying data 1414 that may be used to identify the A/V device 1102, the hub device 1112, the client device 1108, 1110, the signaling device 1128, and/or other components of the security system. In addition, the source identifying data 1414 may be used by the processor 1406 of the server 1122 to determine the client devices 1108, 1110 and/or other components associated with the A/V device 1102, the hub device 1112, and/or the signaling device 1128 that comprise the security system. Additionally, in some examples, the source identifying data 1414 may be used by the processor 1406 of the server 1122 to determine locations of the client devices 1108, 1110, the A/V devices 1102, the hub device 1112, the signaling device 1128 and/or other components of the security system at a property and/or within a geographic area.

In some embodiments, the server application 1412 may further configure the processor 1406 to generate and transmit a report signal (not shown) to a third-party client device (not shown), which may be associated with a law enforcement agency (or other emergency personnel) or the security monitoring service, for example. The report signal, which may be the user alert 1234, in some examples, may include the image data 1224, the audio data 1226, the text data 1232, the sensor data, and/or the map/location data 1244. In such embodiments, an operator of the third-party client device may be able to view the image data 1224, the audio data 1226, the text data 1232, and/or the map/location data 1244 to help in analyzing emergency situations. For example, an emergency responder (e.g., a fire fighter, police officer, 911 operator, etc.) may be able to view the map/location data 1244 to determine the location of the smoke or fire and/or the location of the occupants of the property.

The hub device 1112, the signaling device 1128, and/or the server 1122 (and/or one or more additional or alternative devices of the network(s) of servers/backend devices 1118) may alternatively be referred to herein as "network devices" and/or "electronic devices."

Figure 15:
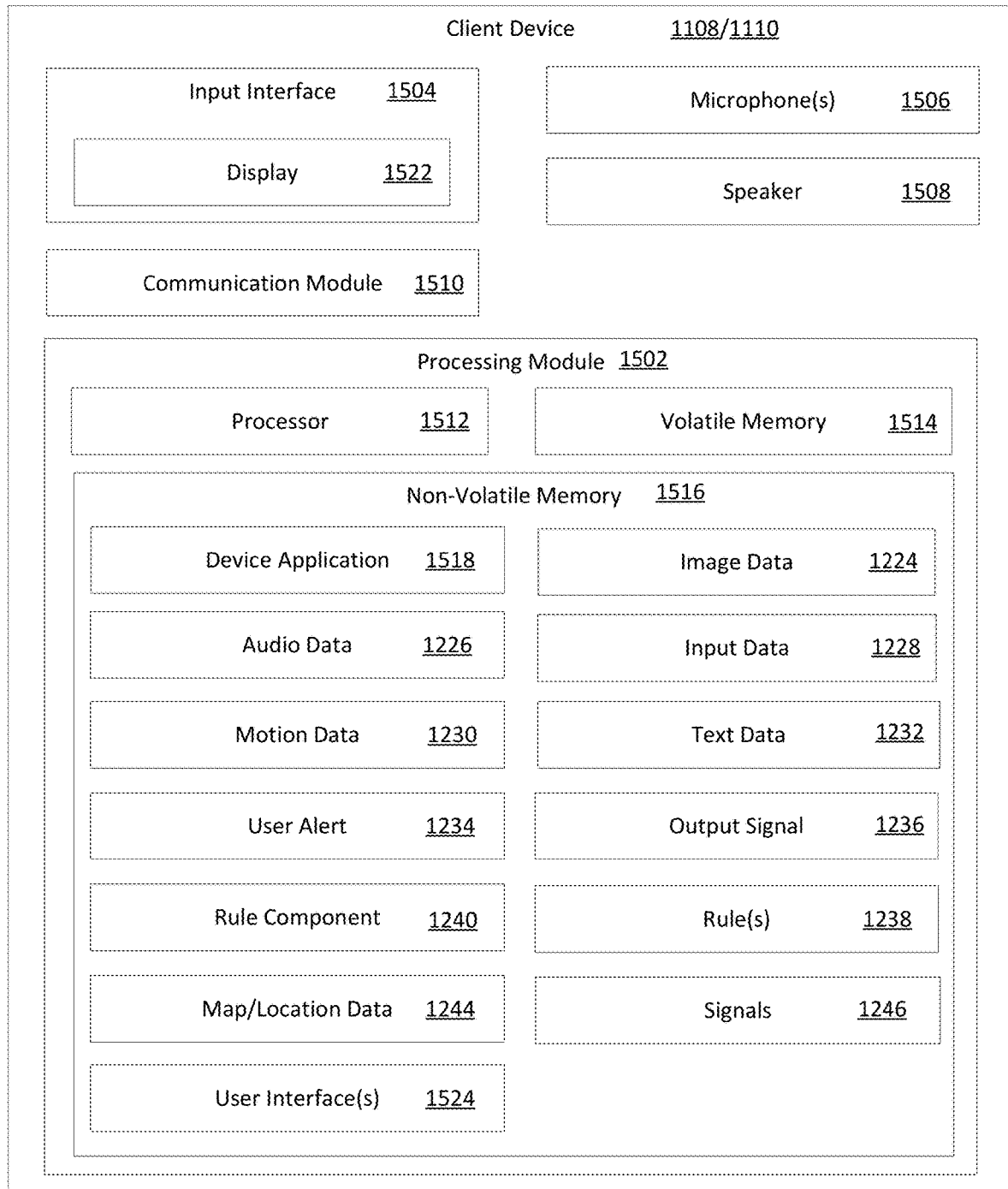
FIG. 15 is a functional block diagram illustrating one example embodiment of a client device according to various aspects of the present disclosure.

Now referring to FIG. 15, FIG. 15 is a functional block diagram illustrating one embodiment of a client device 1108, 1110 according to various aspects of the present disclosure. The client device 1108, 1110 may comprise a processing module 1502 that is operatively connected to an input interface 1504, microphone(s) 1506, a speaker 1508, and a communication module 1510. The client device 1108, 1110 may further comprise a camera (not shown) operatively connected to the processing module 1502. The processing module 1502 may comprise a processor 1512, volatile memory 1514, and non-volatile memory 1516, which includes a device application 1518. In various embodiments, the device application 1518 may configure the processor 1512 to receive input(s) to the input interface 1504 (e.g., requests for access to the A/V device 1102, etc.) and/or to capture the audio data 1226 using the microphone(s) 1506, for example. In addition, the device application 1518 may configure the processor 1512 to receive the input data 1228, the image data 1224, the audio data 1226, the map/location data 1244, the output signal 1236, and/or the user alert 1234 from one or more of the A/V device 1102, the hub device 1112, the signaling device 1128, or the server 1122.

With further reference to FIG. 15, the input interface 1504 may include a display 1520. The display 1520 may include a touchscreen, such that the user of the client device 1108, 1110 may provide inputs directly to the display 1520 (e.g., a request for access to the A/V device 1102). In some embodiments, the client device 1108, 1110 may not include a touchscreen. In such embodiments, and in embodiments where the client device 1108, 1110 includes the touchscreen, the user may provide an input using any input device, such as, without limitation, a mouse, a trackball, a touchpad, a joystick, a pointing stick, a stylus, buttons, dials, or other controls, microphones, cameras, motion sensors, etc.

In some of the present embodiments, the processor 1512 of the client device 1108, 1110 may receive, using the communication module 1510, activation instructions, e.g., from the activation module 1254. The device application 1518 may configure the processor 1512 to cause the display 1520 to display a user interface 1522 that includes instructions for activating the A/V devices 1102, the hub device 1112, and/or the signaling device 1128. In response to receiving input from the user requesting to activate the A/V device 1102, the hub device 1112, and/or the signaling device 1128, the client device 1108, 1110 may transmit, using the communication module 1510, an activation signal requesting activation. The indication may be transmitted to the A/V device 1102, the hub device 1112, the signaling device 1128, and/or the server 1122. Moreover, the processor 1512 may cause the display 1520 to display a user interface 1522 via which a user may input information associated with the activation request. For example, the user interface 1522 may facilitate user input of configuration settings (e.g., an SSID, a password, etc.) for connecting the A/V device 1102, the hub device 1112, and/or the signaling device 1128 to a wireless network. In other embodiments, the user interface 1522 may facilitate input of a user identification, creation of a user account, and/or entry of payment information for activating the A/V device 1102, the hub device 1112, and/or the signaling device 1128.

In some examples, the A/V device 1102, the hub device 1112, and/or the signaling device 1128 may broadcast a network (e.g., a Bluetooth network, a Wi-Fi direct network, or another type of local network) in response to an activation request being received by the A/V device 1102, the hub device 1112, and/or the signaling device 1128 (e.g., in response to an input to a button on the A/V device 1102, the hub device 1112, and/or the signaling device 1128 (e.g., an activation button, a setup button, a reset button, etc.). In response, the user of the client device 1108, 1110 may connect to the network in order to exchange data and information with the A/V device 1102, the hub device 1112, and/or the signaling device 1128. In some embodiments, the data and information may be the network credentials (e.g., SSID, password, etc.) for the user's network 1104 (e.g., a Wi-Fi network), which may then enable the A/V device 1102, the hub device 1112, and/or the signaling device 1128 to communicate with the server 1122, the A/V device 1102, the hub device 1112, and/or the signaling device 1128 over the user's network 1104 and/or the network (Internet/PSTN) 1106.

In embodiments where the property includes the sensors 1114 and/or automation devices 1116, the user of the client device 1108, 1110 may associate the A/V device 1102, the hub device 1112, and/or the signaling device 1128 with the sensors 1114 and/or the automation devices 1116 (e.g., to create the security system).

Figure 16:
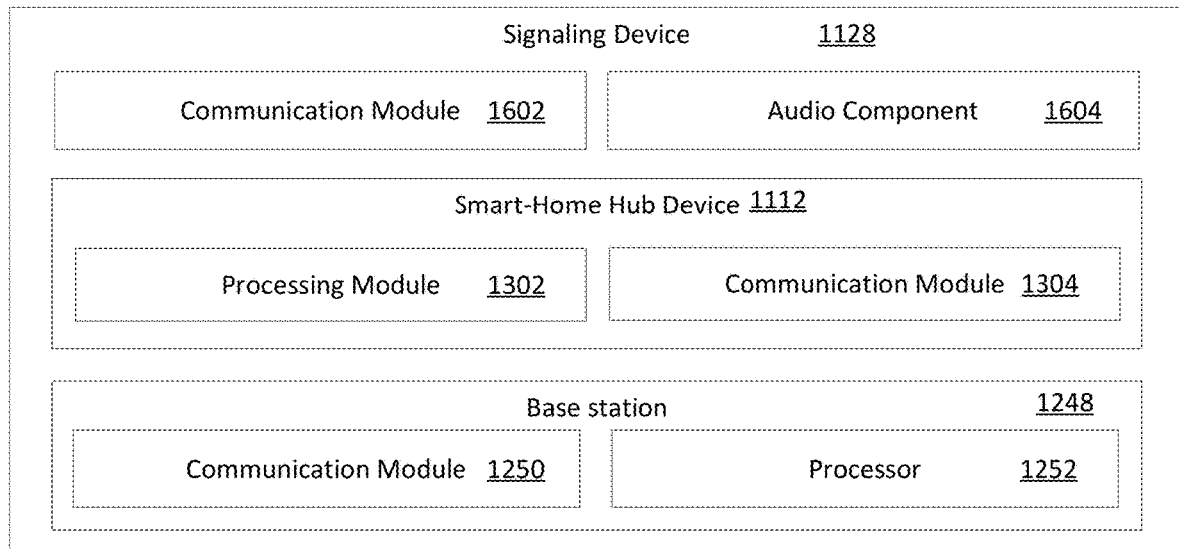
FIG. 16 is a functional block diagram illustrating one example embodiment of a signaling device according to various aspects of the present disclosure.

Now referring to FIG. 16, FIG. 16 is a functional block diagram illustrating one embodiment of a signaling device 1128 according to various aspects of the present disclosure. The signaling device 1128 may include a communication module 1602 and an audio component 1604. For example, the communication module 1602 may be configured to receive signals in response to inputs to a doorbell in communication with the signaling device 1128 (e.g., inputs to a standard doorbell button having a wired connection to the signaling device 1128, the output signals 1236 from the A/V device 1102, where the A/V device 1102 is a doorbell, etc.). In response to receipt of the signals, the audio component 1604 may emit a sound. As in a conventional doorbell signaling device, the audio component 1604 may be disposed in a structure, e.g., centrally located in the structure, to alert people in the structure to activity detected by a traditional doorbell and/or one or more A/V devices 1102, which may be installed outside the structure. In some embodiments, the communication module 1602 may include a wired connection between the signaling device 1128 and a traditional doorbell and/or the A/V communication and recording device 1102, although the communication module 1602 may alternatively include a wireless connection. The audio component 1604 may include electrical, electro-mechanical, digital, and/or mechanical components that render an audio output, e.g., in response to a signal received at the communication module 1602. By way of non-limiting example, the signaling device 1128 may include a plurality of sound files comprising different sounds, and upon the signaling device 1128 receiving a signal via the communication module 1602, e.g., an output signal 1238 generated by a A/V doorbell 302 in response to a visitor pressing a button on the A/V doorbell 302, the audio component 1604 may cause one of the digital files to be played via a speaker of the audio component 1604. As another example, the signaling device 1128 may include a mechanical configuration (e.g., having solenoid(s), spring(s), bar(s), and/or plunger(s)), such that in response to an input to a doorbell button, the solenoid-spring-bar-plunger of the audio component 1604 outputs a sound.

In some embodiments, and as discussed above, the signaling device 1128 may also include the hub device 1112 (e.g., the functionality of the hub device 1112). More specifically, the components and functionality of the hub device 1112 may be integrated into the signaling device 128, such that installation of the signaling device 1128 in a structure also provides the functionality of the hub device 1112 to the structure. As discussed above, portions of the signaling device 1128 may be deactivated and/or disabled in the pre-activation mode, and subsequently activated, e.g., upon request by the user, in response to activation, etc. The hub device 1112, and its accompanying functionality, may be disabled at installation. However, by integrating the hub device 1112 functionality into the signaling device, a homeowner or renter, for example, may choose to activate the hub device 1112 functionality within the signaling device 1128, and can do so without the need to purchase and/or install the hub device 1112 separately. Integrating the hub device 1112 into the signaling device 1128 may also provide the additional benefit of installing the hub device 1112 at a preferred location. For instance, the signaling device 1128 will most often be installed at a generally centralized location, e.g., so the audio output can be heard from everywhere in the structure. The functionality of the hub device 1112 within the signaling device 1128 may also benefit from this centralized location. For example, to the extent the signaling device 1128 is located centrally relative to other security devices in the structure (e.g., sensors 1114, automation devices 1116, A/V devices 1102, etc.), the efficacy of wireless communication between the security devices and the hub device 1112 may be increased, e.g., a signal strength may be increased for many of the security devices.

As also illustrated in FIG. 16, the signaling device 1128 may also include the base station 1248 and its associated functionality. As noted above, in examples of this disclosure, the signaling device 1128 may be configured for installation in a building, such as newly constructed or newly renovated building. In examples of this disclosure, in both the pre-activation mode and the activated mode, the base station 1248 may function as described herein. For example, the base station 1248 may configure the signaling device 1128 as a part of a broader network, including as a node in a low-power wide area network. Moreover, although the signaling device 1128 is illustrated as including both the base station 1248 and the hub device 1112, as noted above, the hub device 1112 may include the base station 1248, and thus a separate base station 1248 in addition to the hub device 1112 base station 1248 may not be necessary or included.

At least some of the processes of the A/V device 1102, the server 1122, the client device 1108, 1110, and/or the hub device 1112 may be performed by the signaling device 1128. For example, without limitation, the signaling device 1128 may include settings 1242 to dictate when the audio component 1604 plays and/or outputs a sound.

In the illustrated embodiment of FIGS. 12-16, the various components including (but not limited to) the processing modules 1202, 1302, 1404, 1502 and the communication modules 1212, 1304, 1402, 1510, 1602 are represented by separate boxes. The graphical representations depicted in each of FIGS. 12-16 are, however, merely examples, and are not intended to indicate that any of the various components of the A/V device 1102, the hub device 1112, the server 1122, the client device 1108, 1110, and/or the signaling device 1128 are necessarily physically separate from one another, although in some embodiments they might be. In other embodiments, however, the structure and/or functionality of any or all of the components of each of the A/V device 1102, the hub device 1112, the server 1122, the client device 1108, 1110, and/or the signaling device 1128 may be combined. As an example, the structure and/or functionality of any or all of the components of the A/V device 1102 may be combined. In addition, in some embodiments, the communication module 1212 may include its own processor, volatile memory, and/or non-volatile memory. As a second example, the structure and/or functionality of any or all of the components of the hub device 1112 may be combined. In addition, in some embodiments, the communication module 1304 may include its own processor, volatile memory, and/or non-volatile memory. As a third example, the structure and/or functionality of any or all of the components of the server 1122 may be combined. In addition, in some embodiments, the communication module 1402 may include its own processor, volatile memory, and/or non-volatile memory. As a fourth example, the structure and/or functionality of any or all of the components of the client device 1108, 1110 may be combined. In addition, in some embodiments, the communication module 1510 may include its own processor, volatile memory, and/or non-volatile memory. As a fifth example, the structure and/or functionality of any or all of the components of the barrier control device 1128 may be combined. In addition, in some embodiments, the communication module 1602 may include its own processor, volatile memory, and/or non-volatile memory.

Figure 17:
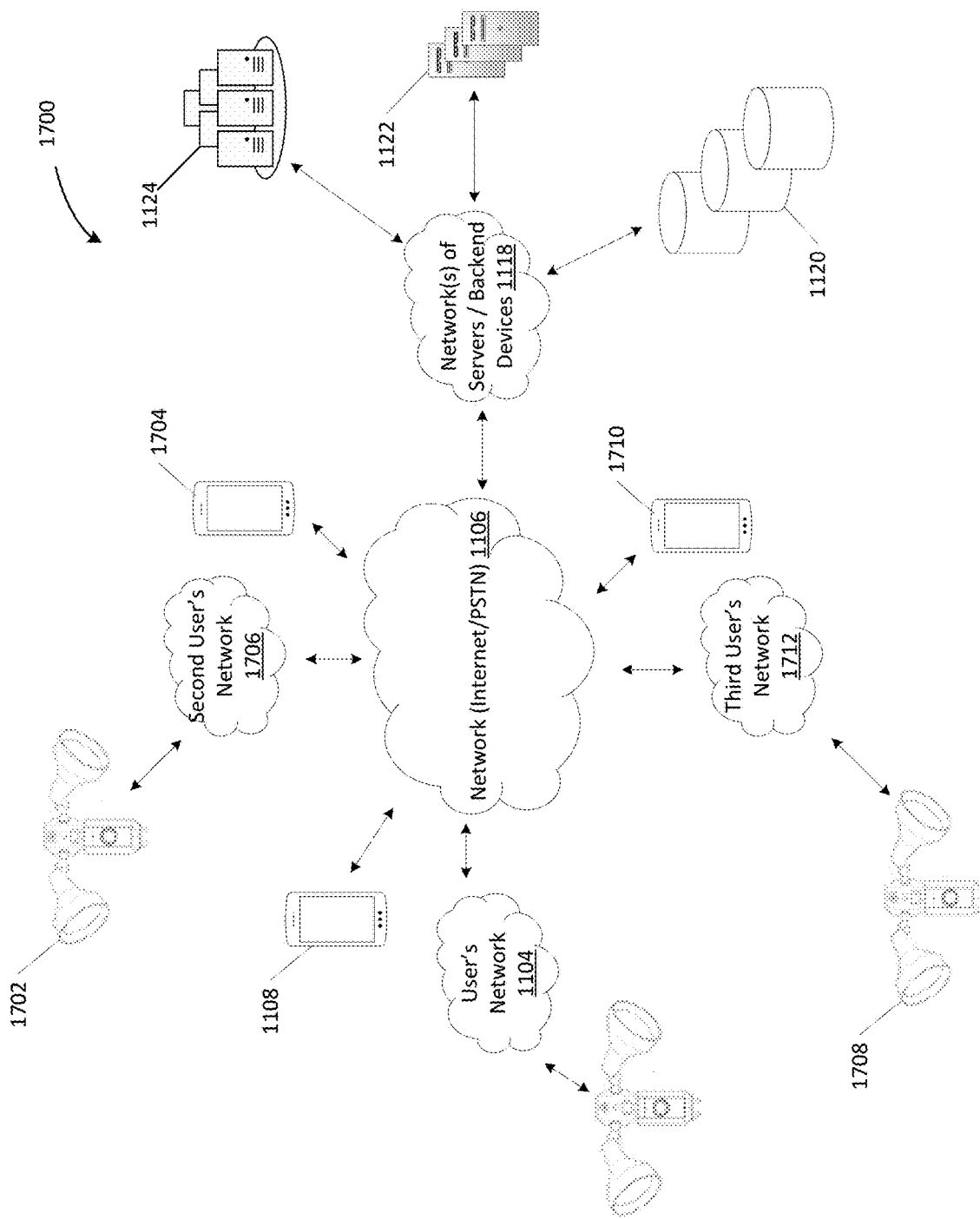
FIG. 17 is a functional block diagram for implementing security system devices as network nodes according to various aspects of the present disclosure.

FIG. 17 is a functional block diagram illustrating a system 1700 for implementing security system devices as network nodes. In some embodiments, if a user is verified (may also be referred to as "verified user"), then the user may have full access to the geographic area. In reference to FIG. 17, the system 1700 may include at least the first A/V device 1102 and the first client device 1108 associated with a geographic area (e.g., city block, neighborhood, city, square mile, state, etc.). In many embodiments, the first A/V device 1102 may be configured to access the user's network 1104 to connect to a network (Internet/PSTN) 1106. The system 1700 may also include a second A/V device 1702 and a second client device 1704 associated with the geographic area. In many embodiments, the second A/V device 1702 may be configured to access a second user's network 1104 to connect to the network (Internet/PSTN) 1106. In some embodiments, the second A/V device 1702 may be similar in structure and/or function as the first A/V device 1102. Additionally, the second client device 1704 may be similar in structure and function as the first client device 1108.

Additionally, the system 1700 may also include a third A/V device 1708 and a third client device 1710 associated with the geographic area. In many embodiments, the third A/V device 1702 may be configured to access a third user's network 1712 to connect to the network (Internet/PSTN) 1106. In some embodiments, the third A/V device 1708 may be similar in structure and/or function as the first A/V device 1102. Additionally, the third client device 1710 may be similar in structure and function as the first client device 1108.

Figure 19:
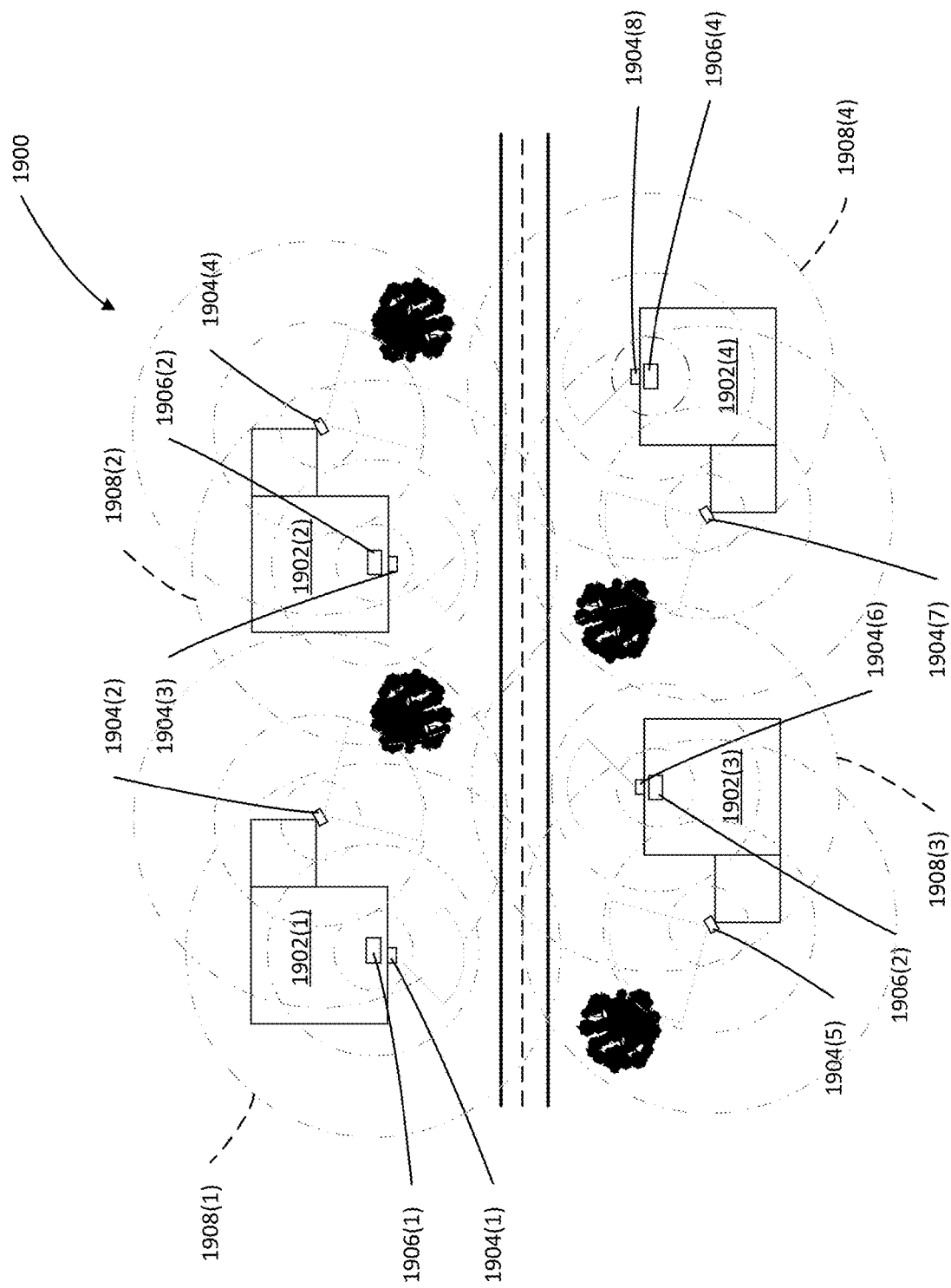
FIG. 19 is a schematic diagram illustrating one example embodiment of a network created by multiple security system devices, according to various aspects of the present disclosure.

In the illustrated embodiment, each of the A/V devices 1102, 1702, 1708 may include a base station 1248, as discussed above. Accordingly, each of the A/V devices 1102, 1702, 1708 may be a part of a network covering at least a portion of the geographic area. Moreover, and as illustrated in FIG. 19, security devices in addition to the A/V devices 1102, 1702, 1708 may include additional base stations 1248, integrated into additional security devices. For example, in addition to, or alternatively from, the A/V devices 1102, 1702, 1708, one or more hub devices 1112 and/or signaling devices 1128 may be implemented as nodes/base stations of the network.

Figure 18:
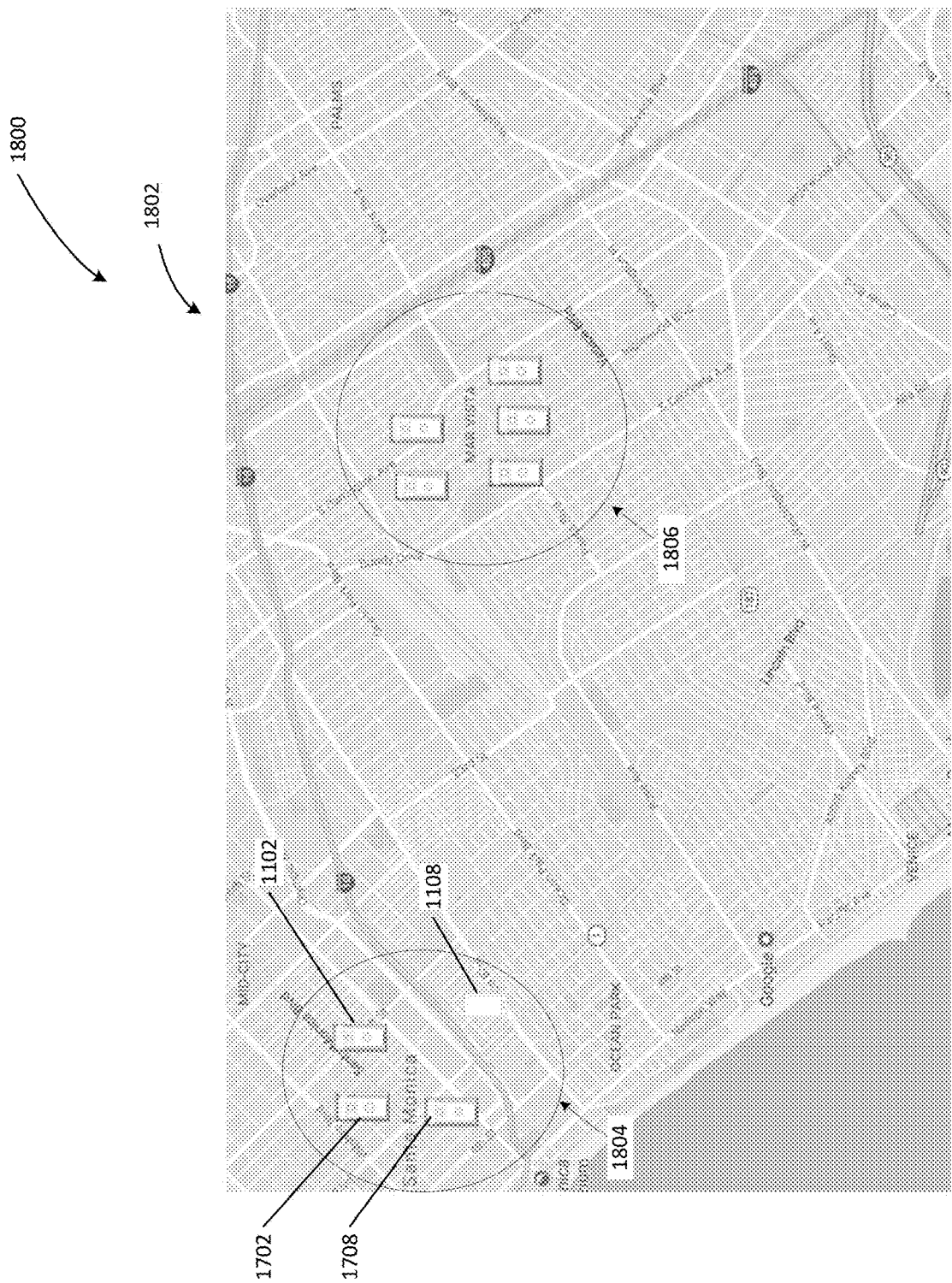
FIG. 18 is a screenshot of a map illustrating a plurality of geographic areas according to an aspect of the present disclosure.

FIG. 18 is a screenshot of a map 1802 illustrating a plurality of geographic areas according to an aspect of the present disclosure. In many embodiments, each of the plurality of geographic areas may include a subset of the users of the network of users corresponding to a geographical location. In some embodiments, an individual geographic area of the plurality of geographic areas may include a grouping of A/V devices, hub devices, and/or signaling devices that are located in a geographical location that may be defined using various methods. For example, the individual geographic area may be a geographical location associated with a neighborhood, town, city, state, or country. In a further example, the individual geographic area may be determined by the server 1122 based on grouping a particular number of A/V devices, hub devices, and/or signaling devices about a particular vicinity. In a further example, a user may customize a geographic area, as further described below. In some embodiments, various A/V devices, hub devices, and/or signaling devices may be grouped into only one geographic area or more than one geographic area. In other embodiments, various A/V devices, hub devices, and/ or signaling devices may not be grouped into any geographic area. Further, one or more third-party A/V devices, hub devices, and/or signaling devices may also be grouped as part of an individual geographic area. In other embodiments, one or more third-party A/V devices, hub devices, and/or signaling devices may not be grouped into any geographic area. In addition, users without A/V devices, hub devices, and/or signaling devices may join a geographic area using a client device, as further described below. Further, users joining a geographic area may be verified before allowing full access to geographic area features (e.g., based on user account information, based on location information verifying location of the A/V devices, hub devices, signaling devices, and/or client devices, etc.).

In reference to FIG. 18, the map 1802 illustrates a first geographic area 1804 identified as Santa Monica, Calif. In many embodiments, the first geographic area 1804 may include one or more A/V devices, hub devices, and/or signaling devices, such as (but not limited to) the first A/V device 1102, the second A/V device 1702, and the third A/V device 1708. As described above, the first A/V device 1102 may be associated with the first client device(s) 1108, 1110 configured to share image data 1224 captured by the first A/V device 1102.

In many embodiments, the second geographic area 1806 may include one or more A/V devices, hub devices, and/or signaling devices. Although specific geographic areas are discussed above with respect to FIG. 17, the plurality of geographic areas may comprise geographic areas with any number of differing characteristics such as (but not limited to) specific location, size of the geographical location, groupings of A/V devices, hub devices, and/or signaling devices, groupings of third-party devices, and/or relative locations of the geographic areas to each other in accordance with various aspects of the present disclosure. In various embodiments, one or more of the geographic areas may be coextensive with the boundaries of a community, municipality, town, village, city, county, etc. Similarly, one or more of the geographic areas may not be coextensive with the boundaries of a community, municipality, town, village, city, county, etc., and/or may overlap with at least parts of multiple communities, municipalities, towns, villages, cities, counties, etc.

FIG. 19 is provided to illustrate example embodiments of this disclosure. Specifically, FIG. 19 illustrates a schematic overhead view 1900 of a geographic area depicting structures and installation locations of several security devices, which may include A/V devices 1102 and signaling devices 1128. With specific reference to FIG. 19, the overhead view 1900 includes a first structure 1902(1), a second structure 1902(2), a third structure 1902(3), and a fourth structure 1902(4) (herein referred to collectively as "the structures 1902"). The structures 1902 may be houses in a neighborhood or other geographic area, stores in a shopping plaza, or any other structures in any type of geographic area. As also illustrated in FIG. 19, the first structure 1902(1) has a first security device 1904(1) and a second security device 1904(2), the second structure 1902(2) has a third security device 1904(3) and a fourth security device 1904(4), the third structure 1902(3) has a fifth security device 1904(5) and a sixth security device 1904(6), and the fourth structure 1902(4) has a seventh security device 1904(7) and an eighth security device 1904(8) (herein, the first through eighth security devices may be referred to as "the security devices 1904"). Although two security devices 1904 are illustrated as being associated with each of the structures 1902, each of the structures may have additional or fewer security devices 1904. In some examples, the first security device 1904(1), the third security device 1904(3), the fifth security device 1904(5) and the seventh security device 1904(7) may be A/V devices 1102, e.g., embodied as A/V doorbells 302. In addition, or alternatively, the second security device 1904(2), the fourth security device 1904(4), the sixth security device 1904(6), and the eighth security device 1904(8) may be different A/V devices 1102, e.g., embodied as floodlight-type devices 802. In other examples, the security devices 1904 may be other devices, such as hub devices 1112 and/or signaling devices 1128.

As also illustrated in the overhead view 1900, the first structure 1902(1) may have an associated first signaling device 1906(1), the second structure 1902(2) may have an associated second signaling device 1906(2), the third structure 1902(3) may have an associated third signaling device 1906(3), and the fourth structure 1902(4) may have an associated fourth signaling device 1906(4) (herein collectively the signaling devices may be referred to as "signaling devices 1906"). The signaling devices 1906 may be the signaling devices 1128 described above. For example, the signaling devices 1906 may be associated with A/V doorbells 302 (e.g., the devices 1904(1), 1904(3), 1904(5), 1904(7) may be video doorbells in communication with the signaling devices 1906(1), 1906(2), 1906(3), 1906(4), respectively). The signaling devices 1906 may each include a smart-home hub device 1112, which, for example, may receive sensor information from one or more of the security devices 1904 and/or transmit information to one or more of the security devices 1904.

As illustrated, the first security device 1904(1), the third security device 1904(3), the fifth security device 1904(5), the seventh security device 1904(7), and each of the signaling devices 1906 may include a base station 1248, such that the respective devices are configured as part of a wireless communication network. For example, each of the devices may function as a node in a low-power wide area network. In some examples, and as discussed herein, the base station 1248 may include one or more of a receiver, a transmitter, a radio and one or more antenna configured to broadcast and/or receive information, e.g., in accordance with a predetermined protocol. A range of each of the base stations is schematically illustrated by reference numerals 1908(1), 1908(2), 1908(3), 1908(4), 1908(5), 1908(6), 1908(7) and 1908(8). The first security device 1904(1), the third security device 1904(3), the fifth security device 1904(5), and the seventh security device 1904(7) are not illustrated as having an associated range 1908. In examples of this embodiment, those devices may not include the base station 1248, e.g., because they are A/V doorbells 302 and the base station functionality is provided in the associated signaling device 1906. In other embodiments, however, all (or fewer) of the illustrated security devices 1904 may include the base station 1248 and/or functionality associated with the base station.

As illustrated, the ranges 1908 overlap, providing a wirelessly-connected network over the entirety of the geographic area. Accordingly, the structures 1902 may be "connected" over the network, and as will be appreciated, the connected area may result in benefits over non-connected areas. For example, because data may be shared by and between the structures 1902 over the network, safety may be enhanced. In a non-limiting example of this disclosure, the security devices 1904 may be installed at the time of building the structures 1902. For example, the overhead view 1900 may depict all or a portion of a housing development, with each of the structures 1902 being new-builds in the development.

Owners of the new homes may gain benefits from the presence of the network, and may also have the option to activate additional functionalities associated with the already-installed security devices 1904, signaling devices 1928, and/or additional security devices. For example, by having a connected network that provides coverage to a geographic area, objects, persons, and/or animals may be tracked within the geographic area over the network (e.g., using beacons, tags, etc.). In addition, information, data, and/or signals may be transmitted between the A/V devices, the hub devices, and/or the signaling devices, and certain of the A/V devices, the hub devices, and/or the signaling devices may receive the data, information, and/or signals and transmit (or forward) the data over user networks and/or the network (Internet/PSTN) 1106 to the server 1122 and/or client devices associated with the geographic area network (e.g., the client devices 1108, 1110). In some examples, smart signs and/or other display devices may be connected to the network, and information from the A/V devices, hub devices, and/or signaling devices may be displayed on the smart signs.

Each of the processes described herein, including the processes 2000, 2100, and 2200 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 20:
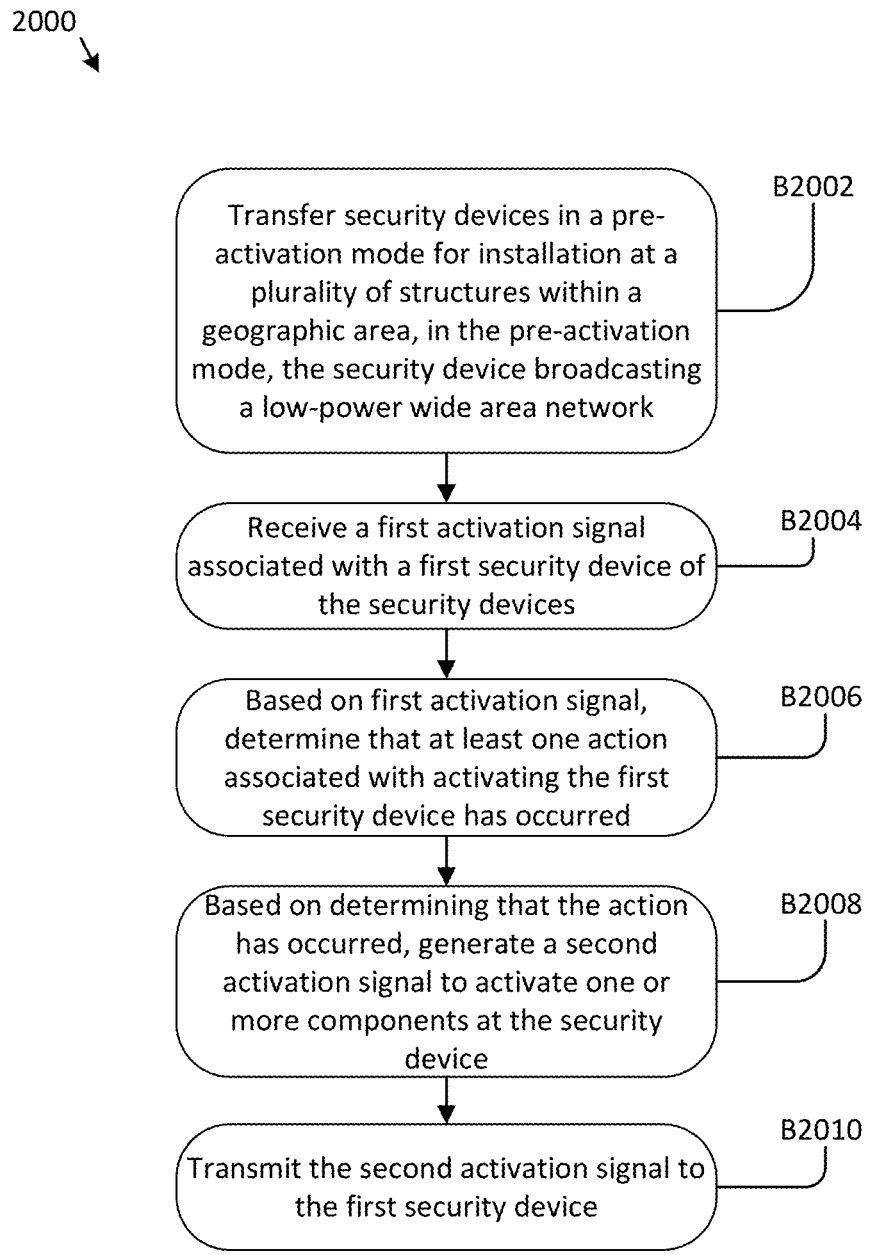
FIGS. 20-23 are flowcharts illustrating example processes for implementing security system devices as network nodes according to various aspects of the present disclosure.

FIG. 20 is a flowchart illustrating an example process 2000 for implementing security system devices as network nodes. The process 2000, at block B2002, transfers security devices in a pre-activation mode for installation at a plurality of structures within a geographic area. In some embodiments, as described herein, when in the pre-activation mode, the security device broadcasts a low-power, wide area network. For example, as discussed above with reference to FIG. 19, security devices 1904 and/or signaling devices 1906 may be installed by a new home builder, during remodeling, by a homeowner or renter, or otherwise. The security devices 1904 and/or the signaling devices 1906 may also include the base station 1248 (or functionality ascribed herein to the base station 1248) to form a node of a network covering a geographic area. As described herein, the security devices may be one or more A/V devices 1102, sensors 1114, automation devices 1116, hub devices 1112, and/or signaling devices 1128.

Moreover, in the pre-activation mode, various components and/or functionalities of the security devices may be deactivated or otherwise unavailable. For example, when the security device installed includes a A/V doorbell 302 and an associated signaling device (e.g., a traditional signaling device, the signaling device 1128), the signaling device may emit a sound when a visitor presses the button on the A/V doorbell 302 (e.g., as in a conventional doorbell), but the video doorbell may not capture video or image data 1224 in the pre-activation mode, and/or the signaling device 1128 may not store, receive, and/or transmit the video or image data 1224 to the client device 1108, 1110 and/or the server 1122. In another non-limiting example, when the security device is the A/V device 1102 in a pre-activation mode, data, such as the image data 1224, may be captured by the A/V device 1102 and transferred to the client device 1108, 1110 such that the user can view a live or near-live video stream from the A/V device 1102, but the image data 1224 may not be stored for future access by the client devices 1108, 1110 (e.g., as cloud storage, local storage, etc.).

The process 2000, at block B2004, receives a first activation signal associated with a first security device of the security devices. For example, the processor 1406 of the server 1122 may receive, using the communication module 1402 (and/or the processor 1308 of the hub device 1112 (and/or the signaling device 1128) may receive, using the communication module 1304) an activation signal (which may be represented by a signal 1246) from the client device 1108, 1110 and/or the security device. For example, an owner of one of the buildings 1902 in FIG. 19 may request, e.g., via input to one of the user interfaces 1524 on the display 1522 of a client device 1108, 1110, that the security device be activated. In other embodiments, the first activation signal 1246 may be generated by the A/V device 1102, the hub device 1112, and/or the signaling device 1128 (e.g., in response to a user interaction at the A/V device 1102, the hub device 1112, the signaling device 1128, and/or the client device 1108, 1110). In any embodiment, the first activation signal 1246 may be received from the client device 1108, 1110, the security devices, and/or a combination thereof.

The process 2000, at block B2006, determines, based on the first activation signal, that at least one action associated with activating the first security device has occurred. For example, the processor 1406 of the server 1122 (and/or the processor 1308 of the hub device 1112 (and/or the signaling device 1128)) may determine whether the user has performed one or more tasks required to activate the security device. In non-limiting examples of this disclosure, the processor 1406 of the server 1122 (or the processor 1306 of the hub device 1112 (and/or the signaling device 1128)) may determine whether the user has provided configuration settings (e.g. to allow for communication using a (second) wireless network), may determine whether the user has provided payment information, may determine whether the user has created an account (e.g., with the device manufacturer), may identify and/or authenticate the user, and/or the like. In examples of this disclosure, the processor 1406 of the server 1122 (or the processor 1306 of the hub device 1112 (and/or the processor of the signaling device 1128)) may facilitate presentation of one or more of the user interfaces 1524 on the client device 1108, 1110 (e.g., to facilitate completion of the at least one action via the client device 1108, 1110).

The process 2000, at block B2008, generates, based on the action having occurred, a second activation signal to activate one or more components at the security device. For example, the processor 1406 of the server 1122 (or the processor 1306 of the hub device 1112 (and/or the signaling device 1128)) may generate a signal (which may be represented by a signal 1246) as an instruction to enter the activated mode based on determining that an authorized user (or client device 1108, 1110) associated with the device has requested activation and has provided appropriate information, which may include payment information, configuration settings, and/or additional information.

The process 2000, at block B2010, transmits the second activation signal to the first security device. For example, the processor 1406 of the server 1122 may transmit, using the communication module 1402 (and/or the processor 1308 of the hub device 1112 (and/or the signaling device 1128) may transmit, using the communication module 1304), the signal to the security device.

Although not an explicit part of the process 2000, in embodiments of this disclosure, the second activation signal may be received at the security device 1904 and the security device 1904, e.g., using the activation module 1254, may configure the security device in the activated mode. For example, the activation module 1254 may implement rules 1238 regarding actions that are enabled in the activated mode, for example, by causing components and/or functionality of the security device to be activated or enabled. Moreover, in the activated mode, the security device may continue to broadcast the low-power, wide area network (or other network type).

The process 2000 of FIG. 20 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, a manufacturer or distributer may provide a plurality of A/V doorbells 302 to a new home builder for installation at homes (e.g., structures 1902) in a new housing development (e.g., block 2002). Each of the A/V doorbells 302 may include an associated signaling device (e.g., the signaling device 1128 or a traditional signaling device) and a base station 1248 may be disposed in the A/V doorbell 302 and/or in the signaling device 1128. The base station 1248 may broadcast according to a network protocol, e.g., to form a node of a low-power wide area network (or other network type). Moreover, the A/V doorbells 302 may be configured, upon installation at the homes, in a pre-activation mode. For example, in the pre-activation mode, the A/V doorbells 302 may function as conventional doorbells, e.g., by causing a sound to be emitted in response to a visitor pressing a button or otherwise interacting with the A/V doorbells 302.

The processor 1406 of the server 1122 may then receive, using the communication module 1404, an activation signal 1246 from the client device 1108 associated with the security system, where the activation signal 1246 is for activating additional functionality on the doorbell (e.g., block B2004). After receiving the activation signal 1246, the processor 1406 of the server 1122 may determine whether the user has performed one or more actions required to activate the device, e.g., by determining that the user has registered the device and/or provided configuration settings (e.g., block B2006). Based on the determination, the processor 1406 of the server 1122 may generate and transmit using the communication module 1404, a second activation signal to activate one or more components to place the doorbells in the activated mode (e.g., B2008 and B2010).

In another example, a manufacturer or distributer may provide a plurality of signaling devices 1128 and associated doorbells, e.g., A/V doorbells 302 or traditional doorbell interfaces, to a new home builder for installation at homes (e.g., structures 1902) in a new housing development (e.g., block 2002). For example, at installation, the doorbell may be installed proximate an entrance to the home, and the signaling device 1128 may be located in the home, in communication with the doorbell. In use, when a visitor approaches the entrance, the visitor may interface with the doorbell, e.g., by pressing a button, which causes a sound to be emitted by the audio component 1604 of the signaling device 1128. As described herein, the signaling device 1128 may be located at a position, e.g., a central location, that promotes perception of the sound throughout the house. The signaling device 1128 may also include the base station 1248, and the base station 1248 may broadcast according to a network protocol, e.g., to form a node of a low-power wide area network (or other network type). The signaling device 1128 and the doorbell may be hard-wired to the home and may be physically connected, e.g., by one or more wires, to each other.

The signaling device 1128 and the associated doorbell may be configured, upon installation at the home, in a pre-activation mode. For example, in the pre-activation mode, the signaling device 1128 and the associated doorbell may be configured to function as a conventional doorbell, e.g., by causing the sound to be emitted in response to the visitor interacting with the doorbell. In instances in which the doorbell is an A/V doorbell 302, the signaling device 1128 may also receive A/V data captured by the A/V doorbell 302. In some implementations, in the pre-activation mode, the signaling device 1128, e.g., using the communication module 1602, may cause the A/V data to be transmitted to one or more client devices 1108, 1110 associated with the signaling device 1128, e.g., for display on the client device(s) 1108, 1110 as a live or near-live A/V data feed.

After installation, the signaling device 1128 may receive, e.g., using the communication module 1250 and/or the communication module 1304, an activation signal 1246 from the client device 1108 associated with the signaling device 1128 and/or from the server 1122, where the activation signal is for activating additional features and/or functionality of the signaling device 1128 (e.g., at block B2004). After receiving the activation signal 1246, the processor 1252 of the base station 1248, the processing module 1302 of the smart-home hub device 1112, and/or the processor 1406 of the server 1122 may determine whether the user has performed one or more actions required to activate the signaling device, e.g., by determining that the user has registered the device and/or provided configuration settings (e.g., block B2006). Based on the determination, the processor 1252 of the base station 1248, the processing module 1302 of the smart-home hub device 1112, and/or the processor 1406 of the server 1122 may generate and transmit using the communication module 1404, a second activation signal to activate one or more components to place the signaling device and/or doorbells in the activated mode (e.g., at blocks B2008 and B2010).

In the activated mode, the signaling device 1128 may continue to function as in the pre-activation mode, e.g., by broadcasting the LPWAN and by emitting a sound in response to an interaction with the doorbell. Moreover, the signaling device may cause the A/V data received from the A/V doorbell 302 to be transmitted to the client device 1108, 1110, e.g., as the live or near-live A/V data feed. In the activation mode, the signaling device 1128 and the associated doorbell may also take on additional functionality. For example, in the activated mode, the signaling device 1128 may join an additional network, such as a Wi-Fi or Bluetooth network, to facilitate communication with additional components and devices, e.g., other A/V devices 1102, the server 1122, and the like. Also in the activated mode, the signaling device 1128 may facilitate storing of A/V data captured by the doorbell, e.g., by transmitting the A/V data to storage for later retrieval and viewing. Moreover, in some embodiments in which the doorbell is an A/V doorbell 302, configuring in the activated mode may include turning on sensors and/or otherwise enabling capture of the A/V data.

Figure 21:
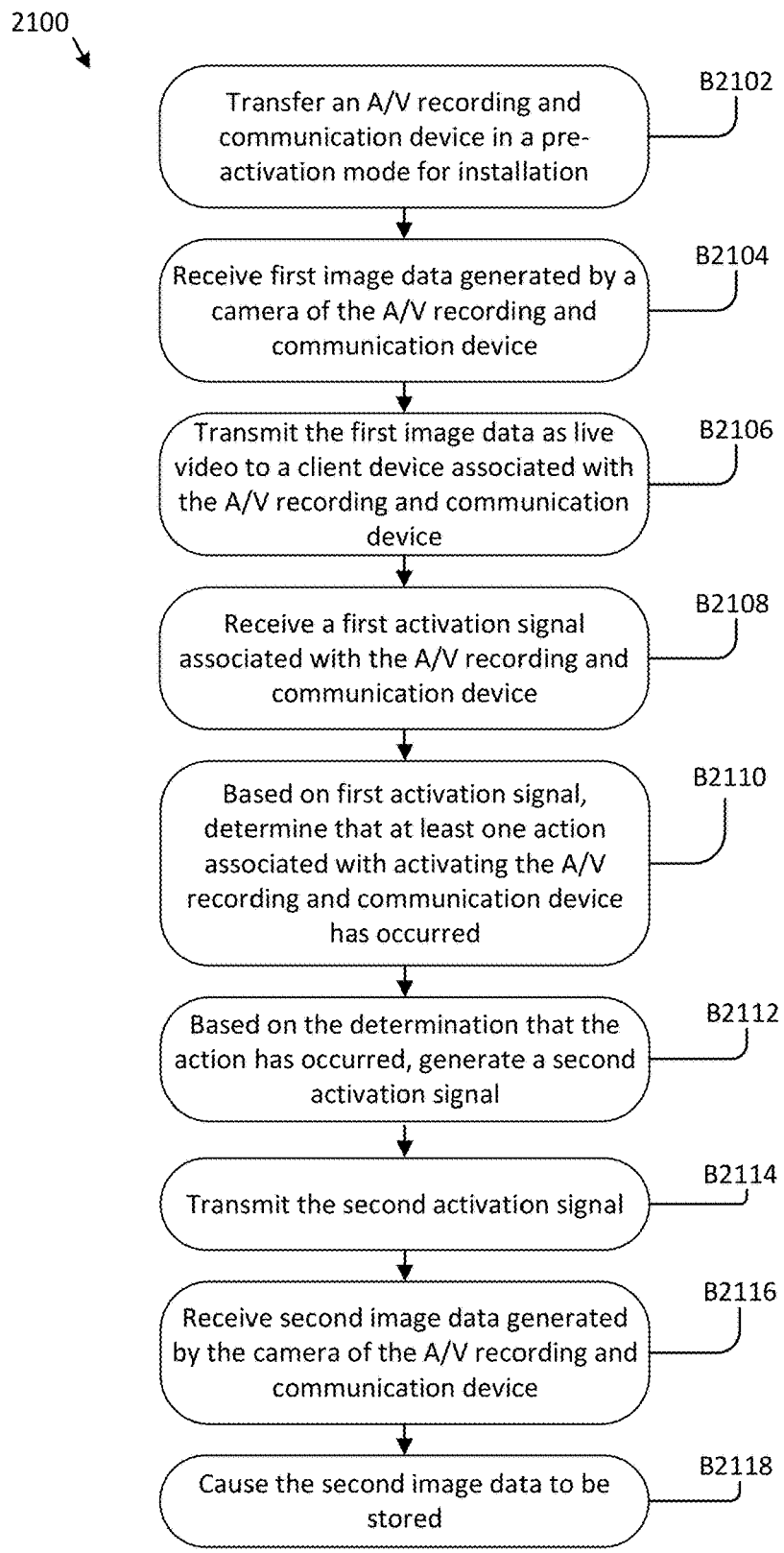

FIG. 21 is a flowchart illustrating an example process 2100 for implementing security system devices as network nodes. The process 2100, at block B2102, transfers an A/V device 1102 in a pre-activation mode for installation. For example, an A/V device 1102 may be provided for installation at a house, business, or other structure. In examples of this disclosure, the A/V device 1102 may include a camera.

The process 2100, at block B2104, receives first image data generated by a camera of the A/V device 1102. For example, the processor 1406 of the server 1122 may receive, using the communication module 1402 (and/or the processor 1306 of the hub device 1112 may receive, using the communication module 1304) (and/or the processor 1216 of the A/V device 1102 may receive, using the communication module 1212), first image data 1224 recorded by the camera 1204 of the A/V device 1102. In some embodiments, the server 1122 (and/or the hub device 1112) (and/or the A/V device 1102) may receive the image data 1224 in response to the A/V device 1102 detecting motion in the field of view of the A/V device 1102. For example, the A/V device 1102 may detect motion of an entity, such as a person, animal, or other moving object, that is in the field of view of the camera 1204 and/or the field of view of the motion sensor 1208 (in embodiments where the A/V device 1102 includes the motion sensor 1208).

The process 2100, at block B2106, transmits the first image data as live video to a client device associated with the A/V device 1102. For example, the processor 1406 of the server 1122 may transmit, using the communication module 1402 (and/or the processor 1306 of the hub device 1112 may transmit, using the communication module 1304) (and/or the processor 1216 of the A/V device 1102 may transmit, using the communication module 1212), the image data 1224 to the client device 1108, 1110 as live streaming video. In some embodiments, the server 1122 (and/or the hub device 1112) (and/or the A/V device 1102) may instruct that the image data 1224 be sent directly to the client device 1108, 1110 for presentation on the client device 1108, 1110. In other embodiments, the image data 1224 may be transmitted to the client device 1108, 1110 via at least one of the hub device 1112 and/or the server 1122.

The process 2100, at block B2108, receives a first activation signal associated with the A/V device. For example, the processor 1406 of the server 1122 may receive, using the communication module 1402 (and/or the processor 1308 of the hub device 1112 may receive, using the communication module 1304) an activation signal (which may be represented by a signal 1246) from the client device 1108, 1110 associated with the security system. For example, an owner of one of the buildings 1902 in FIG. 19 may request, e.g., via input to one of the user interfaces 1524 on the display 1522 of a client device 1108, 1110 that the security device be activated. In other embodiments, the first activation signal 1246 may be generated by the processor 1216 of the A/V device 1102, e.g., in response to a user interaction at the A/V device 1102.

The process 2100, at block B2110, determines, based on the first activation signal, that at least one action associated with activating the A/V device has occurred. For example, the processor 1406 of the server 1122 (and/or the processor 1308 of the hub device 1112) may determine whether the user has performed one or more tasks required to activate the device. In non-limiting examples of this disclosure, the processor 1406 of the server 1122 (or the processor 1306 of the hub device 1112) may determine whether the user has provided configuration settings, e.g. to allow for communication using a wireless network, such as a Wi-fi network; may determine whether the user has provided payment information; may determine whether the user has created an account, e.g., with the device manufacturer; may identify and/or authenticate the user; or the like. In examples of this disclosure, the processor 1406 of the server 1122 (or the processor 1306 of the hub device 1112) may facilitate presentation of one or more of the user interfaces 1524 on the client device 1108, 1110, e.g., to facilitate completion of the at least one action via the client device 1108, 1110.

Based on the action having occurred at block B2110, the process 2100, at block B2112, generates a second activation signal and, at block B2114, transmits the second activation signal. For example, the processor 1406 of the server 1122 (or the processor 1306 of the hub device 1112) may generate a signal (which may be represented by a signal 1246) as an instruction to enter the activated mode based on determining that an authorized user (or client device 1108, 1110) associated with the device has requested activation and has provided appropriate information, which may include payment information, configuration settings, and/or additional information, as discussed herein. The activation signal 1246 may be transmitted to the A/V device 1102 such that the A/V device 1102, e.g., using the activation module 1254, may configure the A/V device 1102 in the activated mode. For example, the activation module 1254 may implement rules 1238 regarding actions that are enabled in the activated mode, for example, by causing components and/or functionality of the A/V device 1102 to be activated or enabled. In other embodiments, the activation signal 1246 may be transmitted to the hub device 1112 with the hub device 1112 implementing one or more rules 1238 to operate in an activated mode. Thus, in some example embodiments, operating in the activation mode or in the pre-activation mode may impact functionality of individual devices or the system as a whole.

The process 2100, at block 2116, receives second image data generated by the camera of the A/V device 1102 recording and communication device. For example, the processor 1406 of the server 1122 may receive, using the communication module 1402 (and/or the processor 1306 of the hub device 1112 may receive, using the communication module 1304) (and/or the processor 1216 of the A/V device 1102 may receive, using the communication module 1212), the image data 1224 recorded by the camera 1204 of the A/V device 1102. In some embodiments, the server 1122 (and/or the hub device 1112) (and/or the A/V device 1102) may receive the image data 1224 in response to the A/V device 1102 detecting motion in the field of view of the A/V device 1102. For example, the A/V device 1102 may detect motion of an entity, such as a person, animal, or other moving object, that is in the field of view of the camera 1204 and/or the field of view of the motion sensor 1208 (in embodiments where the A/V device 1102 includes the motion sensor 1208).

The process 2100, at block 2118, causes the second image data to be stored. For example, the processor 1406 of the server 1122 may transmit, using the communication module 1402 (and/or the processor 1306 of the hub device 1112 may transmit, using the communication module 1304) (and/or the processor 1216 of the A/V device 1102 may transmit, using the communication module 1212), the image data 1224 for writing to storage. For example, once stored, a user, via the client device 1108, 1110, may retrieve the image data 1224. Accordingly, according to the process 2100, image data 1224 may be stored only when the system is in an activated mode, not in the pre-activation mode. Although not shown in FIG. 21, the image data 1224 may also be transmitted to the client device 1108, 1110 as live streaming video. For example, in some embodiments, the server 1122 (and/or the hub device 1112) (and/or the A/V device 1102) may instruct that the image data 1224 be sent directly to the client device 1108, 1110 for presentation on the client device 1108, 1110. In other embodiments, the image data 1224 may be transmitted to the client device 1108, 1110 via at least one of the hub device 1112 and/or the server 1122.

Although not illustrated in FIG. 21, the A/V device 1102 may have an associated base station 1128 (or base station 1128 functionality) configured to broadcast a network, as in embodiments described herein. For example, the base station may broadcast a low-power wide area network in both the pre-activation mode and the activated mode.

Figure 22:
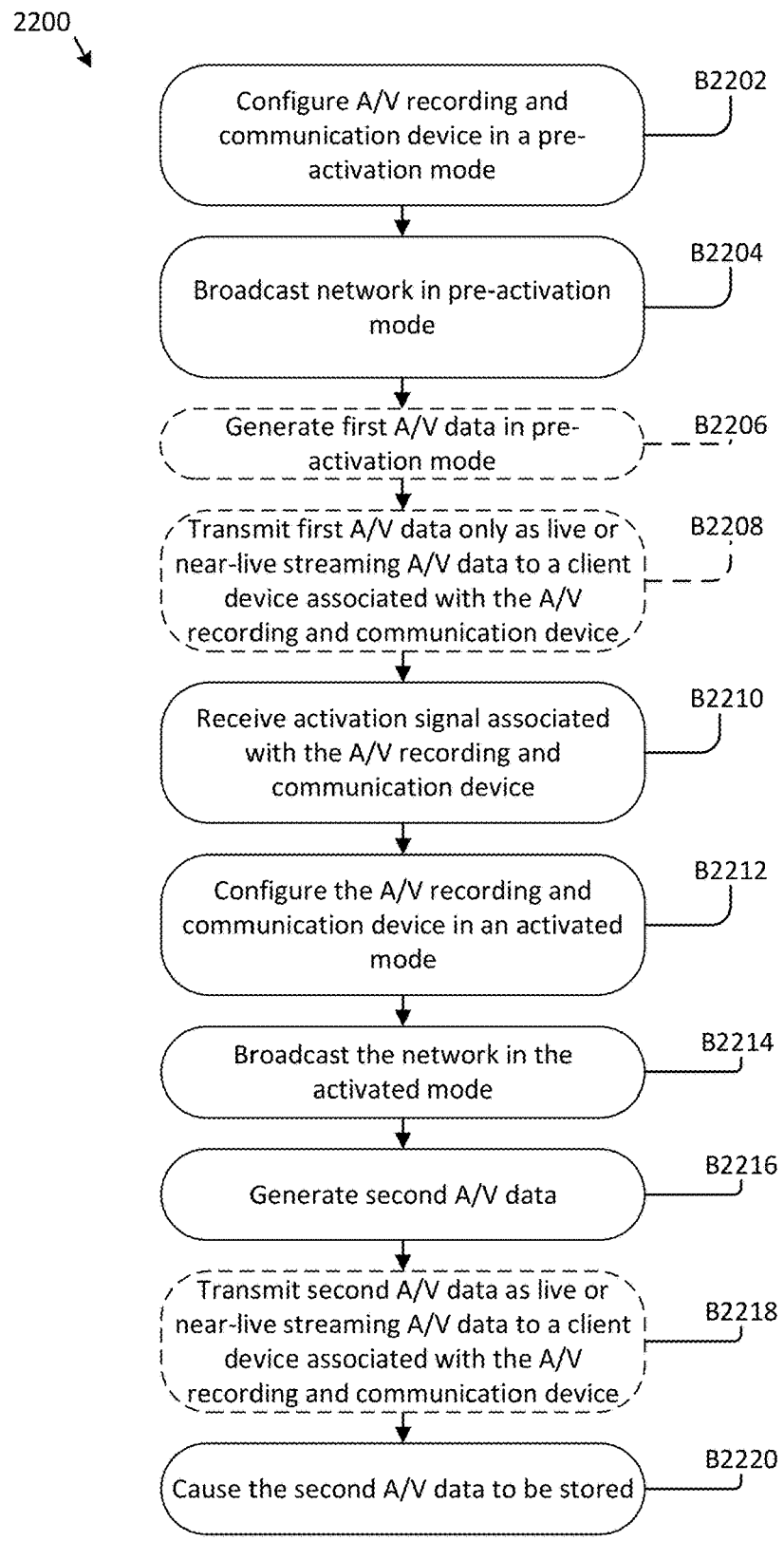

FIG. 22 is a flowchart illustrating an example process 2200 for implementing security system devices as network nodes. For example, the process 2200 may be implemented by an electronic device, such as an A/V device 1102, a hub device 1112 and/or a signaling device 1128, as described herein. In some examples, the electronic device may include a first communication module and one or more second communication modules. For example, the different communication modules may use different radios, protocols and/or functionalities for communicating with a variety of other devices (e.g., A/V devices 1102, sensors 1114, automation devices 1116, hub devices 1112, and/or signaling devices 1128). The electronic device, when embodied as an A/V device 1102, may also include one or more sensors, e.g., configured to generate and/or capture data, such as A/V data. The A/V data may include the image data 1224, the audio data 1226, the motion data 1230, and/or other data, as described herein.

The process 2200, at block 2202, configures the A/V device 1102 in a pre-activation mode. For example, in the pre-activation mode, various components and/or functionalities of the A/V device 1102 may be deactivated or otherwise unavailable. For example, when the A/V device 1102 includes an A/V doorbell 302 and an associated signaling device (e.g., a traditional signaling device or the signaling device 1128), the signaling device may emit a sound when a visitor presses the button on the A/V doorbell 302 (e.g., as in a conventional doorbell), but the video doorbell may not capture video or image data 1224 in the pre-activation mode, and/or the signaling device 1128 may not store, receive, and/or transmit the video or image data 1224 to the client device 1108, 1110 and/or the server 1122. In another non-limiting example, when the security device is the A/V device 1102 in a pre-activation mode, data, such as the image data 1224, may be captured by the A/V device 1102 and transferred to the client device 1108, 1110 such that the user can view a live or near-live video stream from the A/V device 1102, but the image data 1224 may not be stored for future access by the client devices 1108, 1110 (e.g., as cloud storage, local storage, etc.).

The process 2200, at block 2204, also broadcasts a network in the pre-activation mode. For example, the A/V device 1102 may include the base station 1248, including the second communication module 1250 and the second processor 1252. In embodiments of this disclosure, the base station 1248 may be configured to use the second processor 1252 and the second communication module 1250 to configure the A/V device 1102 as a node and/or base station in a larger network, such as a wireless mesh network. For instance, the second communication module 1250 may include a transmitter and an antenna to broadcast the network and/or may include a receiver and the antenna to receive communications on the network. For example, the base station 1248 may act as a node in a short-range wireless network, e.g., Zig-Bee, Bluetooth, Z-Wave, a wireless local area network (WLAN), e.g., Wi-Fi. In some examples, the base station 1248 may be configured to form a part of a Low-Power, wide-area network (LPWAN) (e.g., a Lora WAN network, ultra-narrow band (UNB), narrow-band IoT (NB-IOT, etc.). As noted above, the A/V device 1102 may form a component in the Internet of Things, and the base station 1248 may provide the functionality by which the A/V device 1102 interacts with the Internet of Things. Although the base station 1248 is illustrated as a separate component of the A/V device 1102, some or all of the functionality of the second communication module 1250 and/or of the second processor 1252 may be carried out by the communication module 1212 and/or the processor 1216, respectively.

The process 2200, at block 2206, may also generate first A/V data in the pre-activation mode. For example, the processor 1216 of the A/V device 1102 may cause the camera 1204, the microphone(s) 1206 and/or the motion sensor 1208 to record and/or capture the image data 1224, the audio data 1226, and/or the motion data 1230 as the first A/V data. In some examples, the A/V data may be generated in response to the A/V device 1102 detecting motion in the field of view of the A/V device 1102. For example, the A/V device 1102 may detect motion of an entity, such as a person, animal, or other moving object, that is in the field of view of the camera 1204 and/or the field of view of the motion sensor 1208 (in embodiments where the A/V device 1102 includes the motion sensor 1208).

The process 2200, at block B2208, may also transmit the first A/V data as live video to a client device associated with the A/V device. For example, the processor 1216 of the A/V device 1102 may transmit, using the communication module 1212 (and/or the processor 1306 of the hub device 1112 may transmit, using the communication module 1304), the A/V data to the client device 1108, 1110 as live streaming or near-live streaming A/V data. In some embodiments, the A/V data may be sent directly to the client device 1108, 1110 for presentation on the client device 1108, 1110. In other embodiments, the image data 1224 may be transmitted to the client device 1108, 1110 via at least one of the hub device 1112 and/or the server 1122.

The process 2200, at block B2210, receives an activation signal associated with the A/V device. For example, the processor 1406 of the server 1122 may receive, using the communication module 1402 (and/or the processor 1308 of the hub device 1112 may receive, using the communication module 1304) (and/or the processor 1216 of the A/V device 1102 may receive, using the communication module 1212) an activation signal (which may be represented by a signal 1246) from the client device 1108, 1110 associated with the A/V device 1102. For example, an owner of one of the buildings 1902 in FIG. 19 may request, e.g., via input to one of the user interfaces 1524 on the display 1522 of a client device 1108, 1110 that the A/V device 1102 be activated. In other embodiments, the first activation signal 1246 may be generated by the processor 1216 of the A/V device 1102, e.g., in response to a user interaction at the A/V device 1102.

The process 2200, at block 2212, includes configuring the A/V device in an activated mode. For example, the activation module 1254 may implement rules 1238 regarding actions that are enabled in the activated mode, for example, by causing components and/or functionality of the A/V device 1102 to be activated or enabled. In other embodiments, the activation signal 1246 may be transmitted to the hub device 1112 with the hub device 1112 implementing one or more rules 1238 to operate in an activated mode. Thus, in some example embodiments, operating in the activation mode or in the pre-activation mode may impact functionality of individual devices or the system as a whole. In embodiments of this disclosure, the activated mode may be an enhanced mode, e.g., in which the same features and functions performed in the pre-activation mode still are performed, and in which additional features also are performed.

The process 2200, at block 2214, also broadcasts the network in the activated mode. For example, as discussed with regard to block B2204, regardless of whether in the pre-activation mode or the activated mode, the A/V device 1102 may act as a node in a short-range wireless network, e.g., Zig-Bee, Bluetooth, Z-Wave, a wireless local area network (WLAN), e.g., Wi-Fi. In some examples, the base station 1248 may be configured to form a part of a Low-Power, wide-area network (LPWAN) (e.g., a Lora WAN network, ultra-narrow band (UNB), narrow-band IoT (NB-IOT, etc.). Some or all of the broadcasting may be carried out by the second communication module 1250 and the second processor 1252 and/or by the communication module 1212 and the processor 1216.

The process 2200, at block 2216 generate second A/V data in the activated mode. For example, the processor 1216 of the A/V device 1102 may cause the camera 1204, the microphone(s) 1206 and/or the motion sensor 1208 to record and/or capture the image data 1224, the audio data 1226, and/or the motion data 1230 as the first A/V data. In some examples, the A/V data may be generated in response to the A/V device 1102 detecting motion in the field of view of the A/V device 1102. For example, the A/V device 1102 may detect motion of an entity, such as a person, animal, or other moving object, that is in the field of view of the camera 1204 and/or the field of view of the motion sensor 1208 (in embodiments where the A/V device 1102 includes the motion sensor 1208). The second A/V data may be the same as the first A/V data, with the only difference being the state of the A/V device 1102 when the data is generated, e.g., the first A/V data being generated when the A/V device 1102 is in the pre-activation mode and the second A/V data being generated when the A/V device 1102 is the activated mode. In other examples, in the pre-activated mode, blocks 2206 and 2208 may not be performed, e.g., because components of the A/V device 1102 like the camera 1204 and/or the microphone(s) 1206 may be powered off in the pre-activation mode. In these examples, only in the activated mode may the A/V data be generated.

The process 2200, at block B2218, may also transmit the first A/V data as live video to a client device associated with the A/V device. For example, the processor 1216 of the A/V device 1102 may transmit, using the communication module 1212 (and/or the processor 1306 of the hub device 1112 may transmit, using the communication module 1304), the second A/V data to the client device 1108, 1110 as live streaming or near-live streaming A/V data. In some embodiments, the A/V data may be sent directly to the client device 1108, 1110 for presentation on the client device 1108, 1110. In other embodiments, the image data 1224 may be transmitted to the client device 1108, 1110 via at least one of the hub device 1112 and/or the server 1122.

The process 2200, at block 2218, also causes the second A/V data to be stored. For example, the processor 1406 of the server 1122 may transmit, using the communication module 1402 (and/or the processor 1306 of the hub device 1112 may transmit, using the communication module 1304) (and/or the processor 1216 of the A/V device 1102 may transmit, using the communication module 1212), the image data 1224 for writing to storage. For example, once stored, a user, via the client device 1108, 1110, may retrieve the image data 1224. Accordingly, according to the process 2200, A/V data may be stored only when the system is in an activated mode, not in the pre-activation mode.

Figure 23:
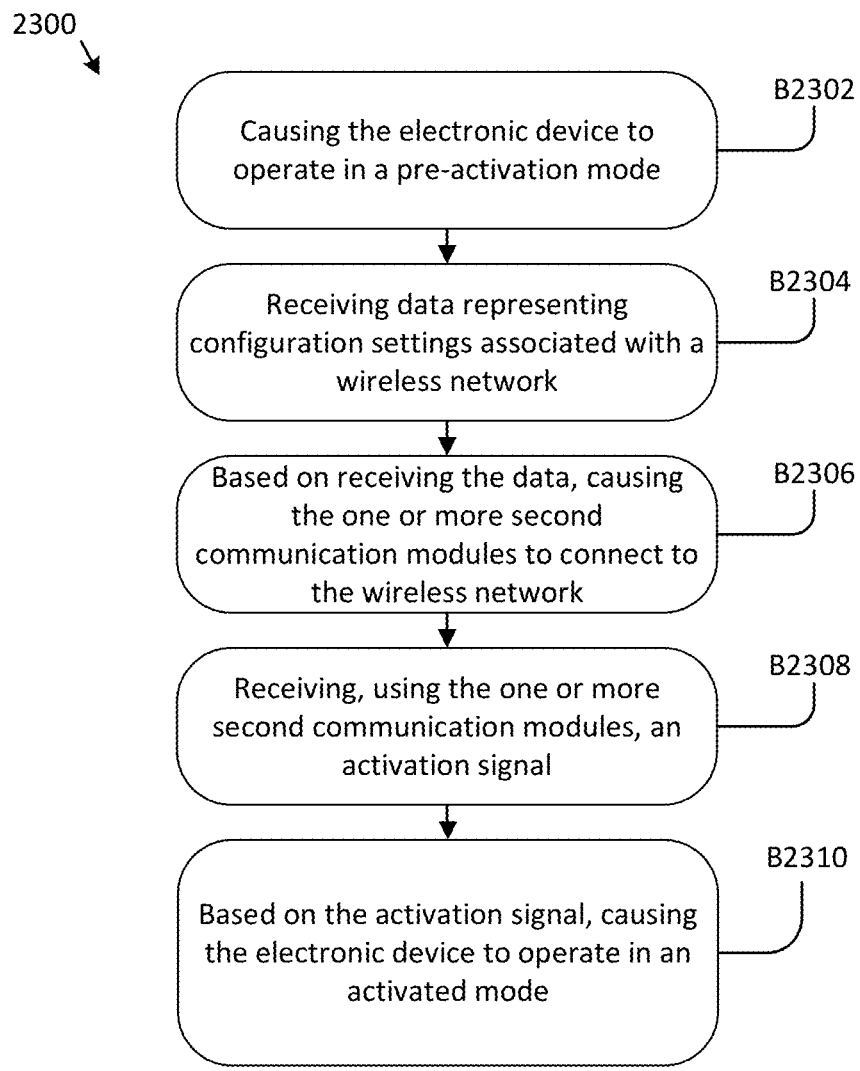

FIG. 23 is a flowchart illustrating an example process 2300 for implementing security system devices as network nodes. For example, the process 2300 may be implemented by an electronic device, such as an A/V device 1102, a hub device 1112, and/or a signaling device 1128, as described herein. In some examples, the electronic device may include a first communication module and one or more second communication modules. For example, the different communication modules may use different radios, protocols and/or functionalities for communicating with a variety of other devices (e.g., A/V devices 1102, sensors 1114, automation devices 1116, hub devices 1112, and/or signaling devices 1128).

The process 2300, at block B2302, causes an electronic device to operate in a pre-activation mode. For example, the electronic device may be a signaling device 1128, the hub device 1112, and/or the A/V device 1102. In embodiments where the electronic device is the signaling device 1128, the signaling device 1128 may be in communication with one or more A/V devices 1102 and/or traditional doorbells. The signaling device 1128 may include a first communication module and one or more second communication modules. In the pre-activation mode, the first communication module may be configured to generate a signal in response to an input at an associated A/V device 1102 and/or traditional doorbell. For example, in the pre-activation mode, the first communication module may generate and/or receive the signal in response to a visitor pressing a button at a A/V doorbell 302 and/or the traditional doorbell. Also in the pre-activation mode, the one or more second communication modules may broadcast a low power, wide area network (LPWAN) and/or another type of network. For example, as discussed above with reference to FIG. 19, the electronic device may be a security device 1904 and/or a signaling device 1906 installed by a new home builder, during remodeling, by a homeowner or renter, or otherwise in a pre-activation mode. The security devices 1904 and/or the signaling devices 1906 may also include the base station 1248 (or functionality ascribed herein to the base station 1248) to form a node of a network covering a geographic area.

Moreover, in the pre-activation mode, various components and/or functionalities of the electronic devices may be deactivated or otherwise unavailable. For example, when the security device installed includes a A/V doorbell 302 and an associated signaling device, the signaling device may emit a sound when a visitor presses the button on the A/V doorbell 302 (e.g., as in a conventional doorbell and in response to the signal generated by the first communication module), but the video doorbell may not capture video or image data 1224 in the pre-activation mode. In another non-limiting example, when the electronic device is the A/V device 1102, data, such as the image data 1224, may be captured by the A/V device 1102 and transferred to the client device 1108, 1110, e.g., so the user can view a live video stream from the A/V device 1102, but the image data 1224 may not be stored in the pre-activation mode. As another example, when the electronic device is a signaling device 1128 and/or a hub device 1112, the signaling device 1128 and/or the hub device 1112 may not be connected to other devices (e.g., sensors 1114, automation devices 1116, etc.) and/or other networks (e.g., Bluetooth, Wi-Fi, Z-wave, etc.) when in the pre-activation mode.

The process 2300, at block B2304, receives data representing configuration settings associated with a wireless network. For example, the processor 1306 of the hub device 1112 (and/or the signaling device 1128) may receive, using the communication module 1304 (and/or the processor 1406 of the server 1122 may receive, using the communication module 1402) (and/or the processor 1216 of the A/V device 1102 may receive, using the communication module 1212) configuration settings. In some embodiments, the configuration settings may be received from a client device 1108, 1110 and/or a server 1122. In some implementations, the configuration settings may include one or more of an identification of the wireless network (e.g., the user's network 1104), a password for accessing the wireless network, or the like. In some implementations, the user may be prompted, e.g., via one of the user interfaces 1524 on the display 1522, to provide the configuration settings. In response to the user inputting the settings, the processor 1512 of the client device 1108, 1110 may generate an output signal 1236 with the network settings, and the communication module 1510 of the client device 1108, 1110 may transmit the output signal 1236 to the electronic device (e.g., the A/V device 1102, the hub device 1112, and/or the signaling device 1128).

The process 2300, at block B2306, based on receiving the data, causes the one or more second communication modules to connect to the wireless network. For example, the processor 1306 of the hub device 1112 (and/or the signaling device 1128), using the communication module 1304 (and/or the processor 1216 of the A/V device 1102, using the communication module 1212) may join a wireless network. In examples of this disclosure, the wireless network is different from the low power, wide area network, and represents a different network over which data may be transmitted, received, and/or retrieved. For example, the wireless network may be the user's network 1104, which may be a home Wi-Fi network, a Bluetooth network, a Zigbee network, another type of network, and/or a combination thereof.

The process 2300, at block B2308, receives, using the one or more second communication modules, an activation signal. For example, the processor 1308 of the hub device 1112 (and/or the signaling device 1128), using the communication module 1304 (and/or the processor of the A/V device 1102, using the communication module 1212), may receive an activation signal (which may be represented by a signal 1246) from the server 1122 (and/or another device of the network of servers/backend devices 1118), the hub device 1112, the signaling device 1128, and/or the client device 1108, 1110. In some examples, the server 1122 may have received another activation request from a client device 1108, 1110 associated with the security system. For example, an owner of one of the buildings 1902 in FIG. 19 may request, e.g., via input to one of the user interfaces 1524 on the display 1522 of a client device 1108, 1110, that the security device be activated. In other embodiments, the activation request may be generated by the processor 1308 of the hub device 1112 (and/or the signaling device 1128), e.g., in response to a user interaction (e.g., input to a reset button, a setup button, etc.) at hub device 1112 (and/or the signaling device 1128), and sent, e.g., using the communication module 1304, to the server 1122. In some examples, a combination of the hub device 1112 (and/or the signaling device 1128), the A/V device 1102, and/or the client device 1108, 1110 may transmit the activation requests. In response to receiving the activation request(s), the processor 1406 of the server 1122, using the communication module 1402, may generate and cause the activation signal to be sent to the hub device 1112, the signaling device 1128, and/or the A/V device 1102.

The process 2300, at block B2310, based on the activation signal, causes the electronic device to operate in an activated mode. For example, the processor 1306 of the hub device 1112 (and/or the signaling device 1128), using the activation module 1254 (and/or the processor 1216 of the A/V device 1102, using the activation module 1254), may configure the electronic device to operate in the activated mode. For example, the activation module 1254 may implement rules 1238 regarding actions that are enabled in the activated mode, for example, by causing components and/or functionality of the hub device 1112, the signaling device 1128, and/or the A/V device 1102 to be activated or enabled. In some examples, in the activated mode, the one or more second communication modules may be configured to communicate with at least one second electronic device using at least one of the wireless network, the LPWAN, and one or more other networks. For example, in the activated mode, the hub device 1112, the signaling device 1128, and/or the A/V device 1102 may cause image data 1224 or other sensor data to be stored and/or transmitted to one or more third parties. Moreover, in the activated mode, the electronic device may continue to broadcast the low-power, wide area network and continue to generate signals, via the first communication module, e.g., in response to sensing a motion or input at an A/V device 1102 and/or input to a traditional doorbell button.

The processes described herein, including the processes 2000, 2100, 2200, and 2300, may enhance safety by facilitating the installation and activation of security devices. For example, the processes transfer security devices for installation. Once installed, the devices and/or the system including the devices may be configured in a pre-activation mode with a first set of functionalities. For example, if the devices are doorbells, they may be capable of functioning like a traditional doorbell whereby they sound a signaling device when a button on the doorbell is pressed. Moreover, image data captured by the video doorbell may be accessible as a live stream. The homeowner may subsequently desire to activate the security device and/or the system, e.g. to allow for additional functionality. Thus, prevalence of security devices and user control over functionality of those devices are increased. Moreover, in embodiments described herein, the security devices may include a base station, to act as a node in an area network, such as a low-power wide area network. The base stations may broadcast a network in either the pre-activation mode or the activated mode, which may create beneficial communication capabilities throughout a geographic area. As a result, the processes described herein increase the safety of an individual properties family, pets, and/or property, as well as the safety of the surrounding areas.

Figure 24:
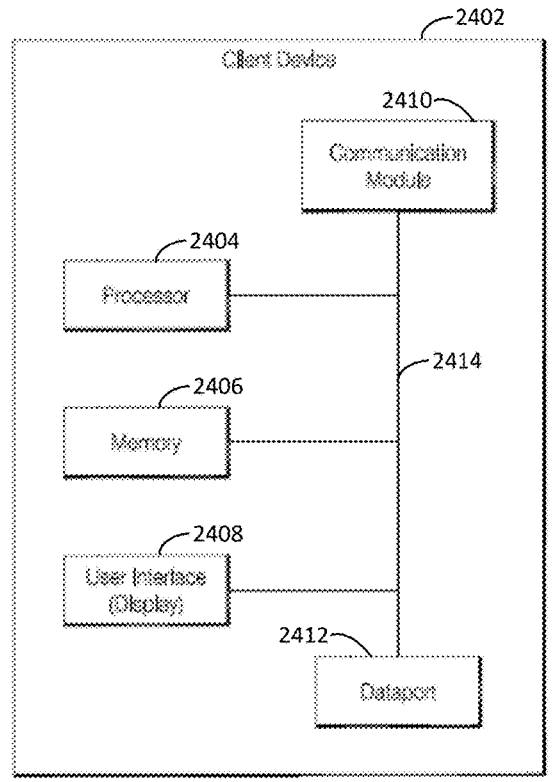
FIG. 24 is a functional block diagram of a client device on which example embodiments may be implemented according to various aspects of the present disclosure.

FIG. 24 is a functional block diagram of a client device 2402 on which the present embodiments may be implemented according to various aspects of the present disclosure. The user's client device 114 described with reference to FIG. 1 and/or the client device 1108, 1110 described with reference to FIG. 15 may include some or all of the components and/or functionality of the client device 2402. The client device 2402 may comprise, for example, a smartphone.

With reference to FIG. 24, the client device 2402 includes a processor 2404, a memory 2406, a user interface 2408, a communication module 2410, and a dataport 2412. These components are communicatively coupled together by an interconnect bus 2414. The processor 2404 may include any processor used in smartphones and/or portable computing devices, such as an ARM processor (a processor based on the RISC (reduced instruction set computer) architecture developed by Advanced RISC Machines (ARM).). In some embodiments, the processor 2404 may include one or more other processors, such as one or more conventional microprocessors, and/or one or more supplementary co-processors, such as math co-processors.

The memory 2406 may include both operating memory, such as random-access memory (RAM), as well as data storage, such as read-only memory (ROM), hard drives, flash memory, or any other suitable memory/storage element. The memory 2406 may include removable memory elements, such as a CompactFlash card, a MultiMediaCard (MMC), and/or a Secure Digital (SD) card. In some embodiments, the memory 2406 may comprise a combination of magnetic, optical, and/or semiconductor memory, and may include, for example, RAM, ROM, flash drive, and/or a hard disk or drive. The processor 2404 and the memory 2406 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2404 may be connected to the memory 2406 via the dataport 2412.

The user interface 2408 may include any user interface or presentation elements suitable for a smartphone and/or a portable computing device, such as a keypad, a display screen, a touchscreen, a microphone, and a speaker. The communication module 2410 is configured to handle communication links between the client device 2402 and other, external devices or receivers, and to route incoming/outgoing data appropriately. For example, inbound data from the dataport 2412 may be routed through the communication module 2410 before being directed to the processor 2404, and outbound data from the processor 2404 may be routed through the communication module 2410 before being directed to the dataport 2412. The communication module 2410 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2412 may be any type of connector used for physically interfacing with a smartphone and/or a portable computing device, such as a mini-USB port or an IPHONE©/IPOD© 30-pin connector or LIGHTNING© connector. In other embodiments, the dataport 2412 may include multiple communication channels for simultaneous communication with, for example, other processors, servers, and/or client terminals.

The memory 2406 may store instructions for communicating with other systems, such as a computer. The memory 2406 may store, for example, a program (e.g., computer program code) adapted to direct the processor 2404 in accordance with the present embodiments. The instructions also may include program elements, such as an operating system. While execution of sequences of instructions in the program causes the processor 2404 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 25:
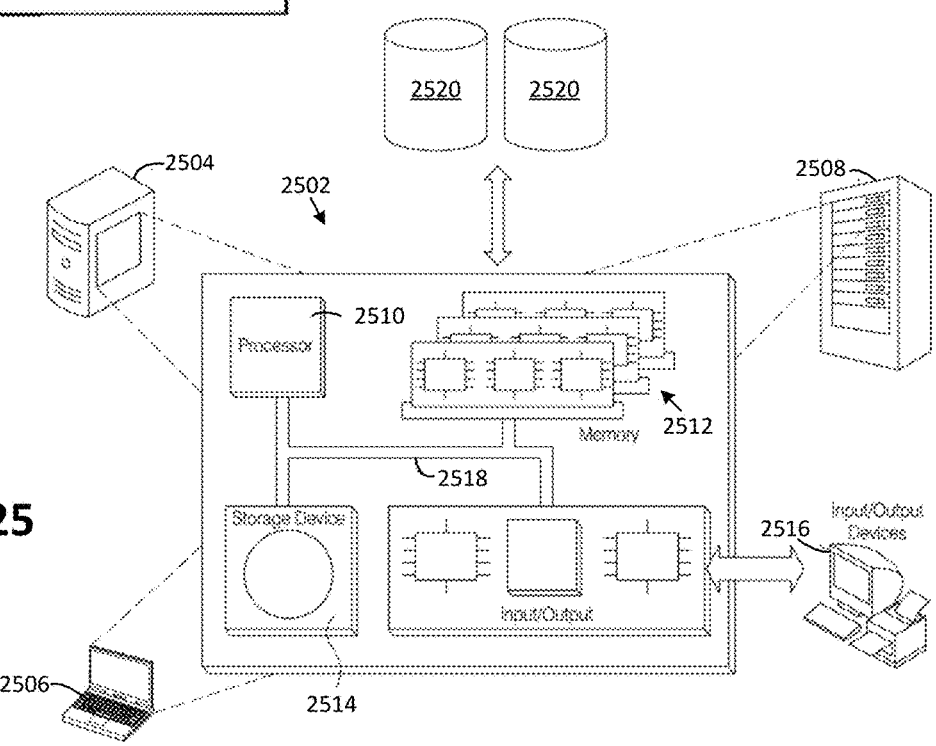
FIG. 25 is a functional block diagram of a general-purpose computing system on which example embodiments may be implemented according to various aspects of present disclosure.

FIG. 25 is a functional block diagram of a general-purpose computing system on which the present embodiments may be implemented according to various aspects of the present disclosure. The computer system 2502 may be embodied in at least one of a personal computer (also referred to as a desktop computer) 2504, a portable computer (also referred to as a laptop or notebook computer) 2506, and/or a server 2508. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2502 may execute at least some of the operations described above. The computer system 2502 may include at least one processor 2510, memory 2512, at least one storage device 2514, and input/output (I/O) devices 2516. Some or all of the components 2510, 2512, 2514, 2516 may be interconnected via a system bus 2518. The processor 2510 may be single- or multi-threaded and may have one or more cores. The processor 2510 may execute instructions, such as those stored in the memory 2512 and/or in the storage device 2514. Information may be received and output using one or more I/O devices 2516.

The memory 2512 may store information, and may be a computer-readable medium, such as volatile or non-volatile memory. The storage device(s) 2514 may provide storage for the system 2502, and may be a computer-readable medium. In various aspects, the storage device(s) 2514 may be a flash memory device, a hard disk device, an optical disk device, a tape device, or any other type of storage device.

The I/O devices 2516 may provide input/output operations for the system 2502. The I/O devices 2516 may include a keyboard, a pointing device, and/or a microphone. The I/O devices 2516 may further include a display unit for displaying graphical user interfaces, a speaker, and/or a printer. External data may be stored in one or more accessible external databases 2520.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

EXAMPLE CLAUSES

In a first aspect, a method comprises: transferring a plurality of security devices in a pre-activation mode for installation at a plurality of structures located within a geographic area, individual of the plurality of security devices comprising a base station including a processor and a wireless communication module, wherein, when in the pre-activation mode, individual of the plurality of base stations is configured to deactivate one or more components of the security device and, using the respective wireless communication module, broadcast a low-power wide area network (LPWAN) such that, in combination with the LPWAN broadcast by other of the plurality of base stations, the LPWAN provides coverage to the geographic area; receiving at least a first activation signal associated with a first security device of the plurality of security devices, the first activation signal including a request to activate the first security device, the first security device being installed in a first structure of the plurality of structures; based on the receiving of the first activation signal, determining that at least one action associated with activating the security device has occurred; based on the determining that the at least one action has occurred, generating a second activation signal, the second activation signal configured to cause the security device to activate the one or more components; and transmitting the second activation signal to the security device.

In an embodiment of the first aspect, the security device comprises at least one of an audio/video recording and communication device (A/V device), a hub device, a signaling device, and a lighting system.

In another embodiment of the first aspect, the security device comprises a signaling device communicatively coupled to a doorbell.

In another embodiment of the first aspect, the doorbell is an A/V doorbell.

In another embodiment of the first aspect, the at least one action comprises at least one of associating the security device with a user, associating a user account with the security device, receiving configuration settings and receiving payment details from the user.

In another embodiment of the first aspect, the first activation signal is received from a client device associated with the first security device.

In another embodiment of the first aspect, the security device comprises an A/V device and the one or more components comprise at least one of a camera, a motion sensor, a light, an antenna, a transmitter, and a receiver.

In another embodiment of the first aspect, the base station comprises a hub device and the one or more components comprise at least one of an antenna and a communication module.

In another embodiment of the first aspect, in the pre-activation mode, the hub device is configured to send data from an A/V device to a client device associated with the A/V device, and wherein, in an activation mode in which the one or more components are activated, the hub device is configured to store the data from the A/V device.

In another embodiment of the first aspect, individual of the plurality of base stations are transferred free of charge.

In another embodiment of the first aspect, the geographic area comprises a neighborhood and the plurality of structures comprise at least one of a house and a garage.

In second aspect, a method includes: transferring a security device in a pre-activation mode for installation at a structure located within a geographic area, the security device comprising a base station including a processor and a wireless communication module, wherein, when in the pre-activation mode, the security device is configured to deactivate one or more components of the security device and, using the wireless communication module, broadcast a network; receiving at least a first activation signal including a request to activate the security device; based on the receiving of the first activation signal, determining that at least one action associated with activating the security device has occurred; based on the determining that the at least one action has occurred, generating a second activation signal, the second activation signal configured to cause the security device to activate the one or more components; and transmitting the second activation signal to the security device.

In an embodiment of the second aspect, the network is a first network, and the first network, in combination with a second network broadcast by at least one second base station within the geographic area, provides coverage to the geographic area.

In another embodiment of the second aspect, the first network and the second network are a low-power wide area network (LPWAN).

In another embodiment of the second aspect, the security device comprises at least one of an audio/video recording and communication device (A/V device), a hub device, a signaling device, and a lighting system.

In another embodiment of the second aspect, the at least one action comprises at least one of associating the security device with a user, associating a user account with the security device, receiving configuration settings, and receiving payment details from the user.

In another embodiment of the second aspect, the first activation signal is received from a client device associated with the security device.

In another embodiment of the second aspect, the security device comprises an A/V device and the one or more components comprise at least one of a camera, a motion sensor, lights, an antenna, a transmitter, and a receiver.

In another embodiment of the second aspect, the security device comprises a hub device and the one or more components comprise at least one of an antenna and a communication module.

In another embodiment of the second aspect, in the pre-activation mode, the hub device is configured to send data from an A/V device to a client device associated with the A/V device, and wherein, in an activation mode in which the one or more components are activated, the hub device is configured to store the data from the A/V device.

In another embodiment of the second aspect, in the pre-activation mode, at least one of data generated by and data received by the security device is transmitted to a client device associated with the security device, and wherein, in an activated mode in which the one or more components are activated, the at least one of the data generated by and the data received by the security device is transmitted to the client device and stored for future access by the client device.

In another embodiment of the second aspect, when the security device is in the pre-activation mode, the client device can only access the at least one of the data generated by and the data received by the security device as a live stream, and wherein, when the security device is in the activation mode, the client device can access the at least one of the data generated by and the data received by the security device as a live stream and as a pre-recorded stream.

In another embodiment of the second aspect, the security device is transferred free of charge.

In another embodiment of the second aspect, the geographic area comprises a neighborhood and the structure comprises at least one of a house and a garage.

In another embodiment of the second aspect, the network comprises a low-power wide area network (LPWAN).

In another embodiment of the second aspect, the receiving at least the first activation signal, the determining that the at least one action, the generating the second activation signal, and the transmitting the second activation signal to the security device is performed by a backend device communicatively coupled to the security device.

In a third aspect, a method of controlling an audio/video recording and communication device (A/V device), the A/V device comprising a sensor, a processor, and a wireless communication module and the A/V device being installed at a structure in a geographic area, the method includes: configuring the A/V device in a pre-activation mode, wherein, when the A/V device is in the pre-activation mode, the A/V device is configured to broadcast a low-power wide area network (LPWAN) using the wireless communication module, and wherein the LPWAN, in combination with additional devices in the geographic area, provides coverage to the geographic area; generating, using the sensor and with the A/V device in the pre-activation mode, first A/V data in response to detecting a first object in a field of view of the A/V device; transmitting the first A/V data only as one of live streaming A/V data and near-live streaming A/V data to a client device associated with the A/V device; receiving an activation signal associated with the A/V device, the activation signal including a request to activate the A/V device; based on the activation signal, configuring the A/V device in an activated mode, wherein, when the A/V device is in the activated mode, the A/V device is configured to broadcast the LPWAN using the wireless communication module; generating, using the sensor and with the A/V device in the activated mode, second A/V data in response to detecting a second object in the field of view of the A/V device; transmitting the second A/V data as one of the live streaming A/V data and the near-live streaming A/V data to the client device; and transmitting the second A/V data to a storage device associated with the A/V device for storing the second image data.

In an embodiment of the third aspect, the sensor comprises a camera and the first A/V data and the second A/V data comprise image data.

In another embodiment of the third aspect, the configuring the A/V device in the activated mode comprises associating the A/V device with a wireless network different from the LPWAN.

In another embodiment of the third aspect, the wireless network comprises at least one of a Bluetooth network and a Wi-Fi Direct network.

In another embodiment of the third aspect, the A/V device comprises a video doorbell and wherein at least one of the detecting the first object and the detecting the second object comprises receiving a user input at a button of the video doorbell.

In another embodiment of the third aspect, the A/V device comprises a security camera and wherein at least one of the detecting the first object comprises sensing motion of the first object and the detecting the second object comprises sensing motion of the second object in the field of view.

In another embodiment of the third aspect, the method further includes determining that at least one action associated with activating the A/V device has occurred, wherein the configuring the A/V device in the activated mode is based on the at least one action occurring.

In another embodiment of the third aspect, the at least one action comprises at least one of associating a user with the A/V device, associating a user account with the A/V device, and receiving payment details from the user.

In another embodiment of the third aspect, the method further includes, transferring the A/V device to a third party for installation at the location.

In another embodiment of the third aspect, the video doorbell is transferred free of charge.

In another embodiment of the third aspect, the video doorbell comprises a signaling device disposed in the structure, the signaling device being configured to broadcast a low-power wide area network.

In a fourth aspect, a method of controlling an audio/video recording and communication device (A/V device), the A/V device comprising a sensor and a wireless communication module and the A/V device being installed at a structure in a geographic area, the method includes: configuring the A/V device in a pre-activation mode, wherein the A/V device is in the pre-activation mode, the A/V device is configured to broadcast a low-power wide area network (LPWAN) using the wireless communication module, and wherein the LPWAN, in combination with additional devices in the geographic area, provides coverage to the geographic area; receiving an activation signal associated with the A/V device, the activation signal including a request to activate the A/V device; based on the activation signal, configuring the A/V device in an activated mode, wherein, when the A/V device is in the activated mode, the A/V device is configured to broadcast the LPWAN using the wireless communication module; generating, using the sensor and with the A/V device in the activated mode, sensor data in response to detecting an object in a field of view of the A/V device; and transmitting the sensor data to a device associated with the A/V device.

In an embodiment of the fourth aspect, the method further includes: generating, using the sensor and with the A/V device in the pre-activation mode, additional sensor data in response to determining an additional object in the field of view of the A/V device; transmitting the additional sensor data only to a client device associated with the A/V device as one of live sensor feed data and near-live sensor feed data; and transmitting the sensor data to the client device as one of the live sensor feed data and the near-live sensor feed data.

In another embodiment of the fourth aspect, the transmitting the sensor data to the device associated with the A/V device comprises transmitting the sensor data to at least one of a server, a hub device, a signaling device, and the client device for storage and subsequent retrieval by the client device.

In another embodiment of the fourth aspect, the configuring the A/V device in the activated mode comprises activating the sensor to generate the sensor data.

In another embodiment of the fourth aspect, at least one of the sensor comprises a camera and the sensor data comprises image data and the sensor comprises a microphone and the sensor data comprises audio data.

In another embodiment of the fourth aspect, the configuring the A/V device in the activated mode comprises associating the A/V device with a wireless network different from the LPWAN.

In another embodiment of the fourth aspect, the wireless network comprises at least one of a Bluetooth network and a Wi-Fi Direct network.

In another embodiment of the fourth aspect, the A/V device comprises a video doorbell and generating the sensor data comprises generating image data, the method further comprising: receiving a user input at a button of the video doorbell; and causing an audible output in response to a user input at a button of the video doorbell.

In another embodiment of the fourth aspect, the generating the image data is in response to receiving the user input only when the video doorbell is in the activated mode.

In another embodiment of the fourth aspect, the A/V device comprises a floodlight having a light and a motion sensor, the method further comprising: sensing, using the motion sensor, movement in a field of view of the motion sensor; and operating the light in response to the sensing the movement.

In another embodiment of the fourth aspect, the generating the sensor data is in response to sensing the movement, and wherein one of the sensor data is not generated when the floodlight is configured in the pre-activation mode and the sensor data is not transmitted to the device when the floodlight is in the pre-activation mode.

In another embodiment of the fourth aspect, the light is operated with the floodlight device in the pre-activation state and the in the activated state.

In another embodiment of the fourth aspect, the A/V device comprises a security camera and wherein the detecting the object comprises sensing motion of the object.

In another embodiment of the fourth aspect, the method further includes determining that at least one action associated with activating the A/V device has occurred, wherein the configuring the A/V device in the activated mode is based on the at least one action occurring.

In another embodiment of the fourth aspect, the at least one action comprises at least one of associating a user with the A/V device, associating a user account with the A/V device 1102, and receiving payment details from the user.

In another embodiment of the fourth aspect, the method further includes, transferring the A/V device to a third party for installation at the structure.

In another embodiment of the fourth aspect, the A/V device is transferred free of charge.

In another embodiment of the fourth aspect, the A/V device comprises a signaling device disposed in the structure.

In a fifth aspect, an electronic device includes: a first communication module communicatively coupled to a doorbell; a second communication module; a sound component configured to generate a sound in response to receiving a signal from the first communication module; one or more processors; and a non-transitory machine-readable memory storing a program, the program executable by at least one of the one or more processors, the program comprising instructions for: causing the electronic device to operate in a pre-activation mode, wherein the first communication module is configured to generate the signal in response to an input to the doorbell while the electronic device operates in the pre-activation mode; receiving, from a client device, data representing configuration settings associated with a wireless network; based on the receiving of the data, causing the second communication module to connect to the wireless network using the configuration settings; transmitting, using the second communication module, a first activation signal to a server associated with the electronic device; based on the transmitting of the first activation signal, receiving, using the second communication module, a second activation signal from the server; and based on the receiving of the second activation signal, causing the electronic device to operate in an activated mode, wherein, while the electronic device operates in the activated mode: the first communication module is configured to generate the signal; and the second communication module is configured to communicate with one or more other electronic devices via at least one of the wireless network and other wireless networks.

In an embodiment of the fifth aspect, the electronic device comprises a signaling device.

In another embodiment of the fifth aspect, the signaling device is one a digital signaling device and a mechanical signaling device.

In another embodiment of the fifth aspect, the electronic device is hard-wired to a structure where the electronic device is located.

In another embodiment of the fifth aspect, the input to the doorbell comprises at least one of a user input at a button of the doorbell and detecting motion in a field of view of a sensor of the doorbell.

In another embodiment of the fifth aspect, the sensor is at least one of a camera and a motion sensor.

In another embodiment of the fifth aspect, the electronic device is configured, in the pre-activation mode and in the activated mode, to broadcast a network.

In another embodiment of the fifth aspect, the network comprises a low-power wide area network (LPWAN).

In another embodiment of the fifth aspect, the network is broadcast by at least one of the first communication module, the second communication module, and an additional communication module.

In another embodiment of the fifth aspect, the doorbell is an A/V doorbell, and wherein while the electronic device operates in the activated mode, audio/video data received from the doorbell is stored in a database associated with the electronic device.

In another embodiment of the fifth aspect, the database is located on at least one of the electronic device and a backend device.

In another embodiment of the fifth aspect, the backend device is at least one of a server, an application programming interface, and a storage device.

In another embodiment of the fifth aspect, the doorbell is an A/V doorbell, and wherein while the electronic device operates in the activated mode, the electronic device is configured to transmit audio/video data received from the doorbell to a backend device for storage by the backend device.

In another embodiment of the fifth aspect, the doorbell is an A/V doorbell, and wherein while the electronic device operates in the pre-activation mode, the electronic device is configured to transmit audio/video data received from the doorbell only as one of live streaming audio/video data and near-live streaming audio/video data to at least one of a client device associated with the doorbell and a backend device.

In another embodiment of the fifth aspect, the doorbell is an A/V doorbell, and wherein while the electronic device operates in the pre-activation mode, the electronic device is configured to refrain from transmitting audio/video data received from the doorbell.

In another embodiment of the fifth aspect, the receiving the data representing the configuration settings comprises receiving the data by at least one of the second communication module and an additional communication module.

In another embodiment of the fifth aspect, the data is received over one of a Bluetooth network and a Wi-Fi direct network.

In a sixth aspect, an electronic device includes a first communication module communicatively coupled to a sensor; a second communication module; a sound component configured to generate a sound in response a signal being received by the first communication module and from the sensor; one or more processors; and a non-transitory machine-readable memory storing a program, the program executable by at least one of the one or more processors, the program comprising instructions for: causing the electronic device to operate in a pre-activation mode, wherein the first communication module is configured to receive the signal from the sensor while the electronic device operates in the pre-activation mode; receiving, from a client device, a request to configure the electronic device in an activated mode; based on receiving the request, transmitting, using the second communication module, a first activation signal; based on the transmitting of the first activation signal, receiving, using the second communication module, a second activation signal; and based on the receiving of the second activation signal, causing the electronic device to operate in an activated mode, wherein, while the electronic device operates in the activated mode: the first communication module is configured to receive the signal; and the second communication module is configured to communicate with one or more other electronic devices via one or more wireless networks.

In an embodiment of the sixth aspect, the electronic device comprises a signaling device, the one or more other electronic devices comprise at least one of a home-security sensor, an automation device, and an A/V device, and the one or more wireless networks include at least one of Wi-Fi, Bluetooth, Z-Wave, Zigbee, X10, Ethernet, RS-485, and 6LoWPAN.

In another embodiment of the sixth aspect, the electronic device comprises a signaling device configured for hard-wired installation in a building, and the first communication module comprises a wired connection.

In another embodiment of the sixth aspect, the input to the sensor comprises at least one of a user input at a button and detecting motion in a field of view of the sensor.

In another embodiment of the sixth aspect, the program comprises further instructions for: receiving, from a client device, data representing configuration settings associated with a wireless network; based on the receiving of the data, causing the second communication module to connect to the wireless network using the configuration settings.

In another embodiment of the sixth aspect, the electronic device is configured, in the pre-activation mode and in the activated mode, to broadcast a network.

In another embodiment of the sixth aspect, the network comprises a low-power wide area network (LPWAN).

In another embodiment of the sixth aspect, the network is broadcast by at least one of the first communication module, the second communication module, and another communication module.

In another embodiment of the sixth aspect, the program comprises further instructions for: while the electronic device operates in the pre-activation mode, transmitting image data captured by the sensor to a client device; and while the electronic device operates in the activated mode, causing the image data to be stored at a database associated with the electronic device.

In another embodiment of the sixth aspect, the receiving the data representing the configuration settings comprises receiving the data by at least one of the second communication module and an additional communication module.

In a seventh aspect, an electronic device includes: a first communication module communicatively coupled to a doorbell; one or more second communication modules; a sound component configured to generate a sound in response to the first communication module receiving a signal from the doorbell; one or more processors; and a non-transitory machine-readable memory storing a program, the program executable by at least one of the one or more processors, the program comprising instructions for: causing the electronic device to operate in a pre-activation mode, wherein, when in the pre-activation mode: the one or more second communication modules are configured to broadcast a low-power wide area network (LPWAN); and the first communication module is configured to receive the signal in response to an input to the doorbell; receiving, from a client device, data representing configuration settings associated with a wireless network; based on the receiving of the data, causing the one or more second communication modules to connect to the wireless network using the configuration settings; based on the one or more second communication modules connecting to the wireless network, receiving, using the one or more second communication modules, an activation signal from a server; and based on the receiving of the activation signal, causing the electronic device to operate in an activated mode, wherein, when in the activated mode: the one or more second communication modules are configured to broadcast the LPWAN; the first communication module is configured to receive the signal; and the one or more second communication modules are configured to communicate with at least one second electronic device using at least one of the wireless network, the LPWAN, and one or more other networks.

In an embodiment of the seventh aspect, the electronic device comprises a signaling device having hub device functionality.

In another embodiment of the seventh aspect, the electronic device comprises a hub device.

In another embodiment of the seventh aspect, the at least one second electronic device includes at least one of a home-security sensor, an automation device, and an A/V device, and wherein the wireless network and the at least one or more other networks comprise at least one of Wi-Fi, Bluetooth, Z-Wave, Zigbee, X10, Ethernet, RS-485, and 6LoWPAN.

In another embodiment of the seventh aspect, the input to the doorbell comprises at least one of a user input at a button of the doorbell and detecting motion in a field of view of a sensor of the doorbell.

In another embodiment of the seventh aspect, the sensor of the doorbell includes at least one a camera and a motion sensor.

In another embodiment of the seventh aspect, while the electronic device operates in the activated mode, audio/video data captured by one or more components of the doorbell and received by the electronic device is stored in a database associated with the electronic device.

In another embodiment of the seventh aspect, the database is located on at least one of the electronic device and a backend device.

In another embodiment of the seventh aspect, the data representing the configuration settings comprises at least one of an identification of the wireless network and a password for accessing the wireless network.

In another embodiment of the seventh aspect, the identification is a service set identifier (SSID).

In another embodiment of the seventh aspect, the activation signal from the server is received in response to a client requesting activation of a security system.

In another embodiment of the seventh aspect, the wireless network comprises a Wi-Fi network.

In another embodiment of the seventh aspect, the electronic device and the at least one second electronic device are disposed in a common geographic area.

In another embodiment of the seventh aspect, the electronic device and the at least one second electronic device are located one property.

In an eighth aspect, an electronic device includes: a first communication module communicatively coupled to a sensor; a second communication module; a component configured to receive a signal via the first communication module; one or more processors; and a non-transitory machine-readable memory storing a program, the program executable by at least one of the one or more processors, the program comprising instructions for: causing the electronic device to operate in a pre-activation mode, wherein, when in the pre-activation mode: the one or more second communication modules are configured to broadcast a network; and the first communication module is configured to generate the signal in response to an input to the sensor; receiving a request to configure the electronic device in an activated mode; and based on receiving the request, causing the electronic device to operate in an activated mode, wherein, when in the activated mode: the one or more second communication modules are configured to broadcast the LPWAN; the first communication module is configured to generate the signal; and the one or more second communication modules are configured to communicate with at least one second electronic device using at least one of the wireless network, the LPWAN, and one or more other networks.

In an embodiment of the eighth aspect, the electronic device comprises a signaling device.

In another embodiment of the eighth aspect, the electronic device comprises a hub device.

In another embodiment of the eighth aspect, the input to the doorbell comprises at least one of a user input at a button of the doorbell and detecting motion in a field of view of a sensor of the doorbell.

In another embodiment of the eighth aspect, while the electronic device operates in the activated mode, data captured by one or more sensors of the doorbell is stored in a database associated with the electronic device.

In another embodiment of the eighth aspect, the data representing the configuration settings comprises at least one of an identification of the wireless network and a password for accessing the wireless network.

In another embodiment of the eighth aspect, the activation signal from the server is received in response to a client requesting activation of the security system.

In another embodiment of the eighth aspect, the wireless network comprises a Wi-Fi network.

In another embodiment of the eighth aspect, the at least one second electronic device comprises at least one of a hub device, a backend device, and a client device.

In another embodiment of the eighth aspect, the at least one second electronic device comprises a server, an application programming interface, and a storage device.

In another embodiment of the eighth aspect, the electronic device is an A/V doorbell, and wherein while the electronic device operates in the activated mode, the electronic device is configured to transmit audio/video data received from the doorbell to a backend device for storage by the backend device.

In another embodiment of the eighth aspect, the electronic device is an A/V doorbell, and wherein while the electronic device operates in the pre-activation mode, the electronic device is configured to transmit audio/video data received from the doorbell only as one of live streaming audio/video data and near-live streaming audio/video data to at least one of a client device associated with the doorbell and a backend device.

In another embodiment of the eighth aspect, the electronic device is an A/V doorbell, and wherein while the electronic device operates in the pre-activation mode, the electronic device is configured to refrain from transmitting audio/video data received from the doorbell.

In another embodiment of the eighth aspect, the electronic device includes at least one of a home-security sensor, an automation device, and an A/V device, and wherein the wireless network and the at least one or more other networks comprise at least one of Wi-Fi, Bluetooth, Z-Wave, Zigbee, X10, Ethernet, RS-485, and 6LoWPAN.

In another embodiment of the eighth aspect, the electronic device and the at least one second electronic device are located on one property.

In a ninth aspect, an electronic device comprises: at least one communication component; at least one sound component; one or more processors; and one or more non-transitory computer-readable media storing instructions that, when executed by the one or more processors, cause the one or more processors to perform operations comprising: causing the electronic device to operate in a pre-activation mode; while the electronic device is operating in the pre-activation mode: receiving an input signal from a doorbell; and after receiving the input signal, causing the at least one sound component to output a first sound; receiving, from a client device and using the at least one communication component, first data representing configuration settings associated with a wireless network; connecting, using the at least one communication component, to the wireless network using the configuration settings; transmitting, using the at least one communication component, a first activation signal to a server associated with the electronic device; after transmitting the first activation signal, receiving, using the at least one communication component, a second activation signal from the server; after receiving the second activation signal, causing the electronic device to operate in an activated mode; and while the electronic device is operating in the activated mode; receiving, using the at least one communication component, second data from a sensor associated with a security system, the second data indicating that the sensor detected an event; and after receiving the second data, causing the at least one sound component to output a second sound.

In an embodiment of the ninth aspect, the one or more non-transitory computer-readable media storing further instructions that, when executed by the one or more processors, cause the one or more processors to perform further operations comprising: receiving, using the at least one communication component, third data representing a request to change a mode of the security system; and after receiving the third data, setting the mode for the security system.

In another embodiment of the ninth aspect, the one or more non-transitory computer-readable media storing further instructions that, when executed by the one or more processors, cause the one or more processors to perform further operations comprising: while the electronic device is operating in the pre-activation mode, connecting, using the at least one communication component, to an additional wireless network, and wherein connecting to the wireless network occurs while the electronic device is operating in the activated mode.

In another embodiment of the ninth aspect, the one or more non-transitory computer-readable media storing further instructions that, when executed by the one or more processors, cause the one or more processors to perform further operations comprising: receiving, using the at least one communication component, image data from the doorbell; and transmitting, using the at least one communication component, the image data to the server.

In a tenth aspect, an electronic device comprises: at least one communication component; at least one sound component; one or more processors; and one or more non-transitory computer-readable media storing instructions that, when executed by the one or more processors, cause the one or more processors to perform operations comprising: receiving a signal from a doorbell; after receiving the signal, causing the at least one sound component to output a sound; receiving first data representing configuration settings associated with a wireless network; establishing, using the at least one communication component, a connection with the wireless network; and receiving, using the at least one communication component and over the wireless network, second data from an additional electronic device associated with a security system.

In an embodiment of the tenth aspect, the one or more non-transitory computer-readable media storing further instructions that, when executed by the one or more processors, cause the one or more processors to perform further operations comprising: causing the electronic device to operate in a first mode; transmitting, using the at least one communication component and over the wireless network, third data to a server, the third data representing a request to activate; receiving, using the at least one communication component and over the wireless network, fourth data from the server, the fourth data associated with activating the electronic device; and after receiving the fourth data, causing the electronic device to operate in a second mode.

In another embodiment of the tenth aspect, the one or more non-transitory computer-readable media storing further instructions that, when executed by the one or more processors, cause the one or more processors to perform further operations comprising: causing the electronic device to operate in a first mode; while the electronic device is operating in the first mode, communicating, using the at least one communication component, using an additional wireless network; causing the electronic device to operate in a second mode; and while the electronic device is operating in the second mode, communicating, using the at least one communication component, using the wireless network.

In another embodiment of the tenth aspect, wherein the additional wireless network includes a low-power wide area network.

In another embodiment of the tenth aspect, wherein: the at least one communication component includes at least a first communication component and a second communication component; receiving the signal from the doorbell comprises receiving, using the first communication component, the signal from the doorbell; and receiving the second data from the additional electronic device comprises receiving, using the second communication component, the second data from the additional electronic device.

In another embodiment of the tenth aspect, wherein the additional electronic device includes a sensor associated with the security system, and wherein the second data includes sensor data representing an event detected by the sensor.

In another embodiment of the tenth aspect, the one or more non-transitory computer-readable media storing further instructions that, when executed by the one or more processors, cause the one or more processors to perform further operations comprising: receiving third data representing a request to set a mode of the security system; and setting the mode of the security system.

In another embodiment of the tenth aspect, the one or more non-transitory computer-readable media storing further instructions that, when executed by the one or more processors, cause the one or more processors to perform further operations comprising transmitting, using the at least one communication component, third data to a server, the third data indicating that the additional electronic device detected an event associated with the security system.

In another embodiment of the tenth aspect, the one or more non-transitory computer-readable media storing further instructions that, when executed by the one or more processors, cause the one or more processors to perform further operations comprising: receiving, from the doorbell, image data representing one or more images; and transmitting, using the at least one communication component, the image data to a server.

In another embodiment of the tenth aspect, the one or more non-transitory computer-readable media storing further instructions that, when executed by the one or more processors, cause the one or more processors to perform further operations comprising, after receiving the second data, causing the at least one sound component to output an additional sound associated with the security system In another embodiment of the tenth aspect, wherein: causing the at least one sound component to output the sound comprises causing a first sound component of the at least one sound component to output the sound; and causing the least one sound component to output the additional sound comprises causing a second sound component of the at least one sound component to output the additional sound.

In an eleventh aspect, a method comprises: receiving, by a first electronic device, a signal from a doorbell; after receiving the signal, outputting, by the first electronic device, sound associated with the doorbell; receiving, by the first electronic device, first data representing configuration settings associated with a wireless network; establishing, by the first electronic device and using the configuration settings, a connection with the wireless network; and receiving, by the first electronic device and over the wireless network, second data from a second electronic device associated with a security system.

In an embodiment of the eleventh aspect, the method further comprising: operating the first electronic device in a first mode; transmitting, by the first electronic device, third data to a server, the third data representing a request to activate; receiving, by the first electronic device, fourth data from the server, the fourth data associated with activating the first electronic device; and after receiving the fourth data, operating the first electronic device in a second mode.

In another embodiment of the eleventh aspect, the method further comprising: causing the first electronic device to operate in a first mode; while the first electronic device is operating in the first mode, communicating, by the first electronic device, with a third electronic device using an additional wireless network; causing the first electronic device to operate in a second mode; and while the first electronic device is operating in the second mode, communicating, by the first electronic device, with the second electronic device using the wireless network.

In another embodiment of the eleventh aspect, the method further comprising: receiving third data representing a request to set a mode of the security system; and setting the mode of the security system.

In another embodiment of the eleventh aspect, the method further comprising transmitting, by the first electronic device, third data to a third electronic device, the third data indicating that the second electronic device detected an event associated with the security system.

What is claimed is:

1. An electronic device comprising:
   at least one network interface;
   at least one sound device;
   one or more processors; and
   one or more non-transitory computer-readable media storing instructions that, when executed by the one or more processors, cause the one or more processors to perform operations comprising:
   causing the electronic device to operate in a pre-activation mode;
   while the electronic device is operating in the pre-activation mode:
      receiving an input signal from a doorbell device; and
      based at least in part on the receiving of the input signal, causing the at least one sound device to output a first sound;
   receiving, from a user device and using the at least one network interface, first data representing configuration settings associated with a first wireless network;
   connecting, using the at least one network interface, to the first wireless network using the configuration settings;
   sending, using the at least one network interface, a first activation signal to a system;
   receiving, using the at least one network interface, a second activation signal from the system;
   based at least in part on the receiving of the second activation signal, causing the electronic device to operate in an activated mode; and
   while the electronic device is operating in the activated mode:
      receiving, using the at least one network interface, second data from a sensor associated with a security system, the second data indicating that the sensor detected an event; and
      based at least in part on the receiving of the second data, causing the at least one sound device to output a second sound.

2. The electronic device of claim 1, the one or more non-transitory computer-readable media storing further instructions that, when executed by the one or more processors, cause the one or more processors to perform further operations comprising:
   receiving, using the at least one network interface, a request to change a first mode of the security system to a second mode; and based at least in part on the receiving of the request, setting the second mode for the security system.

3. The electronic device of claim 1, the one or more non-transitory computer-readable media storing further instructions that, when executed by the one or more processors, cause the one or more processors to perform further operations comprising:
while the electronic device is operating in the pre-activation mode, connecting, using the at least one network interface, to a second wireless network,
and wherein the receiving of the first data occurs using the second wireless network.

4. The electronic device of claim 1, the one or more non-transitory computer-readable media storing further instructions that, when executed by the one or more processors, cause the one or more processors to perform further operations comprising:
receiving, using the at least one network interface, image data from the doorbell device; and
sending, using the at least one network interface, the image data to the system.

5. An electronic device comprising:
a first network interface;
a second network interface;
at least one sound device;
one or more processors; and
one or more non-transitory computer-readable media storing instructions that, when executed by the one or more processors, cause the one or more processors to perform operations comprising:
causing the first network interface to deactivate;
receiving a signal from a doorbell device;
based at least in part on the receiving of the signal, causing the at least one sound device to output a first sound;
receiving, using the second network interface, first data representing configuration settings associated with a first wireless network;
based at least in part on the receiving of the first data, causing the first network interface to activate;
establishing, using the first network interface, a first connection with the first wireless network;
receiving second data from a sensor associated with a security system; and
based at least in part on the receiving of the second data, sending, using the first network interface and over the first wireless network, third data representing an event detected by the sensor.

6. The electronic device as recited in claim 5, the one or more non-transitory computer-readable media storing further instructions that, when executed by the one or more processors, cause the one or more processors to perform further operations comprising:
causing the electronic device to operate in a first mode;
sending, using the first network interface and over the first wireless network, a request to activate;
receiving, using the first network interface and over the first wireless network, fourth data associated with activating a second mode of the electronic device; and
based at least in part on the receiving of the fourth data, causing the electronic device to operate in the second mode.

7. The electronic device as recited in claim 5, the one or more non-transitory computer-readable media storing further instructions that, when executed by the one or more processors, cause the one or more processors to perform further operations comprising:
causing the electronic device to operate in a first mode;
while the electronic device is operating in the first mode, communicating, using the second network interface, over a second wireless network;
causing the electronic device to operate in a second mode; and
while the electronic device is operating in the second mode, communicating, using the first network interface, over the first wireless network.

8. The electronic device as recited in claim 7, wherein the second wireless network includes a low-power wide area network.

9. The electronic device as recited in claim 5, the one or more non-transitory computer-readable media storing further instructions that, when executed by the one or more processors, cause the one or more processors to perform further operations comprising:
receiving, using the first network interface and over the first wireless network, a request to set a mode of the security system, the mode including at least one of a disarmed mode, a home mode, or an away mode; and
setting the mode of the security system.

10. The electronic device as recited in claim 5, the one or more non-transitory computer-readable media storing further instructions that, when executed by the one or more processors, cause the one or more processors to perform further operations comprising:
receiving, from the doorbell device, image data; and
sending, using the first network interface and over the first wireless network, the image data to a server.

11. The electronic device as recited in claim 5, wherein:
the causing of the at least one sound device to output the first sound comprises causing a first sound device of the at least one sound device to output the first sound; and
the one or more non-transitory computer-readable media storing further instructions that, when executed by the one or more processors, cause the one or more processors to perform further operations comprising, based at least in part on the receiving of the second data, causing a second sound device of the at least one sound device to output a second sound.

12. The electronic device as recited in claim 5, wherein the second data represents a state of the sensor, the state including at least an open state or a closed state.

13. The electronic device as recited in claim 5, the one or more non-transitory computer-readable media storing further instructions that, when executed by the one or more processors, cause the one or more processors to perform further operations comprising at least one of:
causing the electronic device to operate in a first mode, wherein the electronic device is configured to refrain from operating as a base station for the security system while operating in the first mode; and
based at least in part on the receiving of the first data, causing the electronic device to operate in a second mode, wherein the electronic device is configured to operate as the base station for the security system while operating in the second mode.

14. The electronic device as recited in claim 5, the one or more non-transitory computer-readable media storing further instructions that, when executed by the one or more processors, cause the one or more processors to perform further operations comprising:
causing the electronic device to operate in a first mode;
while the electronic device is operating in the first mode, at least one of:

refraining from receiving identifier data associated with the sensor; or refraining from storing the identifier data;

causing the electronic device to operate in a second mode; and while the electronic device is operating in the second mode, storing the identifier data.

15. The electronic device as recited in claim 5, the one or more non-transitory computer-readable media storing further instructions that, when executed by the one or more processors, cause the one or more processors to perform further operations comprising:

before the receiving of the first data, activating first functionality associated with a chime for the doorbell device; and after the receiving of the first data, activating second functionality associated with the security system.

16. The electronic device as recited in claim 5, the one or more non-transitory computer-readable media storing further instructions that, when executed by the one or more processors, cause the one or more processors to perform further operations comprising:

before the receiving of the first data, refraining establishing a second connection with the sensor; and after the receiving of the first data, establishing the second connection with the sensor.

17. The electronic device as recited in claim 5, wherein:

causing the first network interface to deactivate comprises causing power to not be provided to the first network interface; and causing the first network interface to activate comprises causing the power to be provided to the first network interface.

18. The electronic device as recited in claim 5, wherein:

causing the first network interface to deactivate comprises causing the first network interface to turn off, and causing the first network interface to activate comprises causing the first network interface to turn on.

19. A method comprising:

causing a network interface of a first electronic device to deactivate;

receiving, by the first electronic device, a signal from a doorbell device;

based at least in part on the receiving of the signal, outputting, by the first electronic device, sound associated with the doorbell device;

receiving, by the first electronic device, first data representing configuration settings associated with a first wireless network;

based at least in part on the receiving of the first data, causing the network interface to activate;

establishing, by the first electronic device and using the network interface, a connection with the first wireless network;

receiving, using the network interface and over the first wireless network, second data from a system, the second data representing a first mode of a security system; and based at least in part on the receiving of the second data, setting the first mode of the security system.

20. The method as recited in claim 19, further comprising:

receiving, by the first electronic device, third data from a second electronic device associated with the security system, the third data indicating that the second electronic device detected an event; and sending, using the network interface and over the first wireless network, the third data to the system.

21. The method as recited in claim 19, further comprising:

receiving, using the network interface and over the first wireless network, third data from the system, the third data representing a second mode associated with the security system; and based at least in part on the receiving of the third data, setting the second security mode of the security system.

22. The method as recited in claim 21, wherein:

the first mode causes the first electronic device to perform a first action when a sensor associated with the security system detects an event; and the second mode causes the first electronic device to perform a second action when the sensor detects the event.

* * * * *